United States Patent
Kondo et al.

(10) Patent No.: US 12,241,838 B2
(45) Date of Patent: Mar. 4, 2025

(54) LASER-INDUCED BREAKDOWN SPECTROSCOPE

(71) Applicant: Keyence Corporation, Osaka (JP)

(72) Inventors: Ryosuke Kondo, Osaka (JP); Kenichiro Hirose, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 254 days.

(21) Appl. No.: 17/688,962

(22) Filed: Mar. 8, 2022

(65) Prior Publication Data
US 2022/0349827 A1    Nov. 3, 2022

(30) Foreign Application Priority Data
Apr. 30, 2021 (JP) ................. 2021-077186

(51) Int. Cl.
*G01N 21/71* (2006.01)
*H04N 23/56* (2023.01)
*H04N 23/69* (2023.01)

(52) U.S. Cl.
CPC .......... *G01N 21/718* (2013.01); *H04N 23/56* (2023.01); *H04N 23/69* (2023.01); *G01N 2201/06113* (2013.01)

(58) Field of Classification Search
CPC .................. G01N 21/718; G01N 21/01; G01N 2201/06113; G01N 21/71; H04N 23/55;
(Continued)

(56) References Cited

U.S. PATENT DOCUMENTS 9,233,433 B2 * 1/2016 Morikazu ............ B23K 26/40
11,085,882 B1 * 8/2021 Bol'shakov .......... H01J 49/105
(Continued)

FOREIGN PATENT DOCUMENTS

CN     105973871 A  *  9/2016    ........ G01N 21/718
CN     105973871 A1 *  9/2016
(Continued)

OTHER PUBLICATIONS

U.S. Appl. No. 17/466,288, filed Sep. 3, 2021 (156 pages).
U.S. Appl. No. 17/688,968, filed Mar. 8, 2022 (123 pages).
U.S. Appl. No. 17/853,956, filed Jun. 30, 2022 (139 pages).

*Primary Examiner* — Uzma Alam
*Assistant Examiner* — Justin J Van Cleave
(74) *Attorney, Agent, or Firm* — Kilyk & Bowersox, P.L.L.C.

(57) ABSTRACT

It is possible to save time and effort required for imaging of an analysis point and to improve usability of an analysis device. An analysis and observation device as a laser-induced breakdown spectroscope includes: a first camera, an electromagnetic wave emitter that emits laser light to a sample; a reflective object lens that collects plasma light generated in the sample; first and second detectors that generate intensity distribution spectra; and a processor. The processor controls the first camera in response to reception of a start trigger signal to generate a pre-irradiation image that is an image before the sample is irradiated with the laser light, and controls the electromagnetic wave emitter after controlling the first camera to emit the laser light to the sample.

16 Claims, 48 Drawing Sheets

(58) Field of Classification Search
CPC ........ H04N 23/00; H04N 23/60; H04N 23/62; H04N 23/56; H04N 23/695; H04N 23/69
See application file for complete search history.

(56) References Cited

U.S. PATENT DOCUMENTS

| | | | |
|---|---|---|---|
| 2009/0091745 A1* | 4/2009 | Levesque | G01N 21/718 356/73 |
| 2013/0168545 A1* | 7/2013 | Clem | H01J 49/0463 250/288 |
| 2018/0003938 A1* | 1/2018 | Nakamoto | G02B 21/0084 |
| 2020/0225163 A1* | 7/2020 | Day | G01J 3/443 |
| 2020/0328072 A1* | 10/2020 | Williams | H01J 49/0463 |
| 2022/0113530 A1 | 4/2022 | Hirose | |

FOREIGN PATENT DOCUMENTS

| | | | | |
|---|---|---|---|---|
| CN | 111912835 A | * | 11/2020 | ............ G01N 21/01 |
| JP | 2020113569 A | | 7/2020 | |
| WO | WO-2020150236 A1 | * | 7/2020 | .......... H01J 49/0004 |

\* cited by examiner

FRONT ← → REAR

SECOND MODE (REFERENCE MAGNIFICATION)

CHANGE MODE:
VISUAL FIELD DEVIATION OCCURS

FIRST MODE

LASER-INDUCED BREAKDOWN SPECTROSCOPE

CROSS-REFERENCE TO RELATED APPLICATIONS

The present application claims foreign priority based on Japanese Patent Application No. 2021-077186, filed Apr. 30, 2021, the contents of which are incorporated herein by reference.

BACKGROUND OF THE INVENTION

1. Field of the Invention

The technique disclosed herein relates to a laser-induced breakdown spectroscope.

2. Description of Related Art

For example, JP 2020-113569 A discloses an analysis device (spectroscopic device) configured to perform component analysis of a sample. Specifically, the spectroscopic device disclosed in JP 2020-113569 A includes a condenser lens, configured to collect a primary electromagnetic wave (ultraviolet laser light), and a collection head configured to collect a secondary electromagnetic wave (plasma) generated on a sample surface in response to the primary electromagnetic wave in order to perform the component analysis using laser induced breakdown spectroscopy (LIBS).

According to JP 2020-113569 A, a peak of a spectrum of the sample is measured from a signal of the secondary electromagnetic wave so that chemical analysis of the sample based on the measured peak can be executed.

Meanwhile, the spectroscopic device disclosed in JP 2020-113569 A is configured as a device specialized in an analysis function. When such a device is used, it is necessary to separately capture an image of an analyte with a digital camera or the like which is separated from the spectroscopic device in order to leave an imaged analysis point of the sample.

However, the capturing using the digital camera or the like requires time and effort of a user and causes inconvenience in terms of usability.

SUMMARY OF THE INVENTION

A technique disclosed herein has been made in view of the above points, and an object thereof is to save time and effort required for imaging an analysis point and to improve the usability of an analysis device.

According to one embodiment of the present disclosure, provided is a laser-induced breakdown spectroscope that performs component analysis of an analyte using laser induced breakdown spectroscopy. The laser-induced breakdown spectroscope includes: a placement stage on which an analyte is placed; an imaging section which receives reflection light reflected by the analyte placed on the placement stage and detects a light reception amount of the received reflection light; a laser light emitter which emits laser light to the analyte; a collection head which collects plasma light generated in the analyte as the analyte is irradiated with the laser light emitted from the laser light emitter; a detector which receives the plasma light generated in the analyte and collected by the collection head, and generates an intensity distribution spectrum that is an intensity distribution of the plasma light for each wavelength; and a processor which includes an imaging controller that generates an image of the analyte based on the light reception amount of the reflection light detected by the imaging section, and a component analysis section that receives a start trigger signal for starting component analysis of the analyte and performs the component analysis of the analyte based on the intensity distribution spectrum generated by the detector.

According to the one embodiment of the present disclosure, the processor controls the imaging section to generate a pre-irradiation image that is the image before the analyte is irradiated with the laser light in response to the reception of the start trigger signal, and controls the laser light emitter after controlling the imaging section to emit the laser light to the analyte.

According to the one embodiment, the processor generates the pre-irradiation image via the imaging section at a timing immediately before the analyte is irradiated with the laser light. At that time, an element configured to observe the analyte, such as the imaging section, and an element configured to analyze the analyte, such as the laser light emitter, are controlled by the common processor so that it is possible to seamlessly execute observation and analysis of the analyte and to save the time and effort required for imaging an analysis point. As a result, it is possible to improve the usability of the laser-induced breakdown spectroscope (hereinafter, also simply referred to as an "analysis device").

Further, according to another embodiment of the present disclosure, the processor may generate an image in which a result of the analysis is superimposed on the pre-irradiation image, and causes a display to display the image.

According to the another embodiment, the processor superimposes the analysis result on the pre-irradiation image. As a result, it is possible for a user to grasp a relationship between the analysis result and the analyte, which is advantageous in terms of improving the usability of the analysis device.

Further, according to still another embodiment of the present disclosure, the processor may control the imaging section to generate a post-irradiation image that is the image after the analyte is irradiated with the laser light after controlling the laser light emitter to emit the laser light to the analyte.

According to the still another embodiment, the processor generates the post-irradiation image via the imaging section at a timing after the analyte is irradiated with the laser light. For example, the user can grasp a change occurring in the analyte by the laser induced breakdown spectroscopy by comparing the pre-irradiation image and the post-irradiation image. This is suitable for enhancing the usability of the analysis device. Furthermore, the generation of the post-irradiation image can also be performed seamlessly similarly to the generation of the pre-irradiation image, and thus, it is possible to save the time and effort required for the generation. As a result, it is advantageous in terms of improving the usability of the analysis device.

Further, according to still another embodiment of the present disclosure, the laser-induced breakdown spectroscope may further include: a second imaging section which receives reflection light reflected by the analyte placed on the placement stage and detects a light reception amount of the received reflection light; and a mode switcher which switches to one of the imaging section and the second imaging section, wherein an enlargement magnification of the analyte may be set to be relatively higher in the second imaging section than in the imaging section, and the imaging controller may generate a low-magnification image in which the enlargement magnification is relatively low in a state where the mode switcher switches to the imaging section, and generate a high-magnification image in which the enlargement magnification is relatively high in a state where the mode switcher switches to the second imaging section.

Further, according to still another embodiment of the present disclosure, the laser-induced breakdown spectroscope may further include: an observation housing which accommodates the imaging section; and an analysis housing which is configured separately from the observation housing and accommodates the second imaging section and the detector, wherein the mode switcher may switch to one of the imaging section and the second imaging section by moving the observation housing and the analysis housing relative to the placement stage.

Further, according to still another embodiment of the present disclosure, the laser-induced breakdown spectroscope may further include: a second imaging section that receives reflection light reflected by the analyte placed on the placement stage and detects a light reception amount of the received reflection light; and a magnification changer capable of changing an enlargement magnification of the analyte by at least one of the imaging section and the second imaging section, wherein the processor may adjust the magnification changer to change the enlargement magnification, and generate a low-magnification image in which the enlargement magnification is relatively low and a high-magnification image in which the enlargement magnification is relatively high as the pre-irradiation image of the analyte as the imaging section detects the light reception amount of the reflection light at each of the enlargement magnifications.

According to the still another embodiment, the processor generates two types of images having different enlargement magnifications. For example, between the two types of images, the low-magnification image is used for navigation of the user, and the high-magnification image is used for specification of the analysis point, so that it is possible to further improve the usability of the analysis device.

Further, according to still another embodiment of the present disclosure, the processor may cause a display to display the low-magnification image, the high-magnification image, and a result of the analysis, and a first user interface that receives an operation input for storing at least one image of the low-magnification image and the high-magnification image in association with the analysis result.

According to the still another embodiment, the processor provides the user with the first user interface configured to associate at least one of the two types of images with the analysis result. As a result, it is possible to meet a detailed need that, for example, storage of the low-magnification image is desired but storage of the high-magnification image is unnecessary. This is advantageous in terms of improving the usability of the analysis device.

Further, according to still another embodiment of the present disclosure, the processor may cause the display to display a display screen for updating the at least one image associated with the analysis result, and receive a storage instruction for storing the image displayed on the display and the analysis result associated with the image in a storage section, and the display screen may include the at least one image and a second user interface that receives an operation input for updating the at least one image.

According to the still another embodiment, the processor provides the user with the second user interface for updating the image. As a result, it is possible to meet a detailed need, for example, replacement of the low-magnification image from the pre-irradiation image to the post-irradiation image. This is advantageous in terms of improving the usability of the analysis device.

Further, according to still another embodiment of the present disclosure, the laser-induced breakdown spectroscope may further include a report output section which outputs a report in which at least one of the low-magnification image, the high-magnification image, and the analysis result is displayed at each position on a template obtained by assigning positions where the low-magnification image, the high-magnification image, and the analysis result are to be output, wherein the processor may cause the image associated by the first user interface to be displayed on the report when the report output section outputs the report.

According to the still another embodiment, the processor outputs the report obtained by displaying the pre-irradiation image, the post-irradiation image, and the like obtained during the component analysis via the report output section. As a result, the user can grasp an irradiation position of the laser light, the destruction caused by the irradiation of the laser light, and the like. This is advantageous in terms of improving the usability of the analysis device.

Further, according to still another embodiment of the present disclosure, the laser-induced breakdown spectroscope may further include an electric drive which moves an imaging position indicating a relative position of the placement stage with respect to the imaging section along a horizontal direction, wherein the processor may be configured to be capable of receiving at least one of specification of a first analysis point on the high-magnification image and specification of a second analysis point on the low-magnification image, and the imaging controller may control the electric drive based on the second analysis point to move the imaging position such that the second analysis point falls within a visual field range of the high-magnification image when the processor receives the specification of the second analysis point, and control the electric drive based on the first analysis point to move the imaging position such that the first analysis point is brought close to a visual field center of the high-magnification image when the processor receives the specification of the first analysis point.

According to the still another embodiment, the analysis device can move the placement stage to capture an image of the second analysis point specified on the low-magnification image, or can move the placement stage such that the first analysis point specified on the high-magnification image is brought close to the visual field center. As a result, it is possible to easily specify the irradiation position of the laser light in detail, which is advantageous in terms of improving the usability of the analysis device.

Further, according to still another embodiment of the present disclosure, the imaging controller may execute regeneration of the high-magnification image in a state where the second analysis point falls within the visual field range of the high-magnification image by the electric drive when the processor receives specification of the second analysis point, and execute regeneration of the high-magnification image in a state where the first analysis point is brought close to the visual field center of the high-magnification image by the electric drive when the processor receives the specification of the first analysis point.

According to the still another embodiment, the analysis device regenerates the high-magnification image every time the placement stage is moved according to the specification of the first analysis point or the second analysis point. As a result, it is possible to more appropriately specify the irradiation position of the laser light, which is advantageous in terms of improving the usability of the analysis device.

Further, according to still another embodiment of the present disclosure, the processor may receive specification of the first analysis point on the regenerated high-magnification image, and the imaging controller may control the electric drive based on the first analysis point to move the imaging position such that the first analysis point is brought close to a visual field center of the regenerated high-magnification image when the processor receives the specification of the first analysis point, and execute additional regeneration of the high-magnification image in a state where the first analysis point is brought close to the visual field center of the regenerated high-magnification image by the electric drive.

According to the still another embodiment, the analysis device repeatedly receives the specification of the first analysis point, and executes the movement of the placement stage and the regeneration of the high-magnification image every time the specification is received. As a result, the irradiation position of the laser light can be specified in more detail, which is advantageous in terms of improving the usability of the analysis device.

Further, according to still another embodiment of the present disclosure, the laser-induced breakdown spectroscope may further include: a base; and a stand which is connected to the base and extends in a first direction perpendicular to the base, wherein the placement stage may be supported by the base or the stand, the electric drive may be configured to move the imaging position along the first direction, and the imaging controller may control the electric drive to move the imaging position along the first direction after the imaging position is moved along the horizontal direction by the electric drive.

According to the still another embodiment, the analysis device can move the imaging position along the horizontal direction and the first direction. As a result, it is possible to control the imaging position of the image in more detail.

Further, according to still another embodiment of the present disclosure, the imaging controller may cause the electric drive to move the imaging position to a plurality of first positions along the first direction, generate a plurality of the high-magnification images respectively at the plurality of first positions, and synthesize the plurality of high-magnification images generated respectively at the plurality of first positions to generate an omnifocal image of the analyte.

According to the still another embodiment, the imaging controller generates the omnifocal image of the analyte so that it is possible to generate the high-magnification image focused on substantially the entire visual field range. This is advantageous in terms of improving the usability of the analysis device.

Further, according to still another embodiment of the present disclosure, the electric drive may be configured to change a collection position indicating a relative position of the placement stage with respect to the collection head along the first direction, the imaging controller may cause the electric drive to move the collection position to a plurality of first positions along the first direction and generate the image at each of the plurality of first positions, and the component analysis section may identify a height along the first direction at the first analysis point received by the processor based on the image generated at each of the plurality of first positions, and control the electric drive based on the identified height to move the collection position along the first direction such that the laser light emitted from the laser light emitter is focused on the first analysis point.

According to the still another embodiment, the laser light can be focused on the first analysis point by performing the control according to the identified height. This is advantageous in terms of improving the usability of the analysis device.

Further, according to still another embodiment of the present disclosure, the processor may be configured to be capable of receiving specification of a plurality of the second analysis points on the low-magnification image, and when the processor receives the specification of the plurality of second analysis points, for each of the plurality of received second analysis points, the processor may cause the electric drive to move the imaging position such that one second analysis point among the plurality of received second analysis points falls within the visual field range of the high-magnification image, cause the imaging controller to generate the high-magnification image in a state where the one second analysis point falls within the visual field range of the high-magnification image, and cause the laser light emitter to emit the laser light to the analyte after the imaging controller generates the high-magnification image to cause the component analysis section to perform component analysis at the one second analysis point.

According to the still another embodiment, the laser light can be emitted to each of the plurality of second analysis points, and the component analysis can be performed at each of the second analysis points. This is advantageous in terms of improving the usability of the analysis device.

Further, according to still another embodiment of the present disclosure, the processor may be configured to be capable of receiving specification of a plurality of the first analysis points on the high-magnification image, and when the processor receives the specification of the plurality of first analysis points, for each of the plurality of received first analysis points, the processor may cause the electric drive to move the imaging position such that one first analysis point among the plurality of received first analysis points is brought close to the visual field center of the high-magnification image, cause the imaging controller to generate the high-magnification image in a state where the one first analysis point is brought close to the visual field center of the high-magnification image, and cause the laser light emitter to emit the laser light to the analyte after the imaging controller generates the high-magnification image to cause the component analysis section to perform component analysis at the one first analysis point.

According to the still another embodiment, the laser light can be emitted to each of the plurality of first analysis points, and the component analysis can be performed at each of the first analysis points. This is advantageous in terms of improving the usability of the analysis device.

As described above, it is possible to save the time and effort required for imaging the analysis point and to improve the usability of the analysis device according to the present disclosure.

DETAILED DESCRIPTION OF PREFERRED EMBODIMENTS

Hereinafter, an embodiment of the present disclosure will be described with reference to the drawings. Note that the following description is given as an example.

<Overall Configuration of Analysis and Observation Device A>

Figure 1:
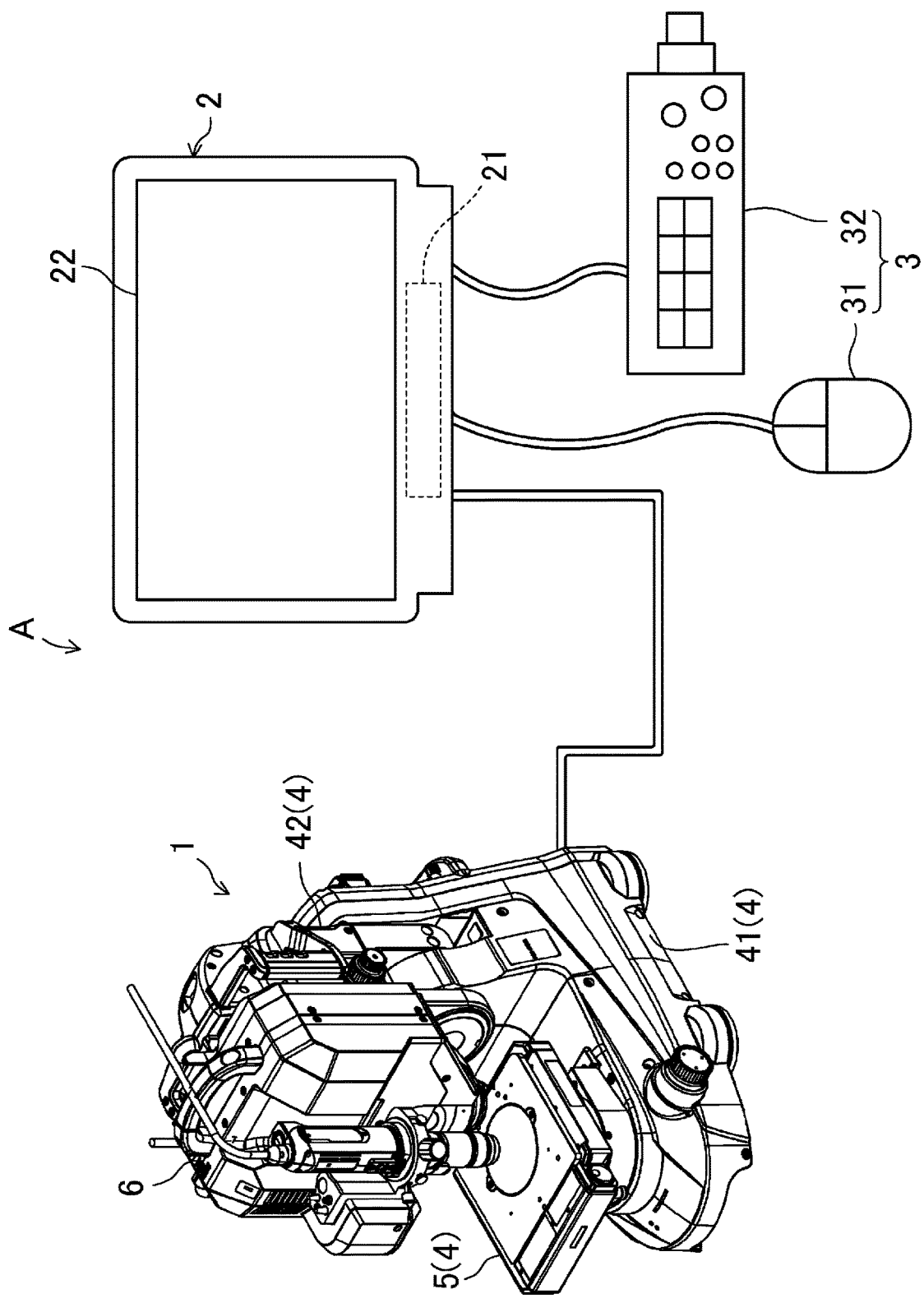
FIG. 1 is a schematic diagram illustrating an overall configuration of an analysis and observation device.

FIG. 1 is a schematic diagram illustrating an overall configuration of an analysis and observation device A as a laser-induced breakdown spectroscope according to an embodiment of the present disclosure. The analysis and observation device A illustrated in FIG. 1 can perform magnifying observation of a sample SP, which serves as both of an observation target and an analyte, and can also perform component analysis of the sample SP.

Specifically, for example, the analysis and observation device A according to the present embodiment can search for a site where component analysis is to be performed in the sample SP and perform inspection, measurement, and the like of an appearance of the site by magnifying and capturing an image of the sample SP including a specimen such as a micro object, an electronic component, a workpiece, and the like. When focusing on an observation function, the analysis and observation device A can be referred to as a magnifying observation device, simply as a microscope, or as a digital microscope.

The analysis and observation device A can also perform a method referred to as a laser induced breakdown spectroscopy (LIBS), laser induced plasma spectroscopy (LIPS), or the like in the component analysis of the sample SP. When focusing on an analysis function, the analysis and observation device A can be referred to as a component analysis device, simply as an analysis device, or as a spectroscopic device.

As illustrated in FIG. 1, the analysis and observation device A according to the present embodiment includes an optical system assembly (optical system main body) 1, a controller main body 2, and an operation section 3 as main constituent elements.

Among them, the optical system assembly 1 can perform capturing and analysis of the sample SP and output an electrical signal corresponding to a capturing result and an analysis result to the outside.

The controller main body 2 includes a controller 21 configured to control various components constituting the optical system assembly 1 such as a first camera 81. The controller main body 2 can cause the optical system assembly 1 to observe and analyze the sample SP using the controller 21. The controller main body 2 also includes a display 22 capable of displaying various types of information. The display 22 can display an image captured in the optical system assembly 1, data indicating the analysis result of the sample SP, and the like.

Figure 12:
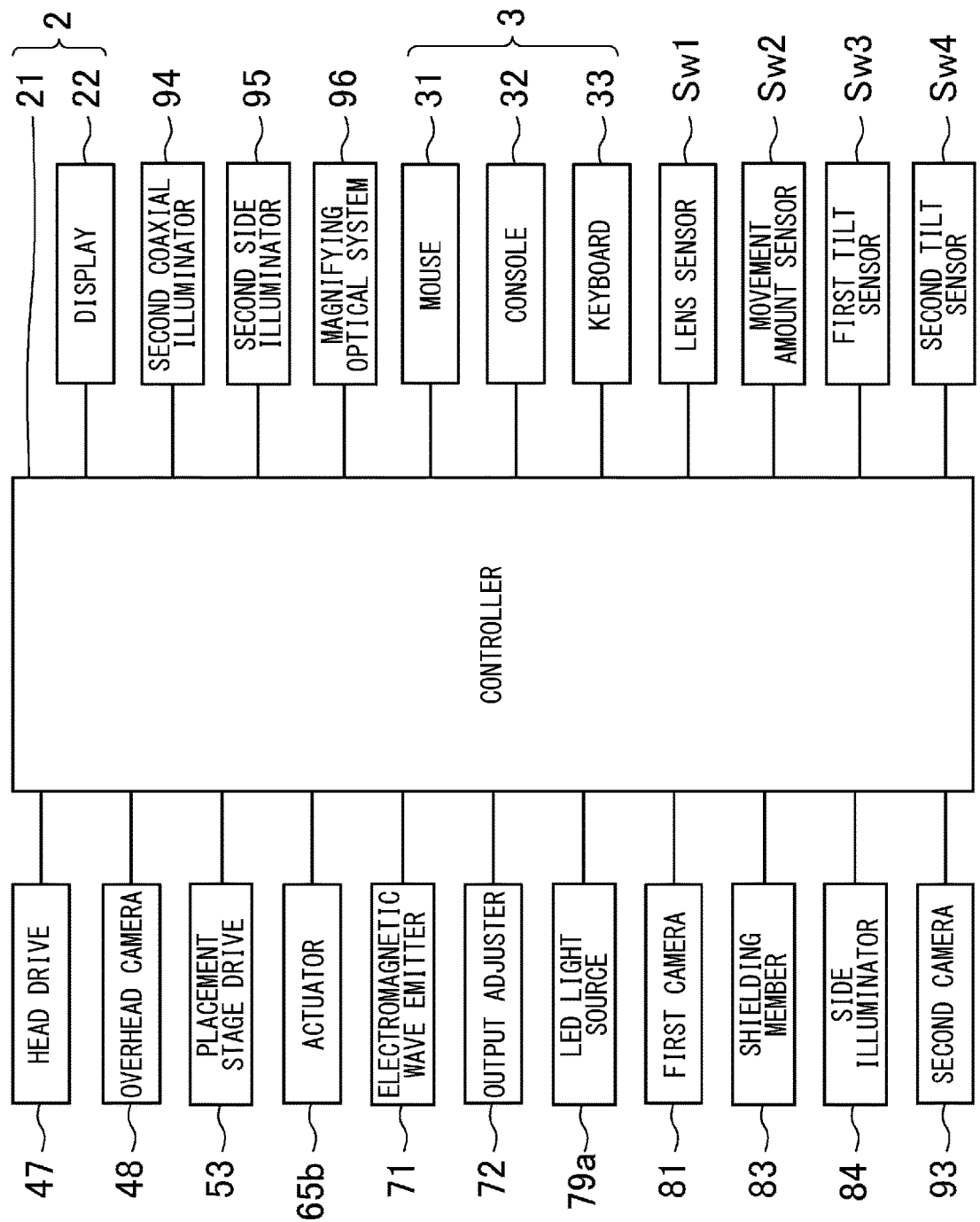
FIG. 12 is a block diagram illustrating a configuration of a controller main body 2.

The operation section 3 includes a mouse 31, a console 32, and a keyboard 33 that receive an operation input by a user (the keyboard 33 is illustrated only in FIG. 12). The console 32 can instruct acquisition of image data, brightness adjustment, and focusing of the first camera 81 to the controller main body 2 by operating a button, an adjustment knob, and the like.

Note that the operation section 3 does not necessarily include all three of the mouse 31, the console 32, and the keyboard 33, and may include any one or two. Further, a touch-panel-type input device, an audio-type input device, or the like may be used in addition to or instead of the mouse 31, the console 32, and the keyboard 33. In the case of the touch-panel-type input device, any position on a screen displayed on the display 22 can be detected.

<Details of Optical System Assembly 1>

Figure 2:
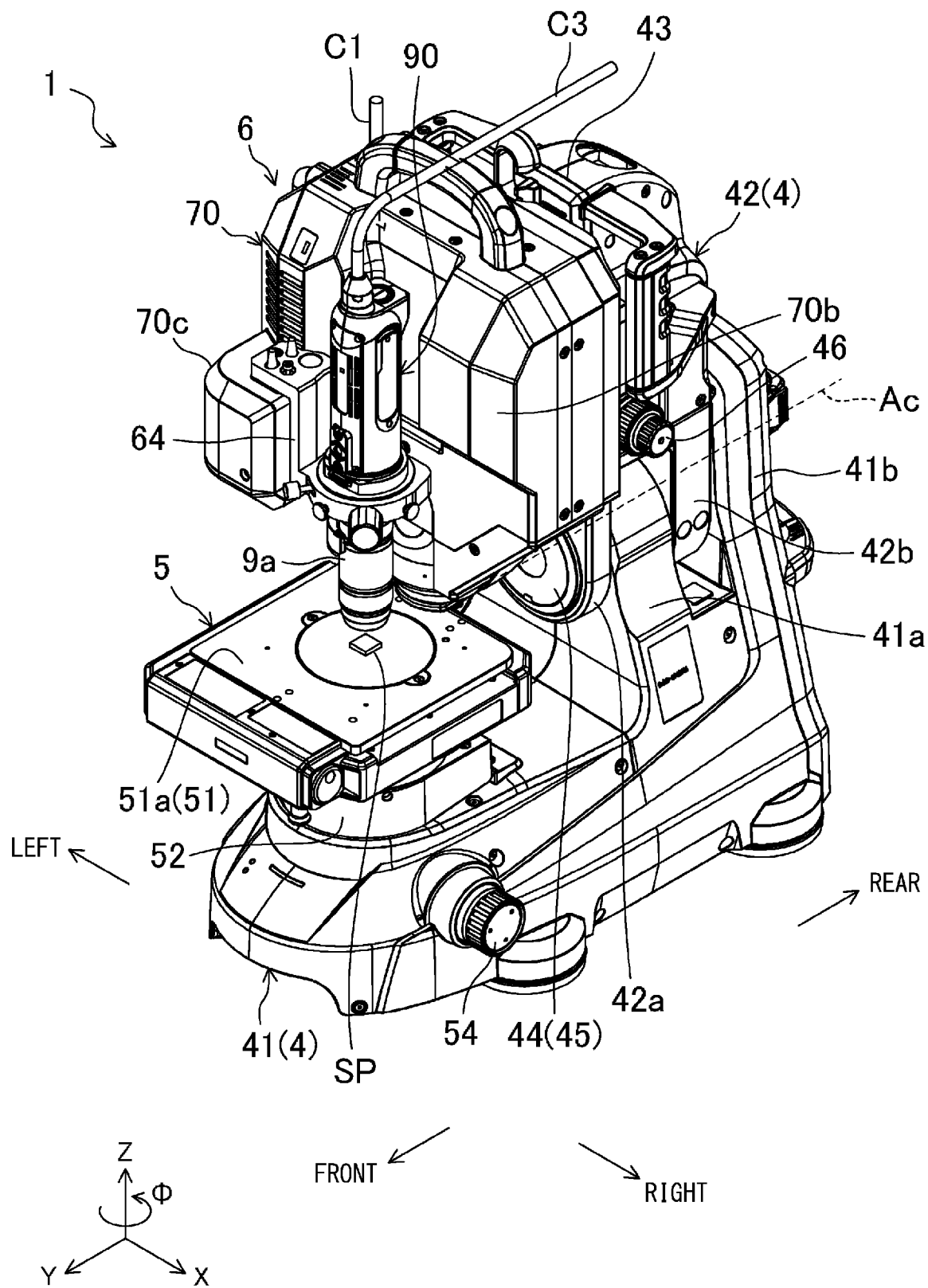
FIG. 2 is a perspective view illustrating an optical system assembly.
Figure 3:
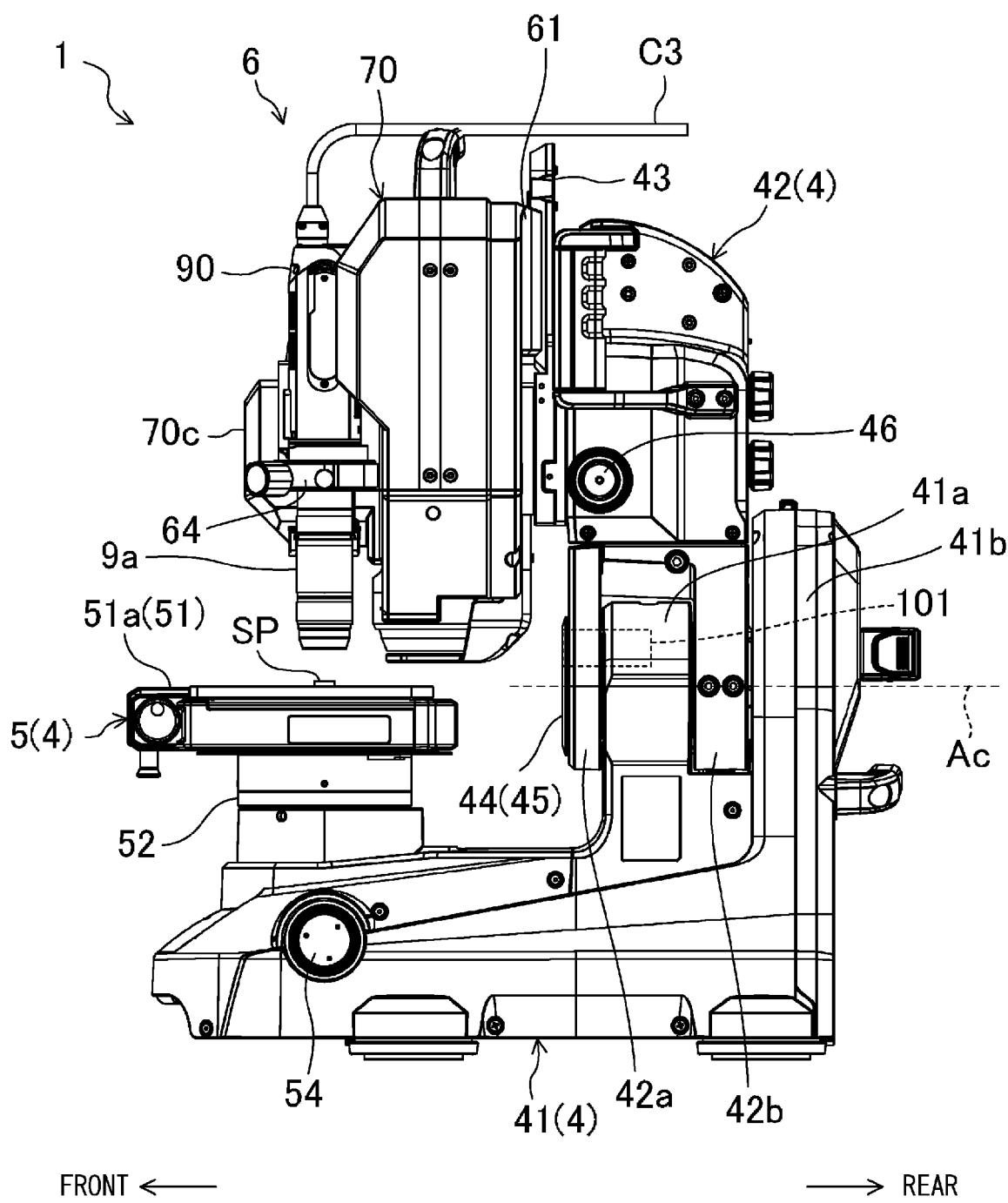
FIG. 3 is a side view illustrating the optical system assembly.
Figure 4:
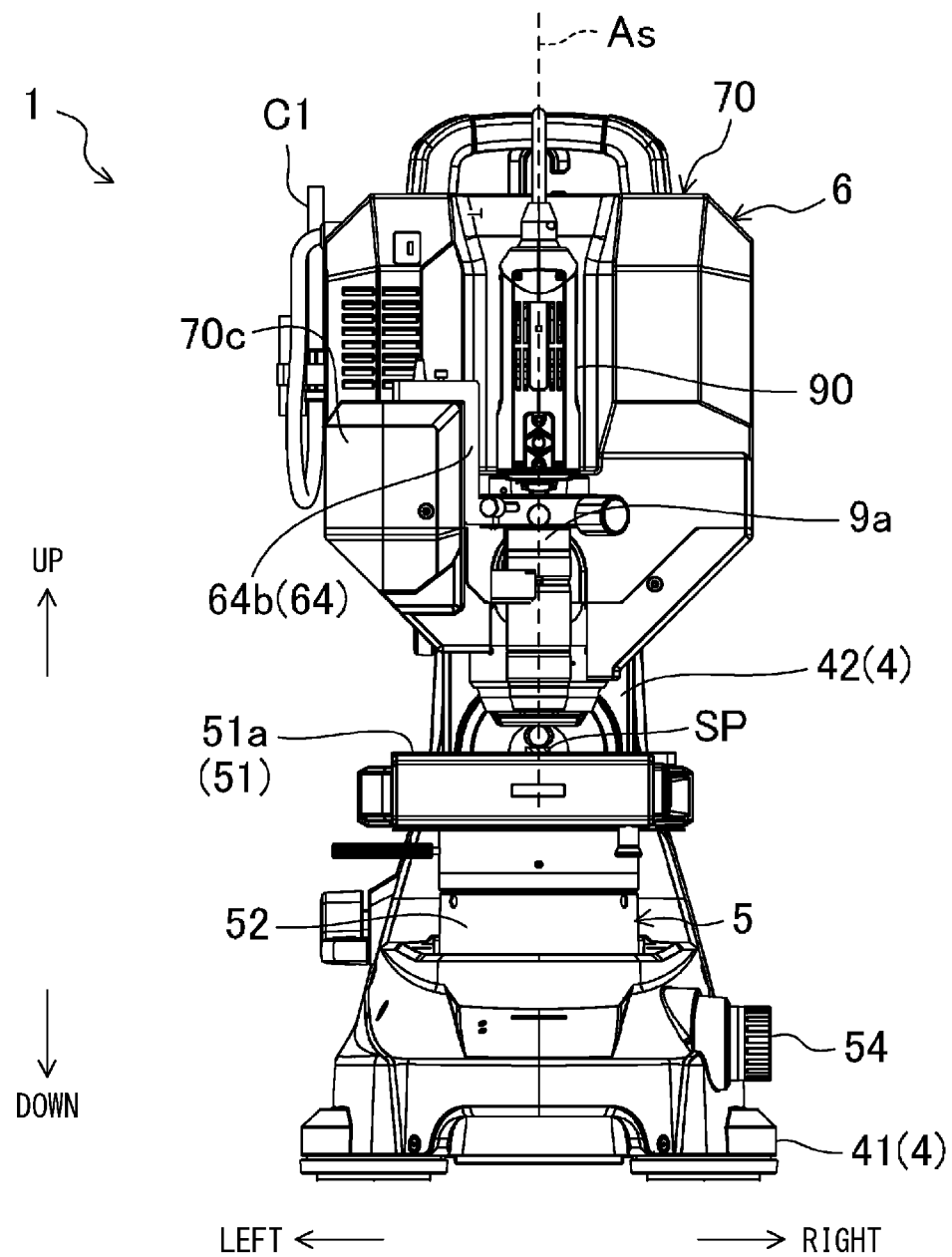
FIG. 4 is a front view illustrating the optical system assembly.
Figure 5:
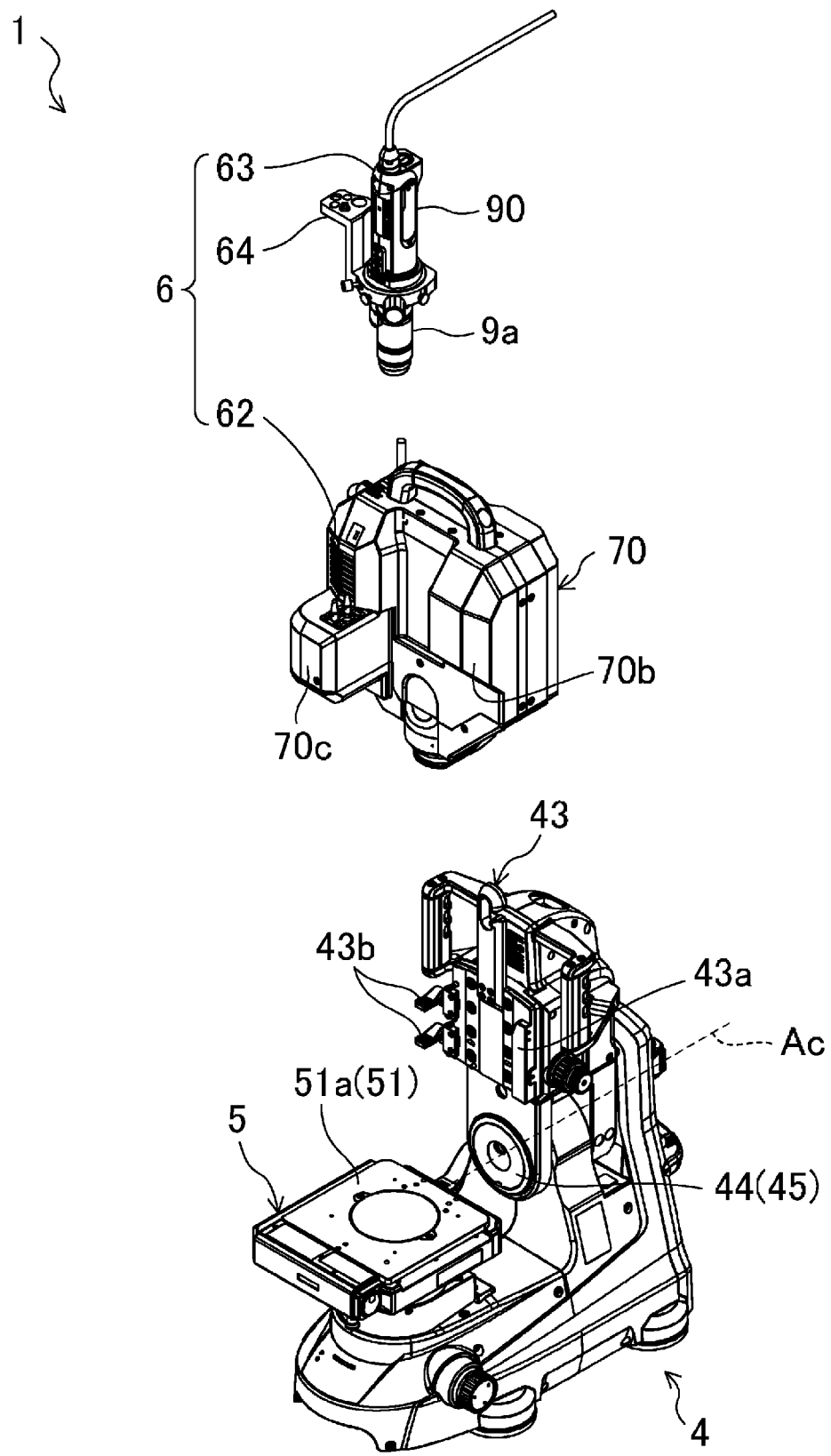
FIG. 5 is an exploded perspective view illustrating the optical system assembly.
Figure 6:
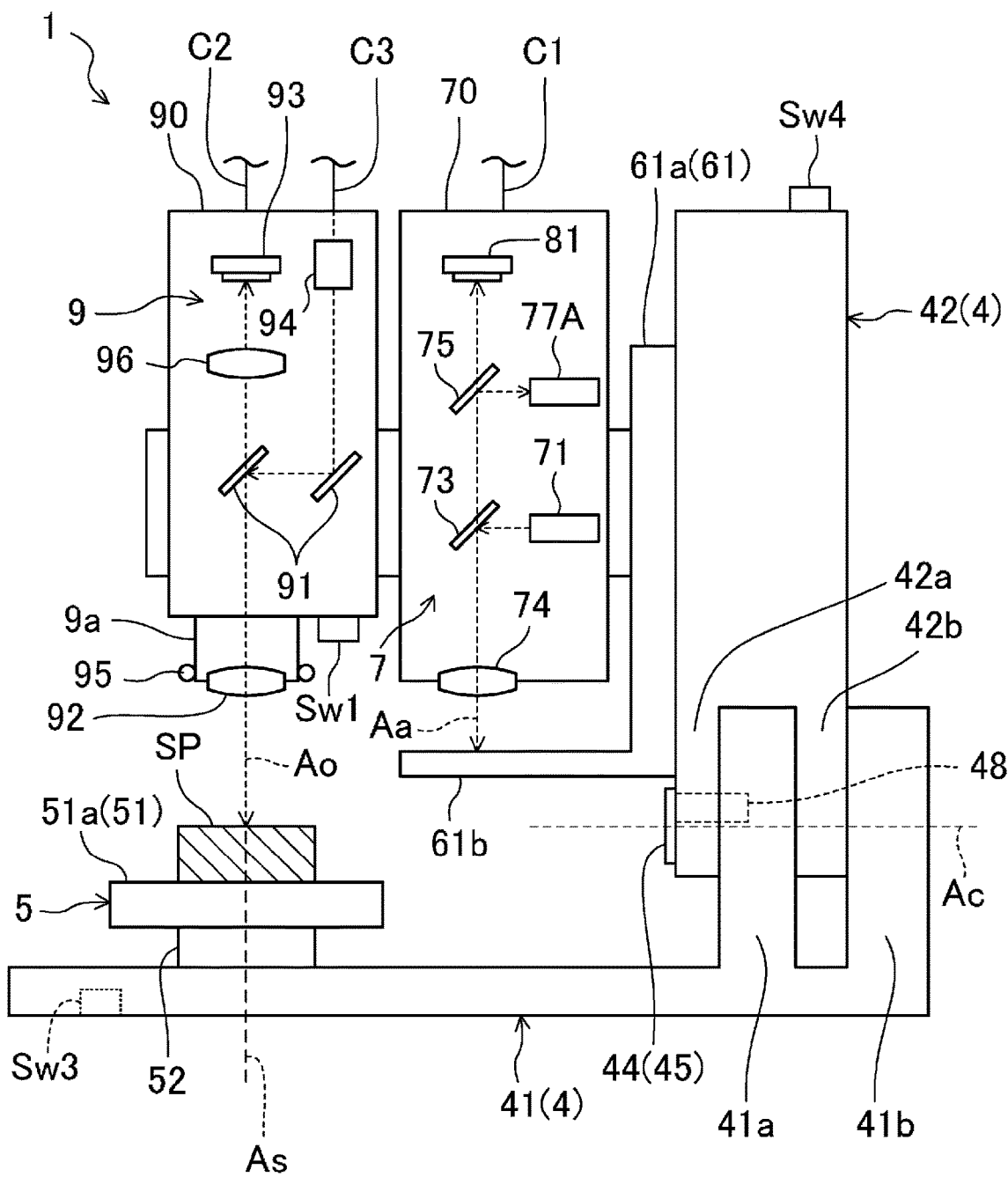
FIG. 6 is a side view schematically illustrating a configuration of the optical system assembly.
Figure 7:
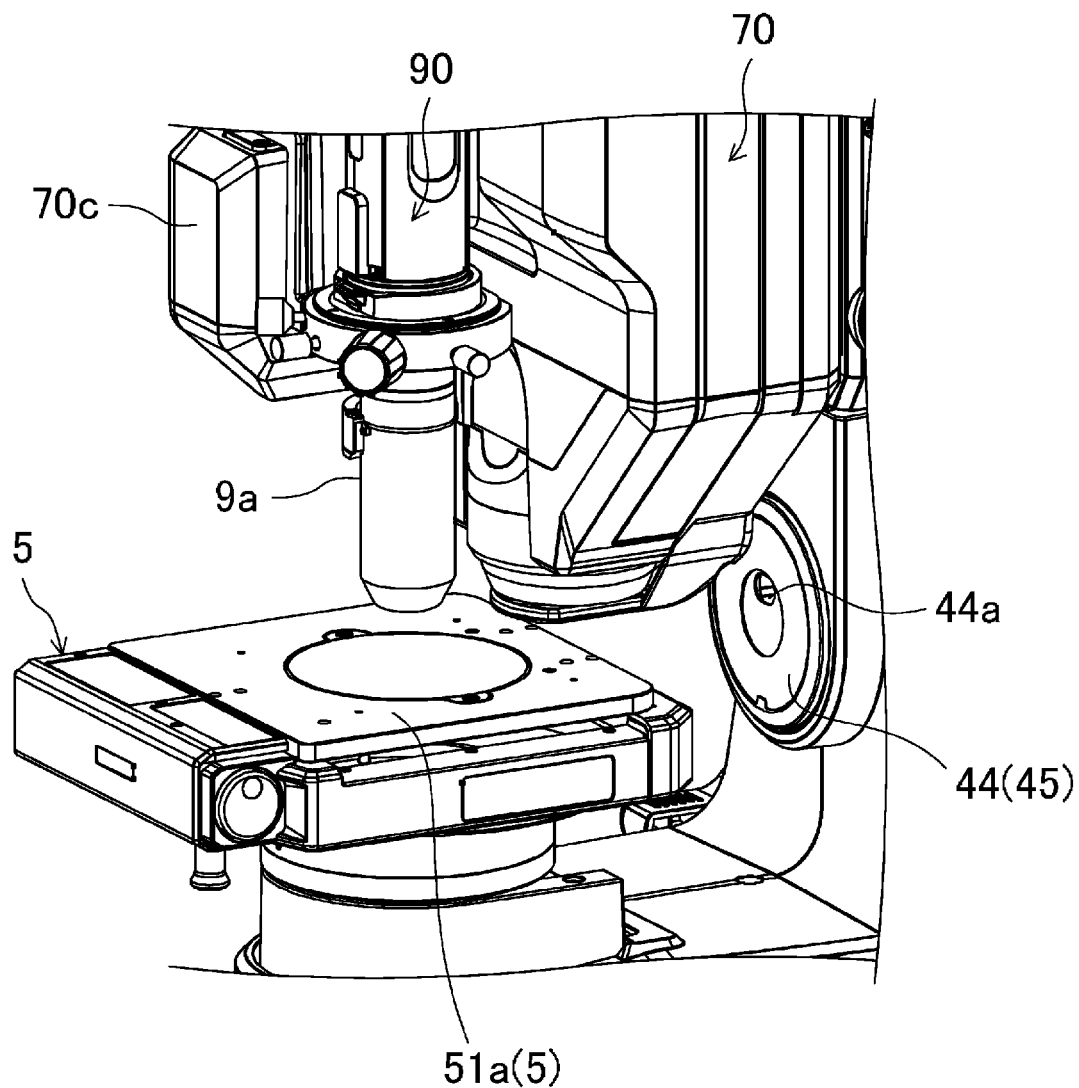
FIG. 7 is a perspective view for describing a layout of an overhead camera.

FIGS. 2 to 4 are a perspective view, a side view, and a front view respectively illustrating the optical system assembly 1. Further, FIG. 5 is an exploded perspective view of the optical system assembly 1, and FIG. 6 is a side view schematically illustrating a configuration of the optical system assembly 1. Further, FIG. 7 is a perspective view for describing a layout of an overhead camera 48.

As illustrated in FIGS. 1 to 6, the optical system assembly 1 includes: a stage 4 which supports various instruments and on which the sample SP is placed; and a head 6 attached to the stage 4. Here, the head 6 is formed by mounting an observation housing 90 in which an observation optical system 9 is accommodated onto an analysis housing 70 in which an analysis optical system 7 is accommodated. Here, the analysis optical system 7 is an optical system configured to perform the component analysis of the sample SP. The observation optical system 9 is an optical system configured to perform the magnifying observation of the sample SP. The head 6 is configured as a device group having both of an analysis function and a magnifying observation function of the sample SP.

Note that the front-rear direction and the left-right direction of the optical system assembly 1 are defined as illustrated in FIGS. 1 to 4 in the following description. That is, one side opposing the user is a front side of the optical system assembly 1, and an opposite side thereof is a rear side of the optical system assembly 1. When the user opposes the optical system assembly 1, a right side as viewed from the user is a right side of the optical system assembly 1, and a left side as viewed from the user is a left side of the optical system assembly 1. Note that the definitions of the front-rear direction and the left-right direction are intended to help understanding of the description, and do not limit an actual use state. Any direction may be used as the front.

Further, in the following description, the left-right direction of the optical system assembly 1 is defined as an "X direction", the front-rear direction of the optical system assembly 1 is defined as a "Y direction", a vertical direction of the optical system assembly 1 is defined as a "Z direction", and a direction rotating about an axis parallel to the Z axis is defined as a "φ direction". The X direction and the Y direction are orthogonal to each other on the same horizontal plane, and a direction along the horizontal plane is defined as a "horizontal direction". The Z axis is a direction of a normal line orthogonal to the horizontal plane. These definitions can also be changed as appropriate. The Z direction (vertical direction) is a direction extending along the perpendicular direction, and is an example of a "first direction" in the present embodiment.

The head 6 can move along a central axis Ac illustrated in FIGS. 2 to 6 or swing about the central axis Ac although will be described in detail later. As illustrated in FIG. 6 and the like, the central axis Ac extends along the above-described horizontal direction, particularly the front-rear direction.

(Stage 4)

The stage 4 includes a base 41 installed on a workbench or the like, a stand 42 connected to the base 41, and a placement stage 5 supported by the base 41 or the stand 42. The stage 4 is a member configured to define a relative positional relation between the placement stage 5 and the head 6, and is configured such that at least the observation optical system 9 and the analysis optical system 7 of the head 6 are attachable thereto.

The base 41 forms a substantially lower half of the stage 4, and is formed in a pedestal shape such that a dimension in the front-rear direction is longer than a dimension in the left-right direction as illustrated in FIG. 2. The base 41 has a bottom surface to be installed on the workbench or the like. The placement stage 5 is attached to a front portion of the base 41.

Further, a first supporter 41a and a second supporter 41b are provided in a state of being arranged side by side in order from the front side on the rear side portion (in particular, a portion located on the rear side of the placement stage 5) of the base 41 as illustrated in FIG. 6 and the like. Both the first and second supporters 41a and 41b are provided so as to protrude upward from the base 41. Circular bearing holes (not illustrated) arranged to be concentric with the central axis Ac are formed in the first and second supporters 41a and 41b.

The stand 42 forms an upper half of the stage 4, and is formed in a columnar shape extending in the vertical direction perpendicular to the base 41 (particularly, the bottom surface of the base 41) as illustrated in FIGS. 2 and 3, 6, and the like. The head 6 is attached to a front surface of an upper portion of the stand 42 via a separate mounting tool 43.

Further, a first attachment section 42a and a second attachment section 42b are provided in a lower portion of the stand 42 in a state of being arranged side by side in order from the front side as illustrated in FIG. 6 and the like. The first and second attachment sections 42a and 42b have configurations corresponding to the first and second supporters 41a and 41b, respectively. Specifically, the first and second supporters 41a and 41b and the first and second attachment sections 42a and 42b are laid out such that the first supporter 41a is sandwiched between the first attachment section 42a and the second attachment section 42b and the second attachment section 42b is sandwiched between the first supporter 41a and the second supporter 41b.

Further, circular bearing holes (not illustrated) concentric with and having the same diameter as the bearing holes formed in the first and second attachment sections 42a and 42b are formed in the first and second supporters 41a and 41b. A shaft member 44 is inserted into these bearing holes via a bearing (not illustrated) such as a cross-roller bearing. The shaft member 44 is arranged such that the axis thereof is concentric with the central axis Ac. The base 41 and the stand 42 are coupled so as to be relatively swingable by inserting the shaft member 44. The shaft member 44 forms a tilting mechanism 45 in the present embodiment together with the first and second supporters 41a and 41b and the first and second attachment sections 42a and 42b.

As the base 41 and the stand 42 are coupled via the tilting mechanism 45, the stand 42 is supported by the base 41 in the state of being swingable about the central axis Ac. The stand 42 swings about the central axis Ac to be tilted in the left-right direction with respect to a predetermined reference axis As (see FIGS. 10A and 10B). The reference axis As can be set as an axis extending perpendicularly to an upper surface (placement surface 51a) of the placement stage 5 in a non-tilted state illustrated in FIG. 4 and the like. Further, the central axis Ac functions as a central axis (rotation center) of swing caused by the tilting mechanism 45.

Specifically, the tilting mechanism 45 according to the present embodiment can tilt the stand 42 rightward by about 90° with respect to the reference axis As or leftward by about 60° with respect to the reference axis As. Since the head 6 is attached to the stand 42 as described above, the head 6 can also be tilted in the left-right direction with respect to the reference axis As. Tilting the head 6 is equivalent to tilting the analysis optical system 7 and the observation optical system 9, and eventually, tilting an analysis optical axis Aa and an observation optical axis Ao which will be described later.

Further, the overhead camera 48 is incorporated in the shaft member 44 forming the tilting mechanism 45 as illustrated in FIG. 6. This overhead camera 48 receives visible light reflected by the sample SP through a through-hole 44a provided on a front surface of the shaft member 44 (see FIG. 7). The overhead camera 48 captures an image of the sample SP by detecting a light reception amount of the received reflection light.

An imaging visual field of the overhead camera 48 is wider than imaging visual fields of the first camera 81 and a second camera 93 which will be described later. In other words, an enlargement magnification of the overhead camera 48 is smaller than enlargement magnifications of the first camera 81 and the second camera 93. Therefore, the overhead camera 48 can capture the sample SP over a wider range than the first camera 81 and the second camera 93.

Here, an imaging optical axis of the overhead camera 48 is arranged so as to be parallel to the central axis Ac of the swing by the tilting mechanism 45. In the present embodiment, the imaging optical axis of the overhead camera 48 extends forward from the shaft member 44, and is orthogonal to both the analysis optical axis Aa which is an imaging optical axis of the first camera 81 and the observation optical axis Ao which is an imaging optical axis of the second camera 93. Therefore, the overhead camera 48 can capture the image of the sample SP from a different angle from the first camera 81 and the second camera 93.

Further, the imaging optical axis of the overhead camera 48 does not vary depending on an operation of the tilting mechanism 45. Therefore, the imaging visual field of the overhead camera 48 is held constant regardless of a tilt angle of the stand 42 with respect to the reference axis As.

Specifically, the overhead camera 48 according to the present embodiment photoelectrically converts light incident through the through-hole 44a by a plurality of pixels arranged on a light receiving surface thereof, and converts the light into an electrical signal corresponding to an optical image of a subject (the sample SP).

The overhead camera 48 may have a plurality of light receiving elements arranged along the light receiving surface. In this case, each of the light receiving elements corresponds to a pixel so that an electrical signal based on the light reception amount in each of the light receiving elements can be generated. Specifically, the overhead camera 48 according to the present embodiment is configured using an image sensor including a complementary metal oxide semiconductor (CMOS), but is not limited to this configuration. As the overhead camera 48, for example, an image sensor including a charged-coupled device (CCD) can also be used.

Then, the overhead camera 48 inputs an electrical signal generated by detecting the light reception amount by each light receiving element to the controller 21 of the controller main body 2. The controller 21 generates image data corresponding to the optical image of the subject based on the input electrical signal. The controller 21 can cause the display 22 or the like to display the image data thus generated as the image obtained by capturing the image of the subject.

Note that the above-described configuration of the overhead camera 48 is merely an example. It suffices that the overhead camera 48 has a wider imaging visual field than the first camera 81 and the second camera 93, and the layout of the overhead camera 48, a direction of its imaging optical axis, and the like can be freely changed. For example, the overhead camera 48 may be configured using a USB camera connected to the optical system assembly 1 or the controller main body 2 in a wired or wireless manner.

The mounting tool 43 has a rail 43a that guides the head 6 along a longitudinal direction of the stand 42, and a lock lever 43b configured to locking a relative position of the head 6 with respect to the rail 43a. Here, the longitudinal direction of the stand 42 coincides with the vertical direction (first direction) in the non-tilted state, and also coincides with a direction extending along the analysis optical axis Aa, the observation optical axis Ao, and the reference axis As. The longitudinal direction of the stand 42 does not match the vertical direction and the direction extending along the reference axis As in the tilted state, but still coincides with the direction extending along the analysis optical axis Aa and the observation optical axis Ao. The longitudinal direction of the stand 42 is also referred to as a "substantially vertical direction" in the following description.

A rear surface portion (specifically, a head attachment member 61) of the head 6 is inserted into the rail 43a. The rail 43a can move the rear surface portion in the substantially vertical direction. Then, the head 6 can be fixed at a desired position by operating the lock lever 43b in a state where the head 6 is set at a desired position. Further, the position of the head 6 can also be adjusted by operating a first operation dial 46 illustrated in FIGS. 2 to 3.

Further, the stage 4 or the head 6 incorporates a head drive 47 configured to move the head 6 in the substantially vertical direction. The head drive 47 includes an actuator (for example, a stepping motor) (not illustrated) controlled by the controller main body 2 and a motion conversion mechanism that converts the rotation of an output shaft of the stepping motor into a linear motion in the substantially vertical direction, and moves the head 6 based on a drive pulse input from the controller main body 2. When the head drive 47 moves the head 6, the head 6, and eventually, analysis optical axis Aa and the observation optical axis Ao can be moved along the substantially vertical direction. The head drive 47 forms an "electric drive" in the present embodiment together with a placement stage drive 53 which will be described later.

The placement stage 5 is arranged on the front side of the center of the base 41 in the front-rear direction, and is attached to an upper surface of the base 41. The placement stage 5 is configured as an electric placement stage, and can cause the sample SP placed on the placement surface 51a to move along the horizontal direction, to move up and down along the vertical direction, or to rotate along the <p direction.

Specifically, as illustrated in FIGS. 2 to 4, the placement stage 5 according to the present embodiment includes: a placement stage main body 51 having the placement surface 51a configured for mounting of the sample SP; a placement stage supporter 52 that is arranged between the base 41 and the placement stage main body 51 and displaces the placement stage main body 51; and a placement stage drive 53 illustrated in FIG. 12 which will be described later.

The placement stage main body 51 is configured as a so-called XY stage. An upper surface of the placement stage main body 51 forms the placement surface 51a on which the sample SP is placed. The placement surface 51a is formed to extend along the substantially horizontal direction. The sample SP is placed on the placement surface 51a in an atmospheric open state, that is, in a state of not being accommodated in a vacuum chamber or the like.

The placement stage supporter 52 is a member that couples the base 41 and the placement stage main body 51, and is formed in a substantially columnar shape extending along the vertical direction. The placement stage supporter 52 can accommodate the placement stage drive 53.

The placement stage drive 53 includes a plurality of actuators (for example, stepping motors) (not illustrated) controlled by the controller main body 2 and a motion conversion mechanism that converts the rotation of an output shaft of each stepping motor into a linear motion, and moves the placement stage main body 51 based on a drive pulse input from the controller main body 2. As the placement stage main body 51 is moved by the placement stage drive 53, the placement stage main body 51, and eventually, the sample SP placed on the placement surface 51a can be moved along the horizontal direction and the vertical direction. The placement stage drive 53 forms the "electric drive" in the present embodiment together with the head drive 47 described above.

Similarly, the placement stage drive 53 can also rotate the placement stage main body 51 about a predetermined rotation axis along the cp direction based on a drive pulse input from the controller main body 2. As the placement stage drive 53 rotates the placement stage main body 51, the sample SP placed on the placement surface 51a can be rotated in the p direction. Note that the configuration including the placement stage drive 53 is not essential. The placement stage main body 51 may be configured to be manually rotated.

In particular, the placement surface 51a according to the present embodiment is configured to be rotatable about the reference axis As illustrated in FIG. 6 or the like as the rotation axis. That is, the reference axis As, which is a reference of tilting, and the rotation axis of the placement surface 51a are set to be coaxial in the present embodiment.

Further, the placement stage main body 51 can be manually moved and rotated by operating a second operation dial 54 or the like illustrated in FIG. 2. Details of the second operation dial 54 are omitted.

Returning to the description of the base 41 and the stand 42, a first tilt sensor Sw3 is incorporated in the base 41. The first tilt sensor Sw3 can detect a tilt of the reference axis As perpendicular to the placement surface 51a with respect to the direction of gravity. On the other hand, a second tilt sensor Sw4 is attached to the stand 42. The second tilt sensor Sw4 can detect a tilt of the analysis optical system 7 with respect to the direction of gravity (more specifically, a tilt of the analysis optical axis Aa with respect to the direction of gravity). Detection signals of the first tilt sensor Sw3 and the second tilt sensor Sw4 are both input to the controller 21.

(Head 6)

The head 6 includes the head attachment member 61, an analysis unit 62 in which the analysis optical system 7 is accommodated in the analysis housing 70, an observation unit 63 in which the observation optical system 9 is accommodated in the observation housing 90, a housing coupler 64, and a slide mechanism (horizontal drive mechanism) 65 (the analysis unit 62 and the observation unit 63 are illustrated only in FIG. 5). The head attachment member 61 is a member configured to connect the analysis housing 70 to the stand 42. The analysis unit 62 is a device configured to perform the component analysis of the sample SP by the analysis optical system 7. The observation unit 63 is a device configured to perform the observation of the sample SP by the observation optical system 9. The housing coupler 64 is a member configured to connect the observation housing 90 to the analysis housing 70. The slide mechanism 65 is a mechanism configured to slide the analysis housing 70 with respect to the stand 42.

Specifically, the head attachment member 61 according to the present embodiment is arranged on the rear side of the head 6, and is configured as a plate-like member for mounting the head 6 to the stand 42. As described above, the head attachment member 61 is fixed to the mounting tool 43 of the stand 42.

The head attachment member 61 includes: a plate main body 61a extending substantially parallel to a rear surface of the head 6; and a cover member 61b protruding forward from a lower end of the plate main body 61a. The plate main body 61a is in close contact with or in proximity to the rear surface of the head 6 in a first mode to be described later in which the reflective object lens 74 faces the sample SP. The plate main body 61a is separated from the rear surface of the head 6 in the front-rear direction in a second mode to be described later in which the objective lens 92 faces the sample SP.

Figure 9:
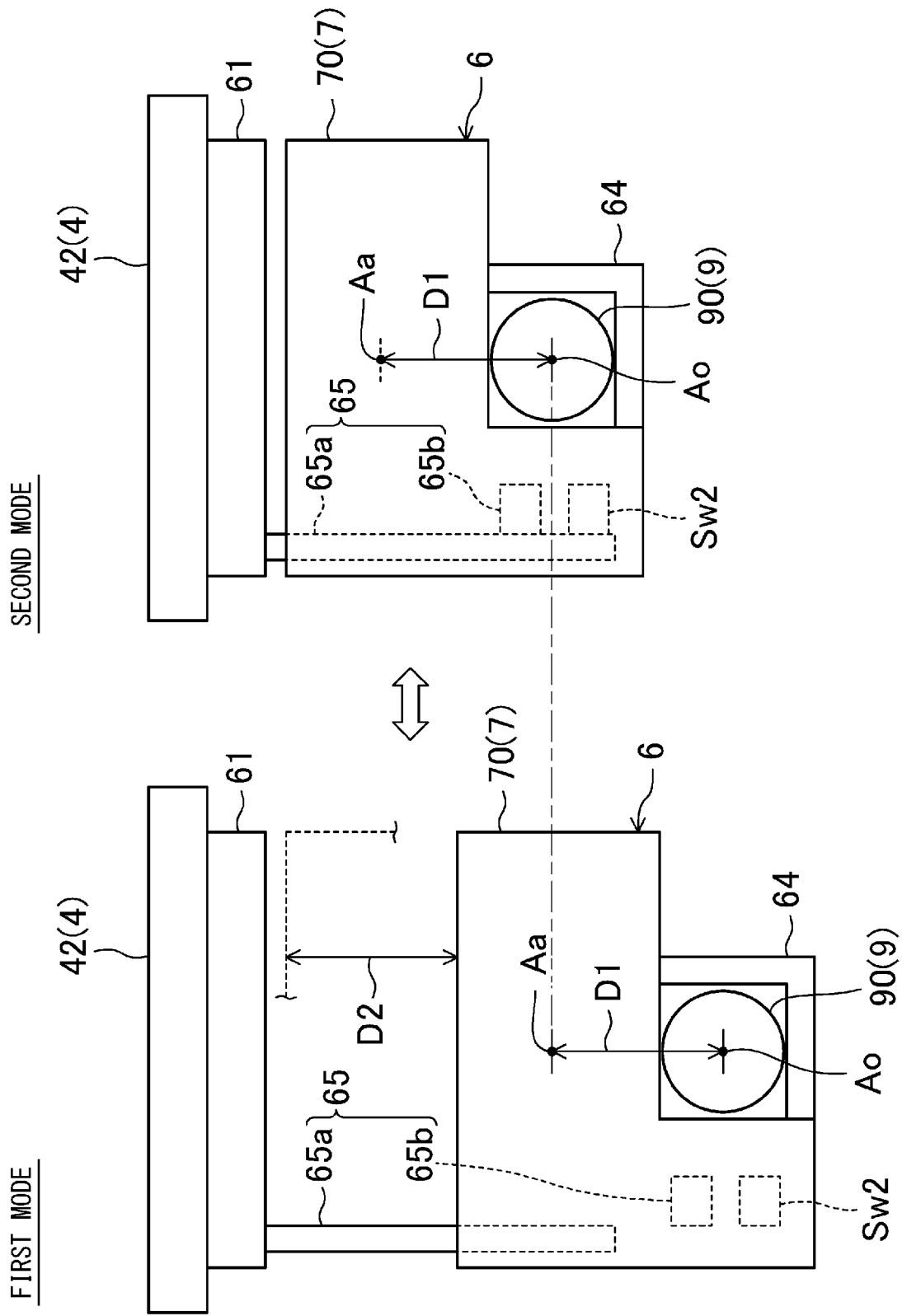
FIG. 9 is a schematic view for describing a configuration of a slide mechanism.

Further, a guide rail 65a forming the slide mechanism 65 is attached to a left end of the head attachment member 61 as illustrated in FIG. 9. The guide rail 65a couples the head attachment member 61 and other elements (specifically, the analysis optical system 7, the observation optical system 9, and the housing coupler 64) in the head 6 so as to be relatively displaceable in the horizontal direction.

Hereinafter, the configurations of the analysis unit 62, the observation unit 63, the housing coupler 64, and the slide mechanism 65 will be sequentially described.

—Analysis Unit 62—

Figure 8:
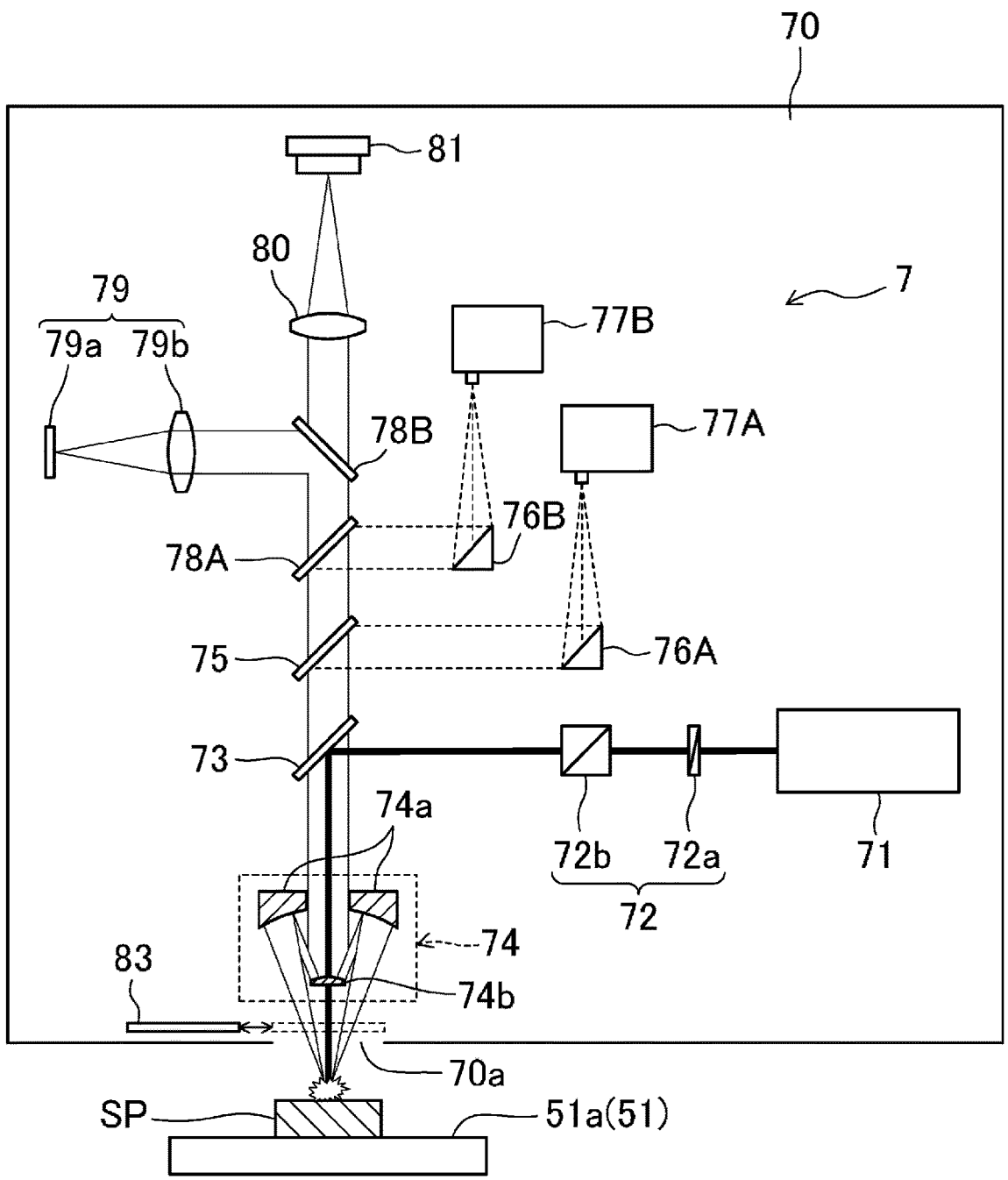
FIG. 8 is a schematic view illustrating a configuration of an analysis optical system.

FIG. 8 is a schematic view illustrating the configuration of the analysis optical system 7.

The analysis unit 62 includes the analysis optical system 7 and the analysis housing 70 in which the analysis optical system 7 is accommodated. The analysis optical system 7 is a set of components configured to analyze the sample SP as an analyte, and the respective components are accommodated in the analysis housing 70. The analysis housing 70 accommodates the first camera 81 as a second imaging section and first and second detectors 77A and 77B as detectors. Further, elements configured to analyze the sample SP also include the controller 21 of the controller main body 2.

The analysis optical system 7 can perform analysis using, for example, an LIBS method. A communication cable C1, configured to transmit and receive an electrical signal to and from the controller main body 2, is connected to the analysis optical system 7. The communication cable C1 is not essential, and the analysis optical system 7 and the controller main body 2 may be connected by wireless communication.

Note that the term "optical system" used herein is used in a broad sense. That is, the analysis optical system 7 is defined as a system including a light source, an image capturing element, and the like in addition to an optical element such as a lens. The same applies to the observation optical system 9.

As illustrated in FIG. 8, the analysis optical system 7 according to the present embodiment includes the electromagnetic wave emitter 71, an output adjuster 72, the deflection element 73, the reflective object lens 74 as the collection head, a dispersing element 75, a first parabolic mirror 76A, the first detector 77A, a first beam splitter 78A, a second parabolic mirror 76B, the second detector 77B, a second beam splitter 78B, a coaxial illuminator 79, an imaging lens 80, a first camera 81, and the side illuminator 84. Some of the constituent elements of the analysis optical system 7 are also illustrated in FIG. 6. Further, the side illuminator 84 is illustrated only in FIG. 11.

The electromagnetic wave emitter 71 emits a primary electromagnetic wave to the sample SP. In particular, the electromagnetic wave emitter 71 according to the present embodiment includes a laser light source that emits laser light as the primary electromagnetic wave to the sample SP. The electromagnetic wave emitter 71 is an example of a "laser light emitter" in the present embodiment.

Although not illustrated in detail, the electromagnetic wave emitter 71 according to the present embodiment includes: an excitation light source configured using a laser diode (LD) or the like; a focusing lens that collects laser output from the excitation light source and emits the laser as laser excitation light; a laser medium that generates a fundamental wave based on the laser excitation light; a Q switch configured to pulse-oscillate the fundamental wave; a rear mirror and an output mirror configured for resonation of the fundamental wave; and a wavelength conversion element that converts a wavelength of laser light output from the output mirror.

Here, as the laser medium, for example, rod-shaped Nd:YAG is preferably used in order to obtain high energy per pulse. Note that, in the present embodiment, a wavelength (so-called fundamental wavelength) of photons emitted from the laser medium by stimulated emission is set to 1064 nm in the infrared range in the present embodiment.

Further, as the Q switch, a passive Q switch in which a transmittance increases when an intensity of the fundamental wave exceeds a predetermined threshold can be used. The passive Q switch is configured using, for example, a supersaturated absorber such as Cr:YAG. Since the passive Q switch is used, it is possible to automatically perform pulse oscillation at a timing when a predetermined amount of energy or more is accumulated in the laser medium. Further, a so-called active Q switch capable of externally controlling an attenuation rate can also be used.

Further, two nonlinear optical crystals, such as LBO ($LiB_3O_5$), are used as the wavelength conversion element. Since two crystals are used, a third harmonic wave can be generated from the fundamental wave. A wavelength of the third harmonic wave is set to 355 nm in the ultraviolet region in the present embodiment.

That is, the electromagnetic wave emitter 71 according to the present embodiment can output the laser light formed of ultraviolet rays as the primary electromagnetic wave. As a result, it is possible to optically analyze the transparent sample SP like glass by the LIBS method. Further, the proportion of laser light in the ultraviolet range reaching a human retina is extremely small. The safety of the device can be enhanced by adopting the configuration in which the laser light does not form an image on the retina.

The output adjuster 72 is arranged on an optical path connecting the electromagnetic wave emitter 71 and the deflection element 73, and can adjust an output of the laser light (primary electromagnetic wave). Specifically, the output adjuster 72 according to the present embodiment includes a half-wave plate 72a and a polarization beam splitter 72b. The half-wave plate 72a is configured to rotate relative to the polarization beam splitter 72b, and the amount of light passing through the polarization beam splitter 72b can be adjusted by controlling a rotation angle thereof.

The laser light (primary electromagnetic wave) whose output has been adjusted by the output adjuster 72 is reflected by a mirror (not illustrated) and is incident on the deflection element 73.

Specifically, the deflection element 73 is laid out so as to reflect the laser light, which has been output from the electromagnetic wave emitter 71 and passed through the output adjuster 72, to be guided to the sample SP via the reflective object lens 74, and allow passage of light (which is light emitted due to plasma occurring on the surface of the sample SP, and is hereinafter referred to as "plasma light") generated in the sample SP in response to the laser light and guide the secondary electromagnetic wave to the first detector 77A and the second detector 77B. The deflection element 73 is also laid out to allow passage of visible light collected for capturing and guide most of the visible light to the first camera 81.

Ultraviolet laser light reflected by the deflection element 73 propagates along the analysis optical axis Aa as parallel light and reaches the reflective object lens 74.

The reflective object lens 74 as the collection head is configured to collect the secondary electromagnetic wave generated in the sample SP as the sample SP is irradiated with the primary electromagnetic wave emitted from the electromagnetic wave emitter 71. In particular, the reflective object lens 74 according to the present embodiment is configured to collect the laser light as the primary electromagnetic wave and irradiate the sample SP with the laser light, and collect the plasma light (secondary electromagnetic wave) generated in the sample SP in response to the laser light (primary electromagnetic wave) applied to the sample SP. In this case, the secondary electromagnetic wave corresponds to the plasma light emitted due to the plasma occurring on the surface of the sample SP.

The reflective object lens 74 is configured to make an optical system related to the emission of the primary electromagnetic wave from the electromagnetic wave emitter 71 coaxial with an optical system related to reception of the reflection light in the first camera 81 and reception of the secondary electromagnetic wave in the first and second detectors 77A and 77B. In other words, the reflective object lens 74 is shared by the two types of optical systems.

The reflective object lens 74 has the analysis optical axis Aa extending along the substantially vertical direction. The analysis optical axis Aa is provided to be parallel to the observation optical axis Ao of an objective lens 92 of the observation optical system 9.

Specifically, the reflective object lens 74 according to the present embodiment is a Schwarzschild objective lens including two mirrors. As illustrated in FIG. 8, the reflective object lens 74 includes primary mirror 74a having a partial annular shape and a relatively large diameter, and a secondary mirror 74b having a disk shape and a relatively small diameter.

The primary mirror 74a allows the laser light (primary electromagnetic wave) to pass through an opening provided at the center thereof, and reflects the plasma light (secondary electromagnetic wave) generated in the sample SP by a mirror surface provided in the periphery thereof. The latter plasma light is reflected again by a mirror surface of the secondary mirror 74b, and passes through the opening of the primary mirror 74a in a state of being coaxial with the laser light.

The secondary mirror 74b is configured to transmit the laser light having passed through the opening of the primary mirror 74a and collect and reflect the plasma light reflected by the primary mirror 74a. The former laser light is applied to the sample SP, but the latter plasma light passes through the opening of the primary mirror 74a and reaches the deflection element 73 as described above.

Therefore, when laser light is input to the reflective object lens 74, the laser light is transmitted through the secondary mirror 74b arranged at the center of the reflective object lens 74 and reaches the surface of the sample SP. When the sample SP is locally turned into plasma by the laser light reaching the sample SP so that plasma light is emitted, the plasma light passes through an opening provided around the secondary mirror 74b and reaches the primary mirror 74a. The plasma light that has reached the primary mirror 74a is reflected by the mirror surface to reach the secondary mirror 74b, and is reflected by the secondary mirror 74b again to reach the deflection element 73 from the reflective object lens 74. The reflection light having reached the deflection element 73 passes through the deflection element 73 and reaches the dispersing element 75.

The dispersing element 75 is arranged between the deflection element 73 and the first beam splitter 78A in the optical axis direction (direction along the analysis optical axis Aa) of the reflective object lens 74, and guides a part of the plasma light generated in the sample SP to the first detector 77A and the other part to the second detector 77B or the like. Most of the latter plasma light is guided to the second detector 77B, but the rest reaches the first camera 81.

Specifically, the plasma light (secondary electromagnetic wave) returned from the sample SP includes various wavelength components in addition to a wavelength corresponding to the laser light as the primary electromagnetic wave. Therefore, the dispersing element 75 according to the present embodiment reflects an electromagnetic wave in a short wavelength band out of the secondary electromagnetic wave returning from the sample SP, and guides the electromagnetic wave to the first detector 77A. The dispersing element 75 also transmits electromagnetic waves in other bands and guides the electromagnetic waves to the second detector 77B and the like.

The first parabolic mirror 76A is a so-called parabolic mirror, and is arranged between the dispersing element 75 and the first detector 77A. The first parabolic mirror 76A collects the secondary electromagnetic wave reflected by the dispersing element 75, and causes the collected secondary electromagnetic wave to be incident on the first detector 77A.

The first detector 77A receives the plasma light (secondary electromagnetic wave) generated in the sample SP and collected by the reflective object lens 74, and generates an intensity distribution spectrum which is an intensity distribution for each wavelength of the plasma light.

In particular, in a case where the electromagnetic wave emitter 71 is configured using the laser light source and the reflective object lens 74 is configured to collect the plasma light as the secondary electromagnetic wave generated in response to the irradiation of laser light as the primary electromagnetic wave, the first detector 77A reflects light at different angles for each wavelength to separate the light, and causes each beam of the separated light to be incident on an imaging element having a plurality of pixels. As a result, a wavelength of light received by each pixel can be made different, and a light reception intensity can be acquired for each wavelength. In this case, the intensity distribution spectrum corresponds to an intensity distribution for each wavelength of light.

Note that the intensity distribution spectrum may be configured using the light reception intensity acquired for each wave number. Since the wavelength and the wave number uniquely correspond to each other, the intensity distribution spectrum can be regarded as the intensity distribution for each wavelength even when the light reception intensity acquired for each wave number is used. The same applies to the second detector 77B which will be described later.

As the first detector 77A, for example, a detector based on a Czerny-Turner detector can be used. An entrance slit of the first detector 77A is aligned with a focal position of the first parabolic mirror 76A. The intensity distribution spectrum generated by the first detector 77A is input to the controller 21 of the controller main body 2.

The first beam splitter 78A reflects a part of light, transmitted through the dispersing element 75 (secondary electromagnetic wave on the infrared side including the visible light band), to be guided to the second detector 77B, and transmits the other part (a part of the visible light band) to be guided to the second beam splitter 78B. A relatively large amount of plasma light is guided to the second detector 77B out of plasma light belonging to the visible light band, and a relatively small amount of plasma light is guided to the first camera 81 via the second beam splitter 78B.

The second parabolic mirror 76B is a so-called parabolic mirror and is arranged between the first beam splitter 78A and the second detector 77B, which is similar to the first parabolic mirror 76A. The second parabolic mirror 76B collects a secondary electromagnetic wave reflected by the first beam splitter 78A, and causes the collected secondary electromagnetic wave to be incident on the second detector 77B.

The second detector 77B receives the secondary electromagnetic wave generated in the sample SP as the sample SP is irradiated with the primary electromagnetic wave emitted from the electromagnetic wave emitter 71 and generates an intensity distribution spectrum which is an intensity distribution of the secondary electromagnetic wave for each wavelength, which is similar to the first detector 77A.

In particular, in a case where the electromagnetic wave emitter 71 is configured using the laser light source and the reflective object lens 74 is configured to collect the plasma light as the secondary electromagnetic wave generated in response to the irradiation of laser light as the primary electromagnetic wave, the second detector 77B reflects light at different angles for each wavelength to separate the light, and causes each beam of the separated light to be incident on an imaging element having a plurality of pixels. As a result, a wavelength of light received by each pixel can be made different, and a light reception intensity can be acquired for each wavelength. In this case, the intensity distribution spectrum corresponds to an intensity distribution for each wavelength of light.

As the second detector 77B, for example, a detector based on a Czerny-Turner detector can be used. An entrance slit of the second detector 77B is aligned with a focal position of the first parabolic mirror 76A. The intensity distribution spectrum generated by the second detector 77B is input to the controller 21 of the controller main body 2 similarly to the intensity distribution spectrum generated by the first detector 77A.

The ultraviolet intensity distribution spectrum generated by the first detector 77A and the infrared intensity distribution spectrum generated by the second detector 77B are input to the controller 21. The controller 21 performs component analysis of the sample SP using a basic principle, which will be described later, based on the intensity distribution spectra. The controller 21 can perform the component analysis using a wider frequency range by using the ultraviolet intensity distribution spectrum and the infrared intensity distribution spectrum in combination.

The second beam splitter 78B reflects illumination light (visible light), which has been emitted from an LED light source 79a and passed through the optical element 79b, and irradiates the sample SP with the illumination light via the first beam splitter 78A, the dispersing element 75, the deflection element 73, and the reflective object lens 74. Reflection light (visible light) reflected by the sample SP returns to the analysis optical system 7 via the reflective object lens 74.

The coaxial illuminator 79 includes the LED light source 79a that emits the illumination light, and the optical element 79b through which the illumination light emitted from the LED light source 79a passes. The coaxial illuminator 79 functions as a so-called "coaxial epi-illuminator". The illumination light emitted from the LED light source 79a propagates coaxially with the laser light (primary electromagnetic wave) output from the electromagnetic wave emitter 71 and emitted to the sample SP and the light (secondary electromagnetic wave) returning from the sample SP.

Specifically, the coaxial illuminator 79 emits the illumination light via an optical path coaxial with the primary electromagnetic wave emitted from the electromagnetic wave emitter 71. Specifically, a portion connecting the deflection element 73 and the reflective object lens 74 in the optical path of the illumination light is coaxial with the optical path of the primary electromagnetic wave. Further, a portion connecting the first beam splitter 78A and the reflective object lens 74 in the optical path of the illumination light is coaxial with the optical path of the secondary electromagnetic wave.

Among beams of the reflection light returned to the analysis optical system 7, the second beam splitter 78B further transmits reflection light transmitted through the first beam splitter 78A and plasma light transmitted through the first beam splitter 78A without reaching the first and second detectors 77A and 77B, and causes the reflection light and the plasma light to enter the first camera 81 via the imaging lens 80.

Although the coaxial illuminator 79 is incorporated in the analysis housing 70 in the example illustrated in FIG. 8, the present disclosure is not limited to such a configuration. For example, a light source may be laid out outside the analysis housing 70, and the light source and the analysis optical system 7 may be coupled to the optical system via an optical fiber cable.

The side illuminator 84 is arranged to surround the reflective object lens 74. The side illuminator 84 emits illumination light from the side of the sample SP (in other words, a direction tilted with respect to the analysis optical axis Aa) although not illustrated.

The first camera 81 receives the reflection light reflected by the sample SP via the reflective object lens 74. The first camera 81 captures an image of the sample SP by detecting a light reception amount of the received reflection light. The first camera 81 is an example of the "second imaging section (second camera)" in the present embodiment.

Specifically, the first camera 81 according to the present embodiment photoelectrically converts light incident through the imaging lens 80 by a plurality of pixels arranged on a light receiving surface thereof, and converts the light into an electrical signal corresponding to an optical image of a subject (the sample SP).

The first camera 81 may have a plurality of light receiving elements arranged along the light receiving surface. In this case, each of the light receiving elements corresponds to a pixel so that an electrical signal based on the light reception amount in each of the light receiving elements can be generated. Specifically, the first camera 81 according to the present embodiment is configured using an image sensor including a complementary metal oxide semiconductor (CMOS), but is not limited to this configuration. As the first camera 81, for example, an image sensor including a charged-coupled device (CCD) can also be used.

Then, the first camera 81 inputs an electrical signal generated by detecting the light reception amount by each light receiving element to the controller 21 of the controller main body 2. The controller 21 generates image data corresponding to the optical image of the subject based on the input electrical signal. The controller 21 can cause the display 22 or the like to display the image data thus generated as the image obtained by capturing the image of the subject.

The optical components that have been described so far are accommodated in the analysis housing 70. A through-hole 70a is provided in a lower surface of the analysis housing 70. The reflective object lens 74 faces the placement surface 51a via the through-hole 70a.

A shielding member 83 illustrated in FIG. 8 may be arranged in the analysis housing 70. The shielding member 83 is arranged between the through-hole 70a and the reflective object lens 74, and can be inserted on an optical path of the laser light based on the electrical signal input from the controller main body 2 (see the dotted line in FIG. 8). The shielding member 83 is configured not to transmit at least the laser light.

The emission of laser light from the analysis housing 70 can be restricted by inserting the shielding member 83 on the optical path. The shielding member 83 may be arranged between the electromagnetic wave emitter 71 and the output adjuster 72.

As illustrated in FIG. 9, the analysis housing 70 also defines an accommodation space of the slide mechanism 65 in addition to an accommodation space of the analysis optical system 7. In that sense, the analysis housing 70 can also be regarded as an element of the slide mechanism 65.

Specifically, the analysis housing 70 according to the present embodiment is formed in a box shape in which a dimension in the front-rear direction is shorter than a dimension in the left-right direction. Then, a left side portion of a front surface 70b of the analysis housing 70 protrudes forward so as to secure a movement margin of the guide rail 65a in the front-rear direction. Hereinafter, such a protruding portion is referred to as a "protrusion", and is denoted by reference sign 70c. The protrusion 70c is arranged at a lower half of the front surface 70b in the vertical direction (in other words, only a lower half of the left side portion of the front surface 70b protrudes).

—Basic Principle of Analysis by Analysis Optical System 7—

The controller 21 executes component analysis of the sample SP based on the intensity distribution spectra input from the first detector 77A and the second detector 77B as detectors. As a specific analysis method, the LIBS method can be used as described above. The LIBS method is a method for analyzing a component contained in the sample SP at an element level (so-called elemental analysis method).

Generally, when high energy is applied to a substance, an electron is separated from an atomic nucleus, so that the substance is turned into a plasma state. The electron separated from the atomic nucleus temporarily becomes a high-energy and unstable state, but loses energy from such a state and is captured again by the atomic nucleus to transition to a low-energy and stable state (in other words, returns from the plasma state to a non-plasma state).

Here, the energy lost from the electron is emitted from the electron as the electromagnetic wave, but the magnitude of the energy of the electromagnetic wave is defined by an energy level based on a shell structure unique to each element. That is, the energy of the electromagnetic wave emitted when the electron returns from the plasma to the non-plasma state has a unique value for each element (more precisely, a trajectory of the electron bound to the atomic nucleus). The magnitude of energy of an electromagnetic wave is defined by a wavelength of the electromagnetic wave. Therefore, the components contained in the substance can be analyzed at the element level by analyzing a wavelength distribution of the electromagnetic wave emitted from the electron, that is, a wavelength distribution of the light emitted from the substance at the time of the plasma state. Such a technique is generally called an atomic emission spectroscopy (AES) method.

The LIBS method is an analysis method belonging to the AES method. Specifically, in the LIBS method, the substance (sample SP) is irradiated with laser (primary electromagnetic wave) to apply energy to the substance. Here, a site irradiated with the laser is locally turned into plasma, and thus, component analysis of the substance can be performed by analyzing the intensity distribution spectrum of the plasma light (secondary electromagnetic wave) emitted with the turning into plasma.

That is, as described above, the wavelength of each plasma light (secondary electromagnetic wave) has the unique value for each element, and thus, an element corresponding to a peak becomes a component of the sample SP when the intensity distribution spectrum forms the peak at a specific wavelength. Then, when the intensity distribution spectrum includes a plurality of peaks, a component ratio of each element can be calculated by comparing the intensity (light reception amount) of each of the peaks.

According to the LIBS method, vacuuming is unnecessary, and component analysis can be performed in the atmospheric open state. Further, although the sample SP is subjected to a destructive test, it is unnecessary to perform a treatment such as dissolving the entire sample SP so that position information of the sample SP remains (the test is only locally destructive).

—Observation Unit 63—

The observation unit 63 includes the observation optical system 9 and the observation housing 90 in which the observation optical system 9 is accommodated. The observation optical system 9 is a set of components configured to observe the sample SP as the observation target, and the respective components are accommodated in the observation housing 90. The observation housing 90 is configured separately from the analysis housing 70 described above, and accommodates the second camera 93 as an imaging section. Further, elements configured to observe the sample SP also include the controller 21 of the controller main body 2.

The observation optical system 9 includes a lens unit 9a having the objective lens 92. As illustrated in FIG. 3 and the like, the lens unit 9a corresponds to a cylindrical lens barrel arranged on the lower end side of the observation housing 90. The lens unit 9a is held by the analysis housing 70. The lens unit 9a can be detached alone from the observation housing 90.

A communication cable C2 configured to transmit and receive an electrical signal to and from the controller main body 2 and an optical fiber cable C3 configured to guide illumination light from the outside are connected to the observation housing 90. Note that the communication cable C2 is not essential, and the observation optical system 9 and the controller main body 2 may be connected by wireless communication.

Specifically, the observation optical system 9 includes a mirror group 91, the objective lens 92, the second camera 93 as the imaging section, a second coaxial illuminator 94, a second side illuminator 95, and a magnifying optical system 96 as a magnification changer as illustrated in FIG. 6.

The objective lens 92 has the observation optical axis Ao extending along the substantially vertical direction, collects illumination light to be emitted to the sample SP placed on the placement stage main body 51, and collects light (reflection light) from the sample SP. The observation optical axis Ao is provided to be parallel to the analysis optical axis Aa of the reflective object lens 74 of the analysis optical system 7. The reflection light collected by the objective lens 92 is received by the second camera 93.

The mirror group 91 transmits the reflection light collected by the objective lens 92 to be guided to the second camera 93. The mirror group 91 according to the present embodiment can be configured using a total reflection mirror, a beam splitter, and the like as illustrated in FIG. 6. The mirror group 91 also reflects the illumination light emitted from the second coaxial illuminator 94 to be guided to the objective lens 92.

The second camera 93 receives the reflection light reflected by the sample SP via the objective lens 92. The second camera 93 captures an image of the sample SP by detecting a light reception amount of the received reflection light. The second camera 93 is an example of the "imaging section (camera)" in the present embodiment.

On the other hand, the first camera 81 is an example of the "second imaging section" in the present embodiment as described above. Although a configuration in which the second camera 93 is regarded as the imaging section and the first camera 81 is regarded as the second imaging section will be mainly described in the present specification, the first camera 81 may be regarded as the imaging section and the second camera 93 may be regarded as the second imaging section as will be described later.

Specifically, the second camera 93 according to the present embodiment photoelectrically converts light incident from the sample SP through the objective lens 92 by a plurality of pixels arranged on a light receiving surface thereof, and converts the light into an electrical signal corresponding to an optical image of the subject (sample SP).

The second camera 93 may have a plurality of light receiving elements arranged along the light receiving surface. In this case, each of the light receiving elements corresponds to a pixel so that an electrical signal based on the light reception amount in each of the light receiving elements can be generated. The second camera 93 according to the present embodiment includes an image sensor including a CMOS similarly to the first camera 81, but an image sensor including a CCD can also be used.

Then, the second camera 93 inputs an electrical signal generated by detecting the light reception amount by each light receiving element to the controller 21 of the controller main body 2. The controller 21 generates image data corresponding to the optical image of the subject based on the input electrical signal. The controller 21 can cause the display 22 or the like to display the image data thus generated as the image obtained by capturing the image of the subject.

The second coaxial illuminator 94 emits the illumination light guided from the optical fiber cable C3. The second coaxial illuminator 94 emits the illumination light through an optical path common to the reflection light collected through the objective lens 92. That is, the second coaxial illuminator 94 functions as a "coaxial epi-illuminator" coaxial with the observation optical axis Ao of the objective lens 92. Note that a light source may be incorporated in the lens unit 9a, instead of guiding the illumination light from the outside through the optical fiber cable C3. In that case, the optical fiber cable C3 is unnecessary.

As schematically illustrated in FIG. 6, the second side illuminator 95 is configured by a ring illuminator arranged so as to surround the objective lens 92. The second side illuminator 95 emits illumination light from obliquely above the sample SP similarly to the side illuminator 84 in the analysis optical system 7. The magnifying optical system 96 is arranged between the mirror group 91 and the second camera 93, and is configured to be capable of changing an enlargement magnification of the sample SP by the second camera 93. The magnifying optical system 96 according to the present embodiment includes a variable magnification lens and an actuator configured to move the variable magnification lens along an optical axis of the second camera 93. The actuator can change the enlargement magnification of the sample SP by moving the variable magnification lens based on a control signal input from the controller 21.

Note that a specific configuration of the magnifying optical system 96 is not limited to the configuration in which the variable magnification lens is moved by the actuator. For example, the magnifying optical system may be provided with an operation section configured to move the variable magnification lens. In this case, the enlargement magnification of the sample SP can be changed as the operation section is operated by the user.

Further, the magnifying optical system may be provided with a sensor that detects switching of the enlargement magnification. Then, when it is detected that the enlargement magnification has been switched from a low magnification to a high magnification, an image before switching (a low-magnification image to be described later) may be automatically captured by the second camera 93, and the captured image may be stored in the controller main body 2. In this manner, the user can grasp a relative positional relation of a high-magnification image, which will be described later, with respect to the low-magnification image.

This magnifying optical system 96 may be configured to be capable of not only changing the enlargement magnification of the sample SP by the second camera 93 but also that changing an enlargement magnification of the sample SP by the first camera 81. In that case, the magnifying optical system 96 is provided between the dispersing element 75 and the first camera 81.

—Housing Coupler 64—

The housing coupler 64 is a member configured to couple the observation housing 90 to the analysis housing 70. As both the housings 70 and 90 are coupled by the housing coupler 64, the analysis unit 62 and the observation unit 63 are integrated, and the analysis optical system 7 and the observation optical system 9 move integrally.

The housing coupler 64 can be attached inside and outside the analysis housing 70, that is, to the inside or outside the analysis housing 70, or to the stand 42. In particular, the housing coupler 64 is attached to an outer surface of the analysis housing 70 in the present embodiment.

Specifically, the housing coupler 64 according to the present embodiment is configured to be attachable to the protrusion 70c of the analysis housing 70 and to hold the lens unit 9a on the right side of the protrusion 70c.

Further, a front surface of the protrusion 70c protrudes forward from a front portion of the housing coupler 64 and the observation housing 90 in a state where the observation housing 90 is coupled to the analysis housing 70 by the housing coupler 64 as illustrated in FIG. 3. In this manner, the observation housing 90 and at least a part of the analysis housing 70 (the protrusion 70c in the present embodiment) are laid out so as to overlap each other when viewed from the side (when viewed from a direction orthogonal to the moving direction of the observation optical system 9 and the analysis optical system 7 by the slide mechanism 65) in the state where the housing coupler 64 holds the observation housing 90 in the present embodiment.

The housing coupler 64 according to the present embodiment can fix the relative position of the analysis optical axis Aa with respect to the observation optical axis Ao by fixing the observation housing 90 to the analysis housing 70.

Specifically, as illustrated in FIG. 9 to be described later, the housing coupler 64 holds the observation housing 90, so that the observation optical axis Ao and the analysis optical axis Aa are arranged side by side along the direction (front-rear direction in the present embodiment) in which the observation optical system 9 and the analysis optical system 7 relatively move with respect to the placement stage 5 by the slide mechanism 65. In particular, the observation optical axis Ao is arranged on the front side as compared with the analysis optical axis Aa in the present embodiment.

Further, as illustrated in FIG. 9, the observation optical axis Ao and the analysis optical axis Aa are arranged such that positions in a non-moving direction (the left-right direction in the present embodiment), which is a direction that extends along the horizontal direction and is orthogonal to the moving direction (the front-rear direction in the present embodiment), coincide with each other when the housing coupler 64 holds the observation housing 90.

—Slide Mechanism 65—

Figure 10A:
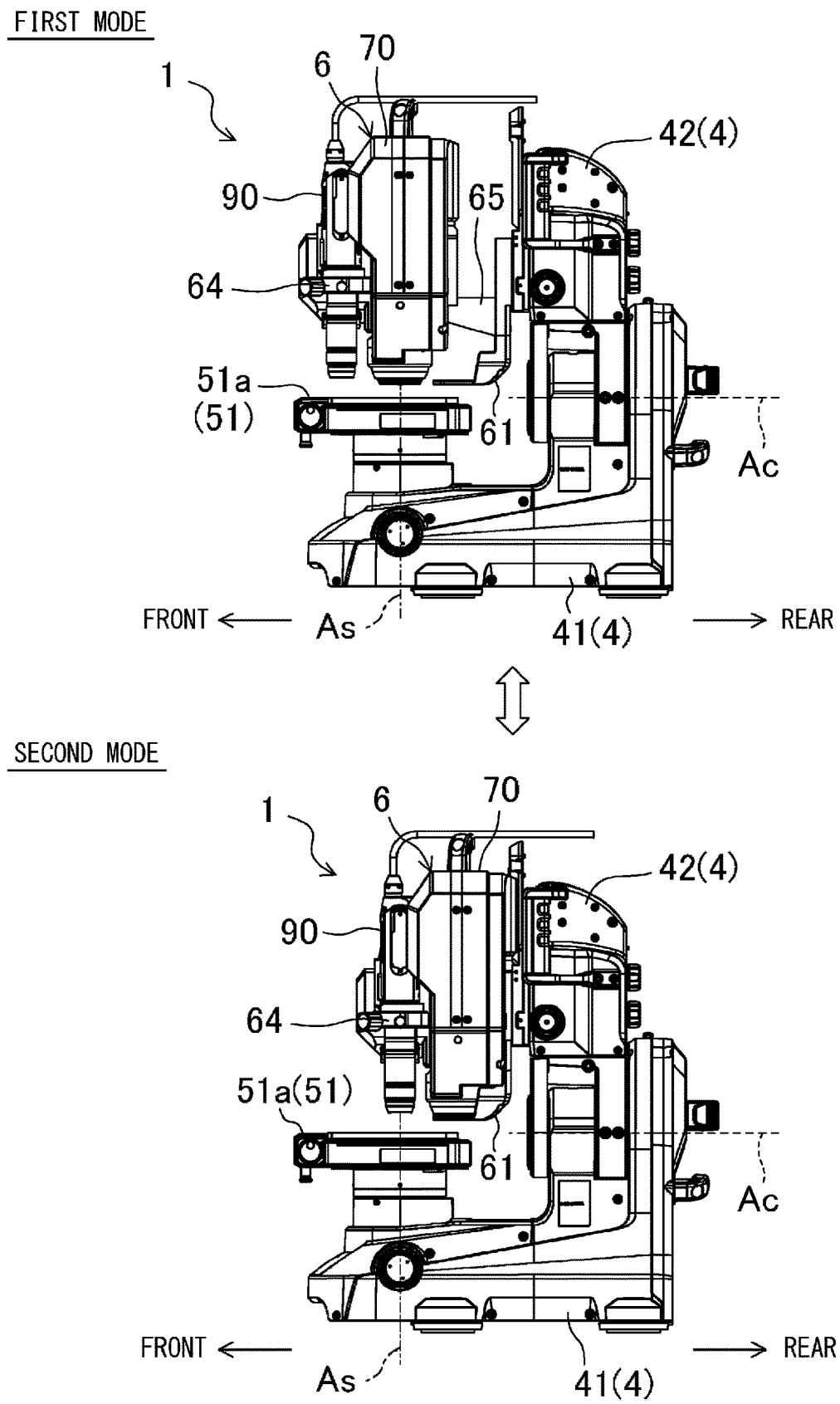
FIG. 10A is a view for describing horizontal movement of a head.
Figure 10B:
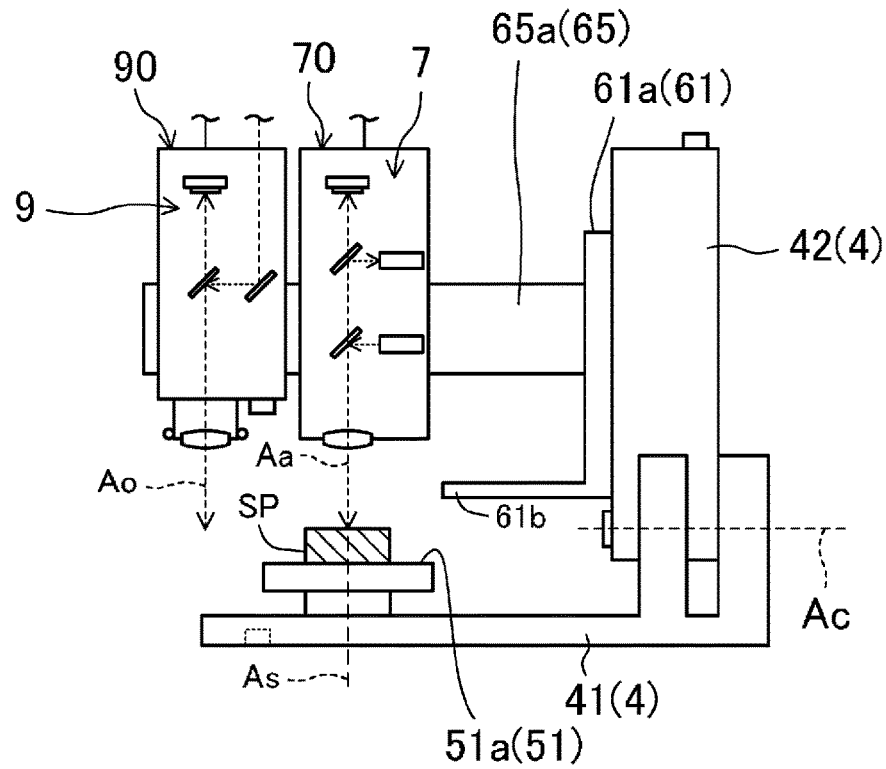
FIG. 10B is a view for describing the horizontal movement of the head.
Figure 10B:
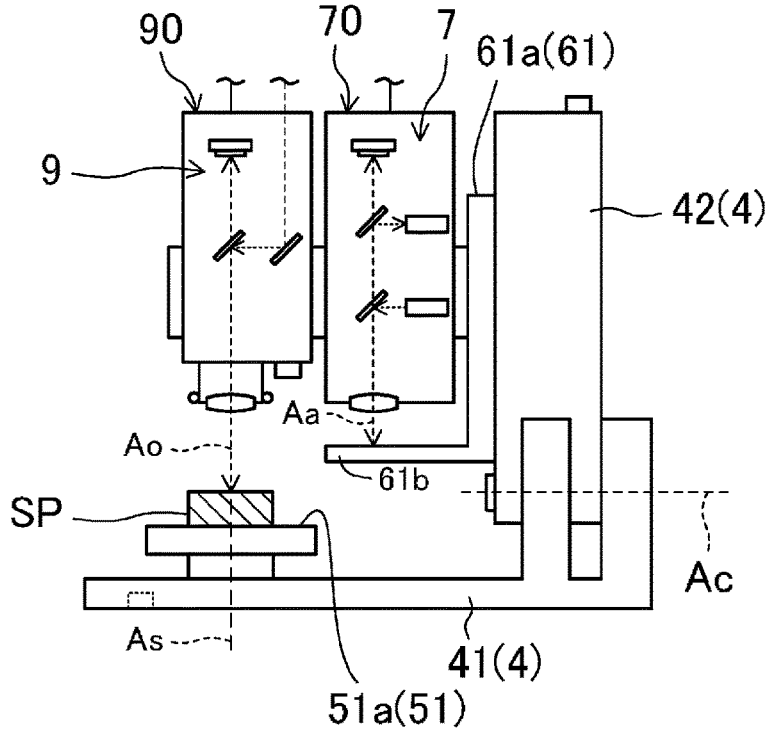

FIG. 9 is a schematic view for describing the configuration of the slide mechanism 65. Further, FIGS. 10A and 10B are views for describing horizontal movement of the head 6.

The slide mechanism 65 is configured to move the relative positions of the observation optical system 9 and the analysis optical system 7 with respect to the placement stage main body 51 along the horizontal direction such that the capturing of the sample SP by the observation optical system 9 and the irradiation of the electromagnetic wave (laser light) (in other words, the irradiation of the electromagnetic wave by the emitter 71 of the analysis optical system 7) in the case of generating the intensity distribution spectrum by the analysis optical system 7 can be performed on the identical point in the sample SP as the observation target.

The moving direction of the relative position by the slide mechanism 65 can be a direction in which the observation optical axis Ao and the analysis optical axis Aa are arranged. As illustrated in FIG. 9, the slide mechanism 65 according to the present embodiment moves the relative positions of the observation optical system 9 and the analysis optical system 7 with respect to the placement stage main body 51 along the front-rear direction.

The slide mechanism 65 according to the present embodiment relatively displaces the analysis housing 70 with respect to the stand 42 and the head attachment member 61. Since the analysis housing 70 and the lens unit 9a are coupled by the housing coupler 64, the lens unit 9a is also integrally displaced by displacing the analysis housing 70.

Specifically, the slide mechanism 65 according to the present embodiment includes the guide rail 65a and an actuator 65b, and the guide rail 65a is formed to protrude forward from a front surface of the head attachment member 61.

Specifically, a proximal end of the guide rail 65a is fixed to the head attachment member 61. On the other hand, a distal side portion of the guide rail 65a is inserted into an accommodation space defined in the analysis housing 70, and is attached to the analysis housing 70 in an insertable and removable state. An insertion and removal direction of the analysis housing 70 with respect to the guide rail 65a is equal to a direction (the front-rear direction in the present embodiment) in which the head attachment member 61 and the analysis housing 70 are separated or brought close to each other.

The actuator 65b can be configured using, for example, a linear motor or a stepping motor that operates based on an electrical signal from the controller 21. It is possible to relatively displace the analysis housing 70, and eventually, the observation optical system 9 and the analysis optical system 7 with respect to the stand 42 and the head attachment member 61 by driving the actuator 65b. When the stepping motor is used as the actuator 65b, a motion conversion mechanism that converts a rotational motion of an output shaft in the stepping motor into a linear motion in the front-rear direction is further provided.

The slide mechanism 65 further includes a movement amount sensor Sw2 configured to detect each movement amount of the observation optical system 9 and the analysis optical system 7. The movement amount sensor Sw2 can be configured using, for example, a linear scale (linear encoder), a photointerrupter, or the like.

The movement amount sensor Sw2 detects a relative distance between the analysis housing 70 and the head attachment member 61, and inputs an electrical signal corresponding to the relative distance to the controller main body 2. The controller main body 2 calculates the amount of change in the relative distance input from the movement amount sensor Sw2 to determine each displacement amount of the observation optical system 9 and the analysis optical system 7.

When the slide mechanism 65 is operated, the head 6 slides along the horizontal direction, and the relative positions of the observation optical system 9 and the analysis optical system 7 with respect to the placement stage 5 move (horizontally move) as illustrated in FIGS. 10A and 10B. This horizontal movement causes the head 6 to switch between a first mode in which the reflective object lens 74 faces the sample SP and a second mode in which the objective lens 92 faces the sample SP. The slide mechanism 65 can slide the analysis housing 70 and the observation housing 90 between the first mode and the second mode.

When the slide mechanism 65 is operated, the head 6 slides along the horizontal direction, and the relative positions of the observation optical system 9 and the analysis optical system 7 with respect to the placement stage 5 move (horizontally move) as illustrated in FIGS. 10A and 10B. This horizontal movement causes the head 6 to switch between a first mode in which the reflective object lens 74 faces the sample SP and a second mode in which the objective lens 92 faces the sample SP. The slide mechanism 65 can slide the analysis housing 70 and the observation housing 90 between the first mode and the second mode.

In order to implement such a configuration, a movement amount D2 of the head 6 when the slide mechanism 65 is operated is set to be the same as a distance D1 between the observation optical axis Ao and the analysis optical axis Aa (see FIG. 9). In addition, the arrangement direction of the observation optical axis Ao and the analysis optical axis Aa is set to be parallel to a moving direction of the head 6 as illustrated in FIG. 9.

Further, a distance between the sample SP and a center (more specifically, a site where the analysis optical axis Aa and the reflective object lens 74 intersect with each other) of the reflective object lens 74 in the first mode is set to coincide with a distance between the sample SP and a center (more specifically, a site where the observation optical axis Ao and the objective lens 92 intersect with each other) of the objective lens 92 in the second mode (second state) by adjusting the dimension of the housing coupler 64 in the substantially vertical direction in the present embodiment. This setting can also be performed by obtaining an in-focus position by autofocus. With this setting, a working distance (WD) can be made consistent in the first mode at the time of analysis of the sample SP and the second mode at the time of observation of the sample SP. Since WD is made consistent in both the modes, it is possible to maintain a focused state before and after the mode switching.

With the above configuration, the generation of the image of the sample SP by the observation optical system 9 and the generation of the intensity distribution spectrum by the analysis optical system 7 (specifically, the irradiation of the primary electromagnetic wave by the analysis optical system 7 when the intensity distribution spectrum is generated by the analysis optical system 7) can be executed on the same point in the sample SP from the same direction at timings before and after performing the switching between the first mode and the second mode.

Further, the cover member 61b in the head attachment member 61 is arranged so as to cover the reflective object lens 74 forming the analysis optical system 7 (shielding state) in the first mode in which the head 6 is in the relatively retracted state, and is arranged so as to be separated from the reflective object lens 74 (non-shieling state) in the second mode in which the head 6 is in the relatively advanced state as illustrated in FIG. 10B.

In the former shielding state, laser light can be shielded by the cover member 61*b* even if the laser light is unintentionally emitted. As a result, the safety of the device can be improved.

(Details of Tilting Mechanism 45)

Figure 11A:
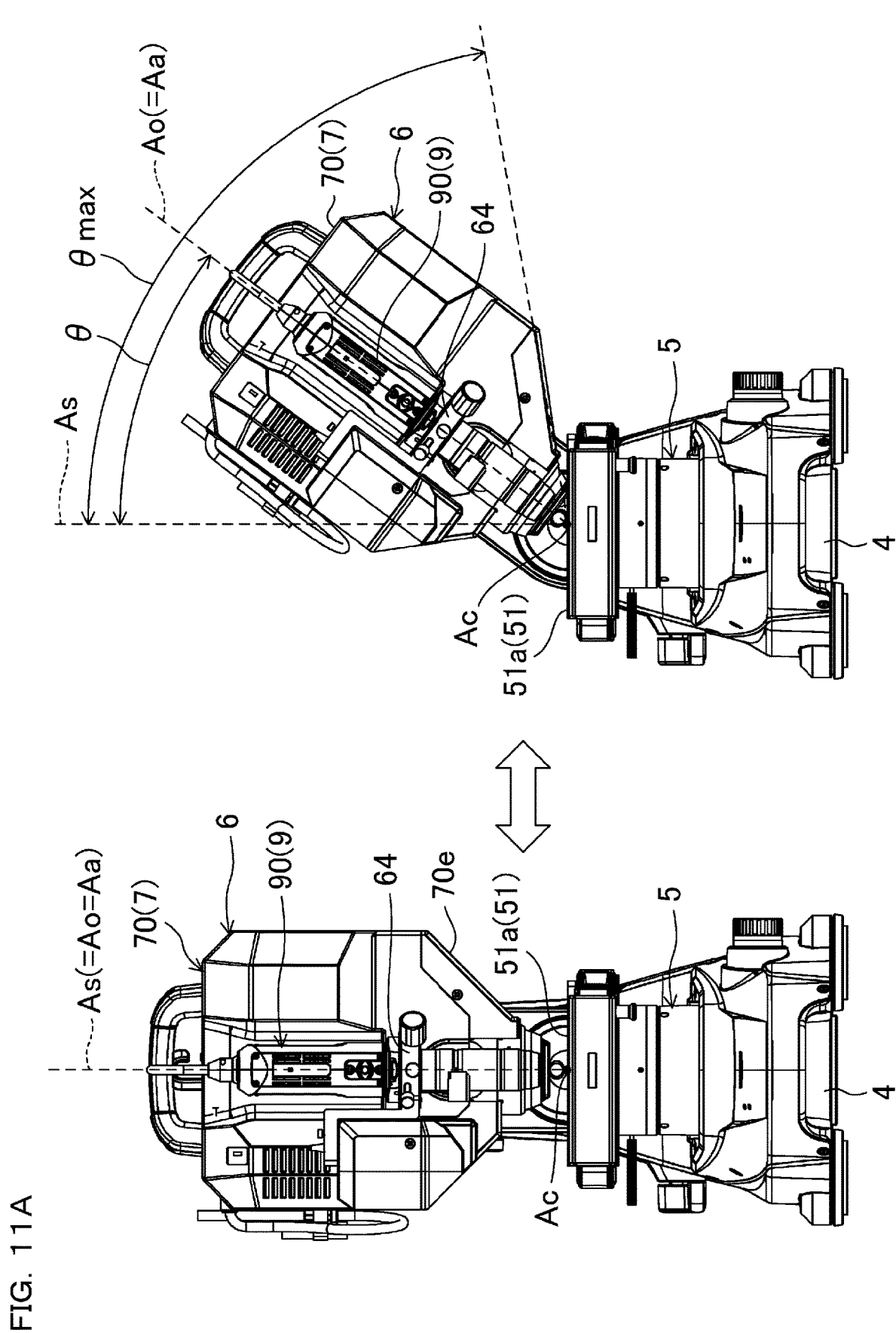
FIG. 11A is a view for describing an operation of a tilting mechanism.
Figure 11B:
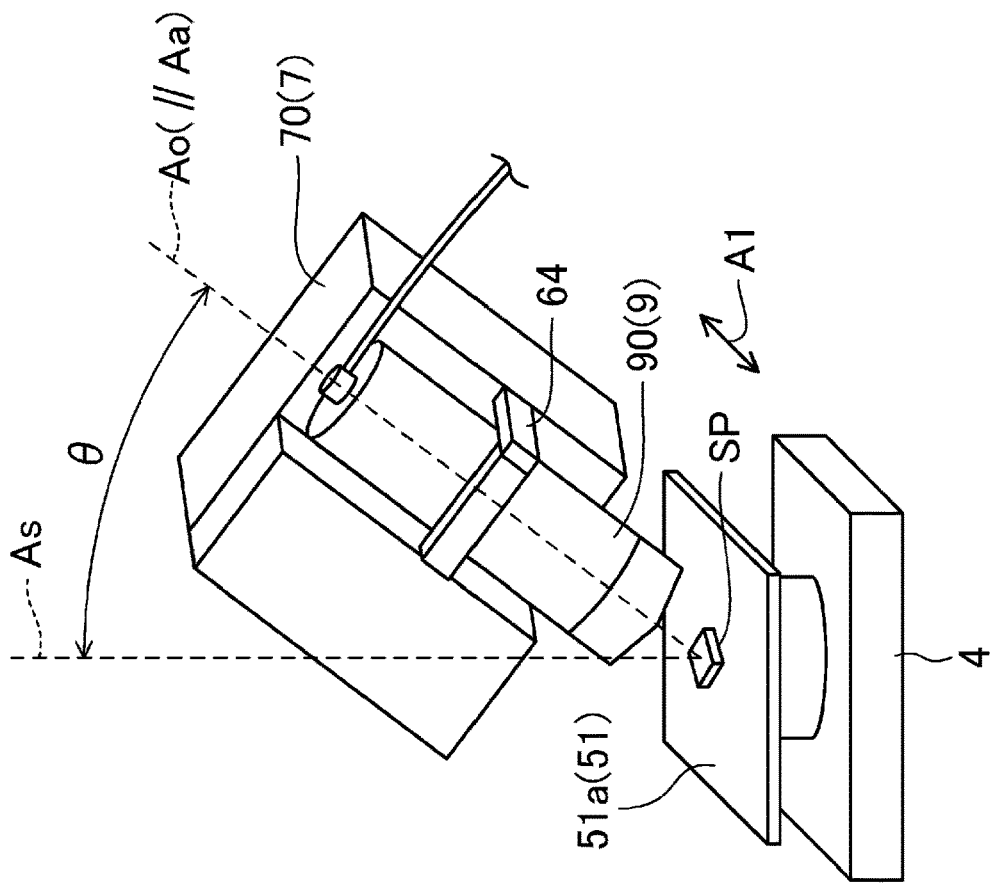
FIG. 11B is a view for describing the operation of the tilting mechanism.
Figure 11B:
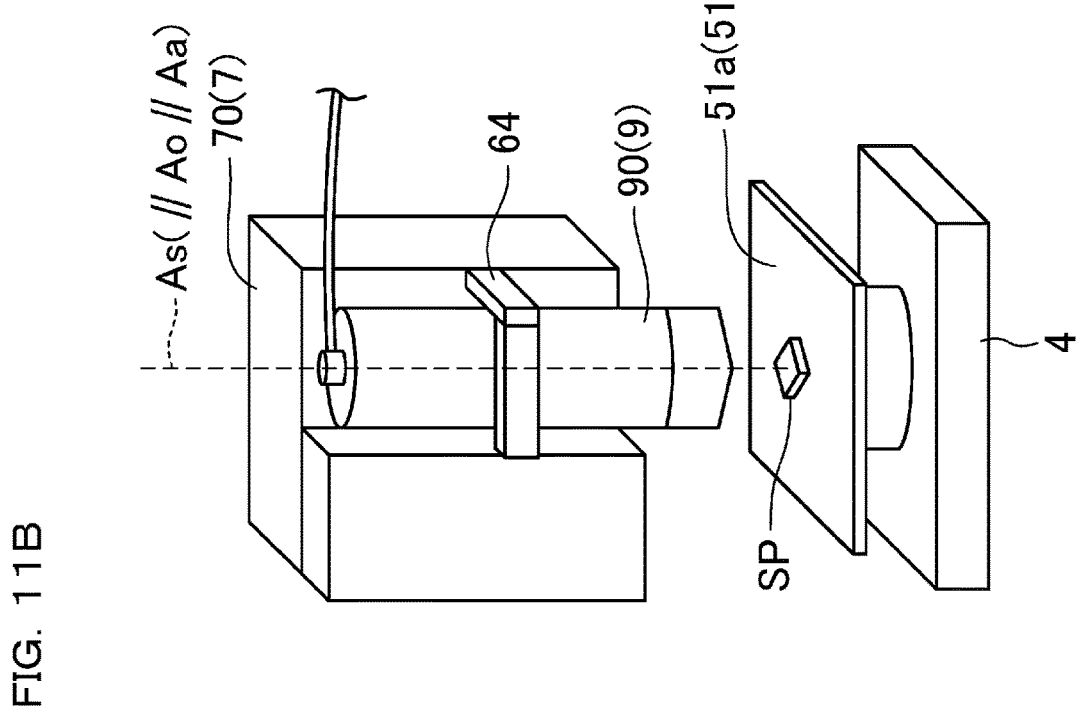

FIGS. 11A and 11B are views for describing an operation of the tilting mechanism 45. Hereinafter, the tilting mechanism 45, such as a relation with the housing coupler 64, will be described in detail with reference to FIGS. 10A and 10B.

The tilting mechanism 45 is a mechanism including the above-described shaft member 44 and the like, and can tilt at least the observation optical system 9 of the analysis optical system 7 and the observation optical system 9 with respect to the reference axis As perpendicular to the placement surface 51*a*.

As described above, the housing coupler 64 integrally couples the analysis housing 70 and the observation housing 90 such that the relative position of the observation optical axis Ao with respect to the analysis optical axis Aa is maintained in the present embodiment. Therefore, when the observation optical system 9 having the observation optical axis Ao is tilted, the analysis optical system 7 having the analysis optical axis Aa is tilted integrally with the observation optical system 9 as illustrated in FIGS. 11A and 11B.

In this manner, the tilting mechanism 45 according to the present embodiment integrally tilts the analysis optical system 7 and the observation optical system 9 while maintaining the relative position of the observation optical axis Ao with respect to the analysis optical axis Aa.

Further, an operation of the slide mechanism 65 and the operation of the tilting mechanism 45 are independent from each other, and a combination of both the operations is allowed. Therefore, the slide mechanism 65 can move the relative positions of the observation optical system 9 and the analysis optical system 7 in a state where at least the observation optical system 9 is held in a tilted posture by the tilting mechanism 45. That is, the analysis and observation device A according to the present embodiment can slide the head 6 back and forth in a state where the observation optical system 9 is tilted as indicated by the double-headed arrow A1 in FIG. 11B.

In particular, since the analysis optical system 7 and the observation optical system 9 are configured to be tilted integrally in the present embodiment, the slide mechanism 65 moves the relative positions of the observation optical system 9 and the analysis optical system 7 while maintaining the state where both the observation optical system 9 and the analysis optical system 7 are tilted by the tilting mechanism 45.

Further, the analysis and observation device A is configured to perform eucentric observation. That is, a three-dimensional coordinate system, which is unique to the device and is formed by three axes parallel to the X direction, the Y direction, and the Z direction, is defined in the analysis and observation device A. A secondary storage device 21*c* of the controller 21 further stores a coordinate of an intersection position, which will be described later, in the three-dimensional coordinate system of the analysis and observation device A. The coordinate information of the intersection position may be stored in the secondary storage device 21*c* in advance at the time of shipment of the analysis and observation device A from the factory. Further, the coordinate information of the intersection position stored in the secondary storage device 21*c* may be updatable by a user of the magnifying analysis device A.

As illustrated in FIGS. 11A and 11B, assuming that an angle of the analysis optical axis Aa with respect to the reference axis As is referred to as a "tilt $\theta$", the analysis and observation device A is configured to allow the emission of laser light in a case where the tilt $\theta$ is less than a predetermined first threshold $\theta$max, for example. A hard constraint can be imposed on the tilting mechanism 45 in order to keep the tilt $\theta$ less the first threshold $\theta$max. For example, the tilting mechanism 45 may be provided with a brake mechanism (not illustrated) to physically restrict an operation range of the tilting mechanism 45.

The observation optical axis Ao, which is the optical axis of the objective lens 92, intersects with the central axis Ac. When the objective lens 92 swings about the central axis Ac, an angle (tilt $\theta$) of the observation optical axis Ao with respect to the reference axis As changes while an intersection position between the observation optical axis Ao and the central axis Ac is maintained constant. In this manner, when the user swings the objective lens 92 about the central axis Ac by the tilting mechanism 45, a eucentric relation in which a visual field center of the second camera 93 does not move from the same observation target portion is maintained even if the objective lens 92 is in a tilted state, for example, in a case where an observation target portion of the sample SP is at the above-described intersection position. Therefore, it is possible to prevent the observation target portion of the sample SP from deviating from the visual field of the second camera 93 (visual field of the objective lens 92).

In particular, the analysis optical system 7 and the observation optical system 9 are configured to be tilted integrally in the present embodiment, and thus, the analysis optical axis Aa, which is the optical axis of the reflective object lens 74, intersects with the central axis Ac similarly to the observation optical axis Ao. When the reflective object lens 74 swings about the central axis Ac, an angle (tilt $\theta$) of the analysis optical axis Aa with respect to the reference axis As changes while an intersection position between the analysis optical axis Aa and the central axis Ac is maintained constant.

Further, the tilting mechanism 45 can tilt the stand 42 rightward by about 90° or leftward by about 60° with respect to the reference axis As as described above. However, in the case where the analysis optical system 7 and the observation optical system 9 are configured to be integrally tilted, there is a possibility that laser light emitted from the analysis optical system 7 is emitted toward the user if the stand 42 is excessively tilted.

Therefore, assuming that the tilt of each of the observation optical axis Ao and the analysis optical axis Aa with respect to the reference axis As is $\theta$, it is desirable that the tilt $\theta$ falls within a range satisfying a predetermined safety standard at least under a situation where laser light can be emitted. Specifically, the tilt $\theta$ according to the present embodiment can be adjusted within a range below the predetermined first threshold $\theta$max as described above.

<Details of Controller Main Body>

Figure 13:
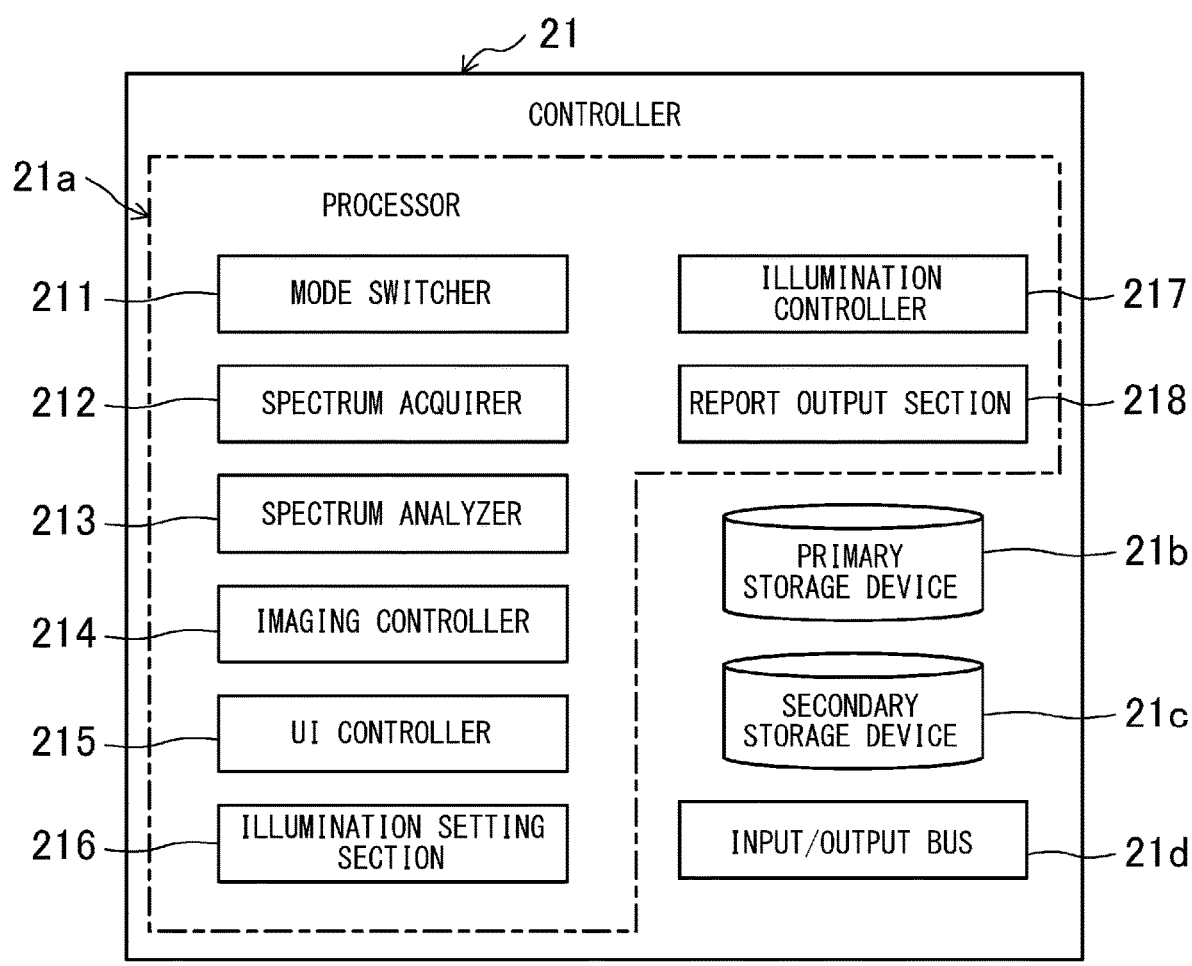
FIG. 13 is a block diagram illustrating a configuration of a controller.

FIG. 12 is a block diagram illustrating the configuration of the controller main body 2. Further, FIG. 13 is a block diagram illustrating the configuration of the controller 21. Note that the controller main body 2 and the optical system assembly 1 are configured separately in the present embodiment, but the present disclosure is not limited to such a configuration. At least a part of the controller main body 2 may be provided in the optical system assembly 1. For example, at least a part of the processor 21a constituting the controller 21 can be incorporated in the optical system assembly 1.

As described above, the controller main body 2 according to the present embodiment includes the controller 21 that performs various processes and the display 22 that displays information related to the processes performed by the controller 21. The controller 21 is electrically connected with at least the mouse 31, the console 32, the keyboard 33, the head drive 47, the overhead camera 48, the placement stage drive 53, the actuator 65b, the electromagnetic wave emitter 71, the output adjuster 72, the LED light source 79a, the first camera 81, the shielding member 83, the side illuminator 84, the second camera 93, the second coaxial illuminator (second coaxial illumination) 94, the second side illuminator (second side illuminator) 95, the magnifying optical system 96, a lens sensor Sw1, the movement amount sensor Sw2, the first tilt sensor Sw3, and the second tilt sensor Sw4.

The controller 21 electrically controls the head drive 47, the overhead camera 48, the placement stage drive 53, the actuator 65b, the electromagnetic wave emitter 71, the output adjuster 72, the LED light source 79a, the first camera 81, the shielding member 83, the side illuminator 84, the second camera 93, the second coaxial illuminator 94, the second side illuminator 95, and the magnifying optical system 96.

Further, output signals of the overhead camera 48, the first camera 81, the second camera 93, the lens sensor Sw1, the movement amount sensor Sw2, the first tilt sensor Sw3, and the second tilt sensor Sw4 are input to the controller 21. The controller 21 executes calculation or the like based on the input output signal, and executes processing based on a result of the calculation. As hardware for performing such processing, the controller 21 according to the present embodiment includes the processor 21a that executes various types of processing, a primary storage device 21b and the secondary storage device 21c that store data related to the processing performed by the processor 21a, and an input/output bus 21d.

The processor 21a includes a CPU, a system LSI, a DSP, and the like. The processor 21a executes various programs to analyze the sample SP and control the respective sections of the analysis and observation device A such as the display 22. In particular, the processor 21a according to the present embodiment can control a display screen on the display 22 based on information indicating the analysis result of the sample SP and pieces of the image data input from the first camera 81, the second camera 93, and the overhead camera 48.

Note that the display as a control target of the processor 21a is not limited to the display 22 provided in the controller main body 2. The "display" according to the present disclosure also includes a display that is not provided in the analysis and observation device A. For example, a display of a computer, a tablet terminal, or the like connected to the analysis and observation device A in a wired or wireless manner may be regarded as a display, and the information indicating the analysis result of the sample SP and various types of image data may be displayed on the display. In this manner, the present disclosure can also be applied to an analysis system including an analysis and observation device A and a display connected to the analysis and observation device A in a wired or wireless manner.

Further, the processor 21a according to the present embodiment includes, as functional elements, a mode switcher 211, a spectrum acquirer 212 and a spectrum analyzer 213, which serve as a component analysis section, an imaging controller 214, and a user interface controller (hereinafter, simply referred to as "UI controller") 215, an illumination setting section 216, an illumination controller 217, and a report output section 218. These elements may be implemented by a logic circuit or may be implemented by executing software. Further, at least some of these elements, such as the head 6, can also be provided in the optical system assembly 1.

Note that the classification of the spectrum acquirer 212, the spectrum analyzer 213, and the like is merely for convenience and can be freely changed. For example, the spectrum acquirer 212 may also serve as the spectrum analyzer 213, or the imaging controller 214 may be subdivided according to functions.

The primary storage device 21b is configured using a volatile memory. The primary storage device 21b according to the present embodiment can read various types of data from the secondary storage device 21c and the like and temporarily store the data.

The secondary storage device 21c is configured using a non-volatile memory such as a hard disk drive and a solid state drive. The secondary storage device 21c can continuously store various types of data. Note that, instead of storing various types of data in the secondary storage device 21c, various types of data may be read from a storage medium such as an optical disk, or various types of data may be read from a computer, a tablet terminal, or the like connected to the analysis and observation device A in a wired or wireless manner.

—Mode Switcher 211—

The mode switcher 211 switches from the first mode to the second mode or switches from the second mode to the first mode by advancing and retracting the analysis optical system 7 and the observation optical system 9 along the horizontal direction (the front-rear direction in the present embodiment). For example, the mode switcher 211 according to the present embodiment can switch to one of the second camera 93 and the first camera 81 by moving the observation housing 90 and the analysis housing 70 relative to the placement stage 5.

The mode switcher 211 can switch to one of the first camera 81 and the second camera 93 as the imaging section configured to capture the image of the sample SP. For example, the mode switcher 211 is set to the first camera 81 as the imaging section in the first mode, and is set to the second camera 93 as the imaging section in the second mode in the present embodiment.

Specifically, the mode switcher 211 according to the present embodiment reads, in advance, the distance between the observation optical axis Ao and the analysis optical axis Aa stored in advance in the secondary storage device 21c. Next, the mode switcher 211 operates the actuator 65b of the slide mechanism 65 to advance and retract the analysis optical system 7 and the observation optical system 9.

Here, the mode switcher 211 compares each displacement amount of the observation optical system 9 and the analysis optical system 7 detected by the movement amount sensor Sw2 with the distance read in advance, and determines whether or not the former displacement amount reaches the latter distance. Then, the advancement and retraction of the analysis optical system 7 and the observation optical system 9 are stopped at a timing when the displacement amount reaches a predetermined distance. Note that the predetermined distance may be determined in advance, or the predetermined distance and the maximum movable range of the actuator 65b may be configured to coincide with each other.

Note that the head 6 may be tilted after switching to the first mode by the mode switcher 211, or the head 6 can also be tilted in the second mode before switching. A timing for operating the tilting mechanism 45 may be either the first mode or the second mode.

—Spectrum Acquirer 212—

The spectrum acquirer 212 controls the electromagnetic wave emitter 71 so as to emit the primary electromagnetic wave with respect to the sample SP as the analyte, and acquires the intensity distribution spectra generated by the first and second detectors 77A and 77B.

Specifically, the spectrum acquirer 212 according to the present embodiment causes the primary electromagnetic wave (for example, laser light) to be emitted from the electromagnetic wave emitter 71 in the first mode. The secondary electromagnetic wave (for example, plasma light) generated by emitting the primary electromagnetic wave reaches the first detector 77A and the second detector 77B.

The first and second detectors 77A and 77B as the detectors generate the intensity distribution spectra based on the secondary electromagnetic waves arriving at each of them. The intensity distribution spectra thus generated are acquired by the spectrum acquirer 212.

Further, an emission position of the laser light by the spectrum acquirer 212 is specified by an operation input for an image P displayed on the display 22. The specification of the emission position can be received over a plurality of positions. When a plurality of emission positions are specified, the spectrum acquirer 212 emits the laser light in order for each emission position, and performs component analysis for each emission position. Characteristic processing performed in that case will be described in the description relating to the configurations of the imaging controller 214 and the UI controller 215.

—Spectrum Analyzer 213—

The spectrum analyzer 213 executes component analysis of the sample SP based on the intensity distribution spectrum generated by the spectrum acquirer 212. As described above, when the LIBS method is used, the surface of the sample SP is locally turned into plasma, and a peak wavelength of light emitted when returning from the plasma state to a gas or the like has a unique value for each element (more precisely, electron trajectory of an electron bound to an atomic nucleus). Therefore, it is possible to determine that an element corresponding to a peak position is a component contained in the sample SP by identifying the peak position of the intensity distribution spectrum, and it is also possible to determine component ratios of the respective elements and estimate the composition of the sample SP based on the determined component ratios by comparing magnitudes of peaks (heights of peaks). The spectrum analyzer 213 is an example of the "component analysis section" in the present embodiment together with the spectrum acquirer 212 described above.

An analysis result of the spectrum analyzer 213 can be displayed on the display 22 or stored in the secondary storage device 21c in a predetermined format.

—Imaging Controller 214 and UI Controller 215—

Hereinafter, processing performed by the imaging controller 214 will be described. Since the processing exemplified hereinafter is closely related to processing performed by the UI controller 215, the following description also includes the description related to the UI controller 215.

1. High-Magnification Image and Low-Magnification Image

A high-magnification image is the image P having a relatively high enlargement magnification of the sample SP. This high-magnification image may be generated based on a light reception signal from the second camera 93 of the observation optical system 9, or may be generated based on a light reception signal from the first camera 81 of the analysis optical system 7. Further, it is also possible to generate both an observation system high-magnification image and an analysis system high-magnification image by regarding a high-magnification image captured by the second camera 93 as the observation system high-magnification image, and a high-magnification image captured by the first camera 81 of the analysis optical system 7 as the analysis system high-magnification image.

A low-magnification image is the image P having a relatively wider imaging visual field than the high-magnification image described above. This low-magnification image may be an observation image in which an enlargement magnification of the sample SP is relatively lower than an enlargement magnification used at the time of capturing the high-magnification image. Instead of using such a low-magnification image, the image P having a wider visual field than each of high-magnification images (a so-called wide-area image) P may be created by pasting a plurality of the high-magnification images.

Furthermore, a high-magnification image and a low-magnification image may be generated using both the first camera 81 of the analysis optical system 7 and the second camera 93 of the observation optical system 9. Specifically, an enlargement magnification of the second camera 93 of the observation optical system 9 is set to be relatively low, and an enlargement magnification of the first camera 81 of the analysis optical system 7 is set to be relatively high. In this case, the image P captured by the second camera 93 of the observation optical system 9 may be regarded as a low-magnification image, and the mode switcher 211 may switch from the second mode to the first mode after acquiring the low-magnification image, and then, the image P captured by the first camera 81 of the analysis optical system 7 may be regarded as a high-magnification image.

Further, a low-magnification image can be used as a navigation image Pn for notifying the user of an imaging visual field of a high-magnification image or for receiving a change in a visual field range of the high-magnification image in the following description. In such applications, the low-magnification image is sometimes referred to as the navigation image Pn.

Furthermore, a high-magnification image can be used as the image P indicating a dynamic change of the sample SP. In such an application, the high-magnification image is sometimes referred to as a live image Pl.

2. Processing Related to Live Image Pl and Navigation Image Pn

The imaging controller 214 generates the image P of the sample SP based on the light reception amount of the reflection light detected by the first camera 81 as the second imaging section or the second camera 93. The image P thus generated is displayed on the display 22 by the UI controller 215. The image P generated by the imaging controller 214 can be classified mainly from two viewpoints. Here, classification based on a viewpoint of an application of the image P and a size of an imaging visual field as a first viewpoint, and processing related to the classification will be described.

Note that the following description corresponds to a case in the second mode, that is, a case where the second camera 93 is used as the imaging section, but the second camera 93 can be appropriately replaced with the first camera 81. For example, the live image Pl and the navigation image Pn may be generated by the first camera 81 instead of the second camera 93 or in addition to the second camera 93.

Figure 14:
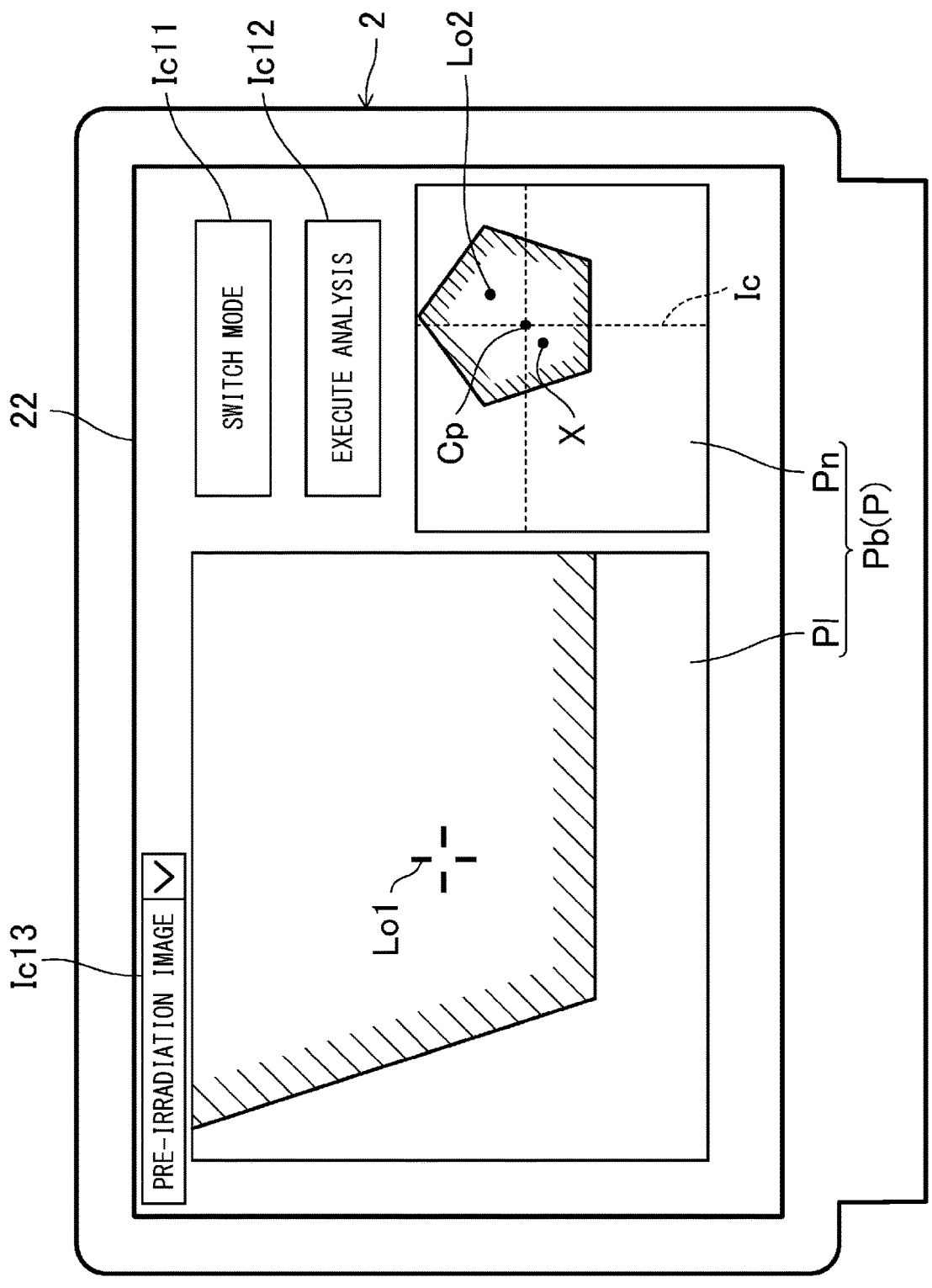
FIG. 14 is a view illustrating a display screen of a live image and a navigation image.
Figure 17:
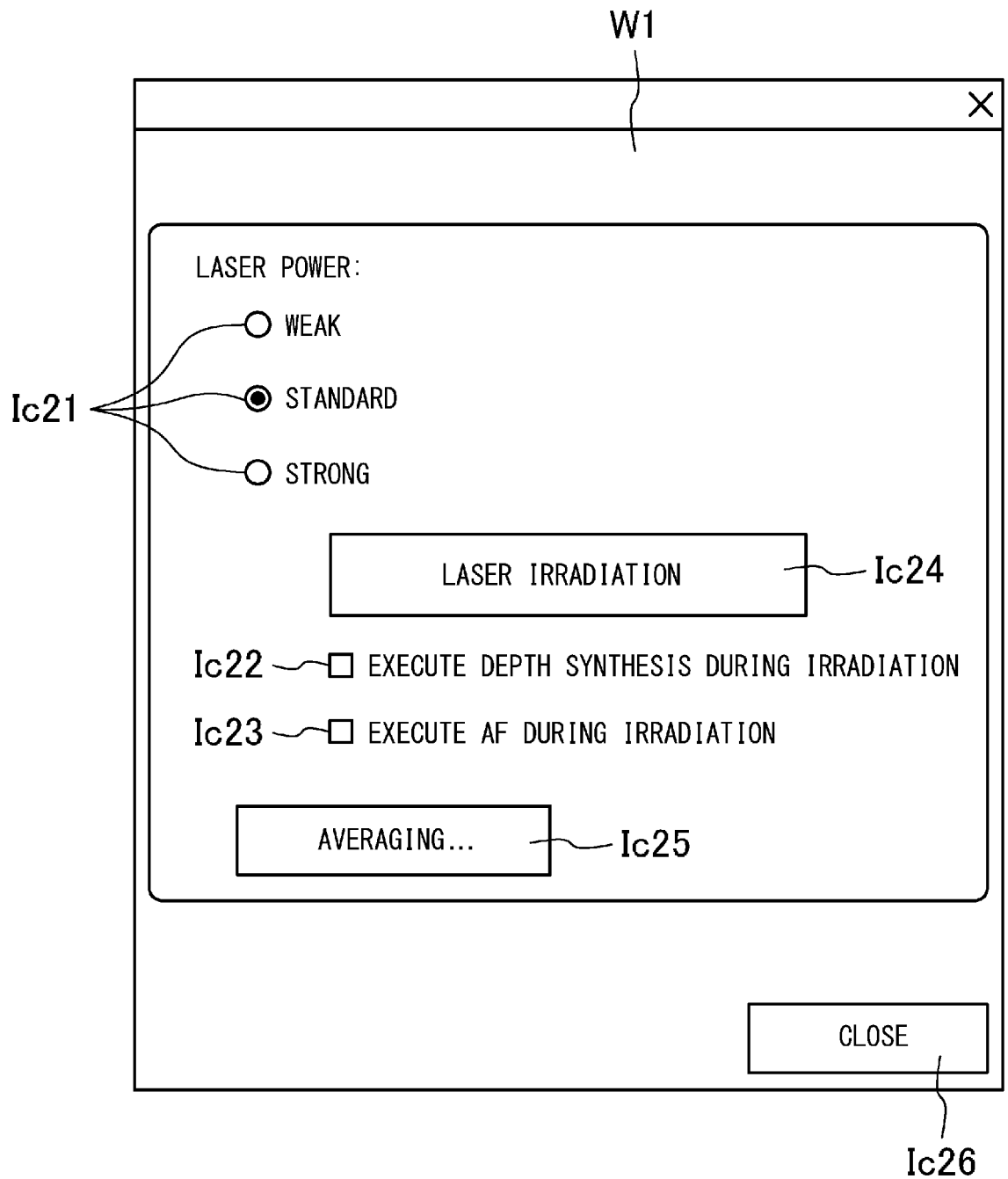
FIG. 17 is a view illustrating a user interface for outputting a start trigger signal.

FIG. 14 is a view illustrating a display screen of the live image Pl and the navigation image Pn. FIG. 17 is a view illustrating a user interface for outputting a start trigger signal.

In FIG. 14, an icon Ic11 is a user interface that receives an instruction for switching from the first mode to the second mode or from the second mode to the first mode, and an icon Ic12 is a user interface that receives an execution instruction of component analysis in the first mode. When the icon Ic12 receives the execution instruction, a dialog W1 as illustrated in FIG. 17 is displayed on the display 22. The dialog W1 will be described later.

As illustrated in FIG. 14, the imaging controller 214 according to the present embodiment can generate, as the images P, the live image Pl that is updated every fixed period and indicates a dynamic change of the sample SP as the image (particularly, the above-described high-magnification image) P of the sample SP and the navigation image Pn as the above-described low-magnification image that has a wider imaging range than the live image Pl and indicates a position of the live image Pl based on the light reception amount of the reflection light received by the second camera 93.

Here, the live image Pl is generated as the high-magnification image in which the enlargement magnification of the sample SP by the second camera 93 is relatively high. On the other hand, the navigation image Pn is generated as the low-magnification image in which the enlargement magnification of the sample SP by the second camera 93 is relatively low. As described above, the navigation image Pn may be generated by pasting a plurality of the high-magnification images. Here, the enlargement magnification may be changed as the magnifying optical system 96 is adjusted by the imaging controller 214 or as the user adjusts the magnifying optical system 96. Note that the enlargement magnification may be changed by so-called digital zoom.

Note that the image generated based on the light reception signal from the second camera 93 of the observation optical system 9 may be used as the navigation image Pn, and the image generated based on the light reception signal from the first camera 81 of the analysis optical system 7 may be used as the live image Pl as described above. Instead of this, for example, the navigation image Pn may be generated by the first camera 81. In that case, the navigation image Pn may be generated using the low-magnification image obtained by the first camera 81, or the navigation image Pn may be generated by pasting the plurality of high-magnification images generated via the first camera 81.

That is, first, the low-magnification image of the sample SP is acquired by the second camera 93 having a relatively low enlargement magnification, and is used as the navigation image Pn. Thereafter, the mode switcher 211 switches the optical system from the observation optical system 9 to the analysis optical system 7. Then, the high-magnification image of the sample SP may be acquired by the first camera 81 of the analysis optical system 7 and used as the live image Pl. Note that the image captured by the first camera 81 is sometimes referred to as a pre-irradiation image Pb or a post-irradiation image Pa depending on an imaging timing, and the pre-irradiation image Pb refers to an image before the sample SP is irradiated with laser light, and the post-irradiation image Pa refers to an image after the sample SP is irradiated with laser light.

Note that the second mode is switched to the first mode if the icon Ic11 is operated in the state illustrated in FIG. 14. In the first mode, the high-magnification image generated by the first camera 81 is displayed on the display 22 as the live image Pl. In that case, the navigation image Pn may be switched to the low-magnification image captured by the first camera 81, or the low-magnification image captured by the second camera 93 may be directly used.

An update interval of the live image Pl (a time interval at which the live image Pl is generated) may be set to, for example, about several tens of FPS, or may be set such that the update is performed every few seconds. This update interval may be a setting unique to the observation unit 63 or a setting that can be changed from the outside.

In addition, the navigation image Pn may be generated as the imaging controller 214 controls the placement stage drive 53 and the second camera 93 to generate the images P at the respective XY positions of the placement surface 51a (at each position on a plane along the front-rear direction and the left-right direction) and synthesize the images P generated at the respective XY positions.

Then, the UI controller 215 causes the display 22 to display the live image P1 and the navigation image Pn generated by the imaging controller 214 as illustrated in FIG. 14. At that time, the UI controller 215 causes the display 22 to display the navigation image Pn in a state of being superimposed with position information Ic indicating a current position of the live image Pl in the navigation image Pn.

Here, the position information Ic may be a crosshair as illustrated in FIG. 14. In this case, an intersection point Cp of the crosshair may indicate a visual field center of the live image Pl when a first analysis point Lo1, which will be described later, is not specified. Further, as the position information Ic, a rectangular frame indicating a visual field range of the live image Pl may be superimposed and displayed in addition to the crosshair or instead of the crosshair, or a point-shaped or circle-shaped figure may be superimposed and displayed.

Then, the UI controller 215 receives the specification of the first analysis point Lo1 on the live image Pl as an irradiation position of a primary electromagnetic wave (for example, laser light), and causes the display 22 to display the navigation image Pn in a state of being superimposed with information (hereinafter, also referred to as "wide-area-side analysis position") indicating a position of the first analysis point Lo1 in the navigation image Pn.

Here, the first analysis point Lo1 may be specified, for example, by operating a mouse or by inputting a coordinate on the live image Pl using a keyboard or the like.

Further, a substantially cross-shaped marker is superimposed and displayed on the live image Pl as the information indicating the specified first analysis point Lo1 in the example illustrated in FIG. 14. On the other hand, an intersection point X is superimposed and displayed as the wide-area-side analysis position on the navigation image Pn. This intersection point X indicates the irradiation position of the primary electromagnetic wave on the navigation image Pn. The crosshair may be also used for the wide-area-side analysis position instead of superimposing and displaying the intersection point X. In that case, the intersection point Cp of the crosshair indicates the irradiation position of the primary electromagnetic wave on the navigation image Pn.

A plurality of the first analysis points Lo1 can be specified. In that case, the intersection point X can be displayed on the navigation image Pn at each of positions corresponding to the first analysis points Lo1.

Further, the UI controller 215 can also receive specification of an irradiation position of the primary electromagnetic wave on the navigation image Pn as well as the specification of the irradiation position of the primary electromagnetic wave (the first analysis point Lo1) on the live image Pl.

Specifically, the UI controller 215 can receive a second analysis point Lo2 on the navigation image Pn as position information corresponding to the irradiation position of the primary electromagnetic wave. As illustrated in the upper part of FIG. 15, when the UI controller 215 receives specification of the second analysis point Lo2, the imaging controller 214 controls the placement stage drive 53 based on the second analysis point Lo2 to move a relative position (imaging position) of the placement stage 5 with respect to the second camera 93 such that the second analysis point Lo2 falls within the visual field range of the live image Pl. In the example illustrated in the lower part of FIG. 15, the imaging position is moved such that the intersection point Cp of the position information (crosshair) Ic coincides with the second analysis point Lo.

Figure 15:
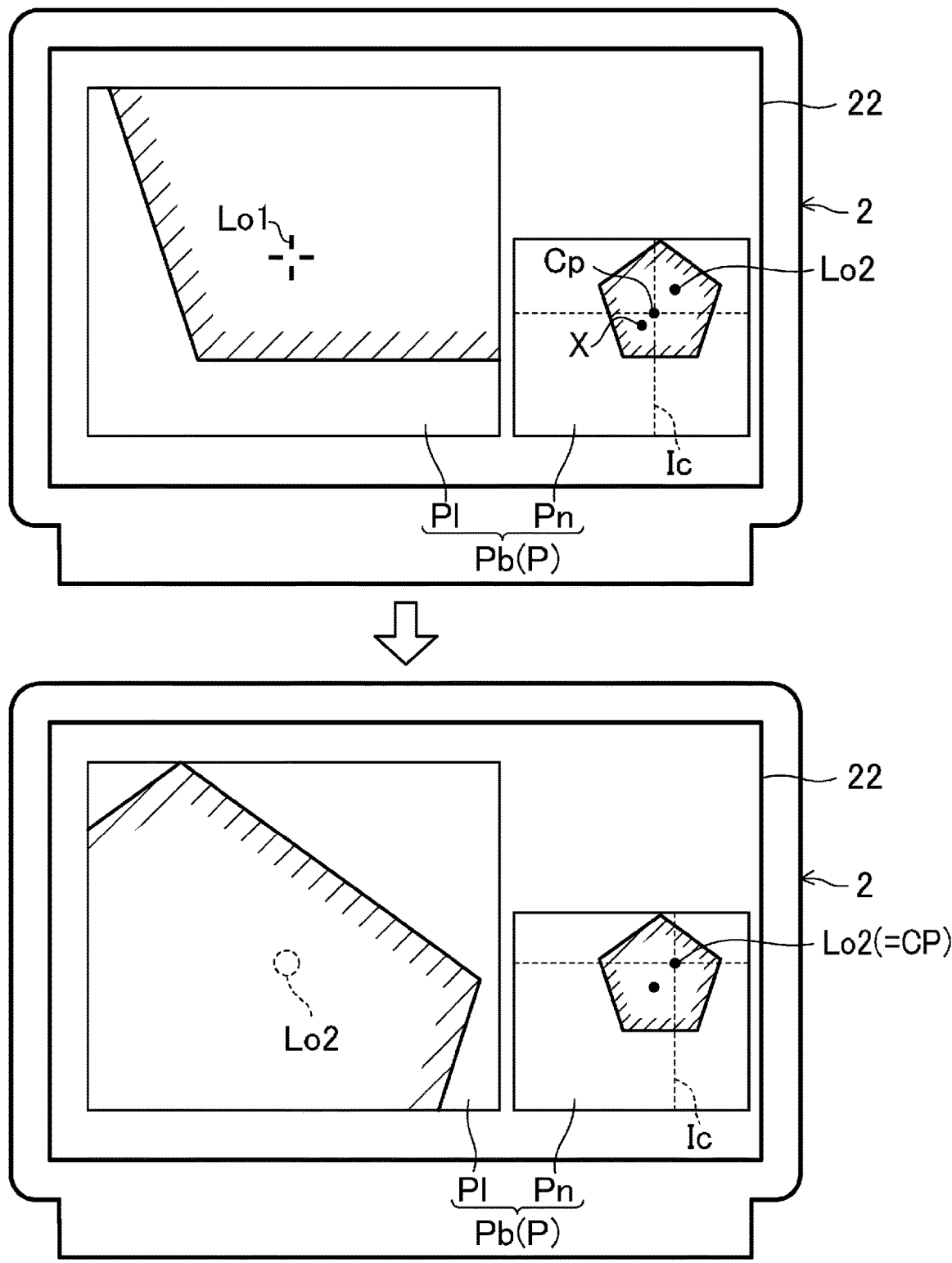
FIG. 15 is a view for describing processing when specification of a second analysis point is received.

As illustrated in the lower part of FIG. 15, the imaging controller 214 executes regeneration of the live image Pl in a state where the second analysis point Lo2 is set to fall within the visual field range of the live image Pl by the placement stage drive 53 (state where the intersection point Cp of the position information coincides with the second analysis point Lo2 in the example illustrated in the drawing). As a result, a live image Pl in which the second analysis point Lo2 is reflected can be newly generated and displayed on the display 22.

The UI controller 215 can also further receive specification of the first analysis point Lo1 on the newly generated live image Pl. As illustrated in the upper part of FIG. 16, when the UI controller 215 newly receives specification of a first analysis point Lo1', the imaging controller 214 controls the placement stage drive 53 based on the newly received first analysis point Lo1' to move the imaging position such that the first analysis point Lo1' is brought close to a visual field center of the live image Pl. In the example illustrated in the lower part of FIG. 16, the imaging position is moved such that the first analysis point Lo1' coincides with the visual field center of the live image Pl.

Then, the imaging controller 214 executes regeneration of the live image Pl in a state where the first analysis point Lo1' is brought close to the visual field center of the live image Pl by the placement stage drive 53. As a result, a live image Pl in which the first analysis point Lo1' is brought close to the visual field center can be newly generated and displayed on the display 22.

The UI controller 215 can repeatedly receive the specification of the first analysis point Lo1 or receive the specification of the first analysis point Lo1 over a plurality of points on the regenerated live image Pl. The imaging controller 214 controls the placement stage drive 53 based on the first analysis point Lo1 every time the UI controller 215 receives the specification of the first analysis point Lo1 on the regenerated live image Pl, thereby moving the imaging position such that the first analysis point Lo1 is brought close to the visual field center of the regenerated live image Pl.

Then, the imaging controller 214 executes additional regeneration of the live image Pl in a state where the first analysis point Lo1 is brought close to the visual field center of the regenerated live image Pl by the placement stage drive 53. As the regeneration of the live image Pl is repeatedly executed, the user can acquire the desired live image Pl.

Thereafter, when the desired live image Pl is acquired and one or more first analysis points Lo1 are specified on the live image Pl, the above-described icon Ic11 is operated by the user, and the second mode is switched to the first mode by the mode switcher 211. In the first mode, the live image Pl generated by the second camera 93 is switched to the live image Pl generated by the first camera 81, but the position of the first analysis point Lo1 on the live image Pl and the position of the intersection point X on the navigation image Pn are held.

Thereafter, when the above-described icon Ic12 is operated by the user after the first analysis point Lo1 is specified again as necessary, the UI controller 215 cause the display 22 to display the dialog W1 illustrated in FIG. 17. As illustrated in FIG. 17, the dialog W1 includes a check box Ic21 for specifying laser power in three stages, a check box Ic22 for setting whether or not to perform depth synthesis during irradiation, and a check box Ic23 for setting whether or not to execute autofocus (AF) during irradiation, an icon Ic24 for outputting a start trigger signal, an icon Ic25 for setting averaging, and an icon Ic26 for closing the dialog W1.

When the icon Ic24 is clicked in the dialog W1, the UI controller 215 outputs the start trigger signal to the spectrum acquirer 212. When the start trigger signal is input, the spectrum acquirer 212 irradiates the first analysis point Lo1 with a primary electromagnetic wave in a state where the first analysis point Lo1 is brought close to the visual field center of the live image Pl (for example, one point fixed in the live image Pl) by the placement stage drive 53. As a result, component analysis at the first analysis point Lo1 is executed.

Note that the pre-irradiation image Pb formed by at least one of the live image Pl and the navigation image Pn is generated immediately before the execution of the component analysis, and the post-irradiation image Pa formed by at least one of the live image Pl and the navigation image Pn is similarly generated immediately after the execution of the component analysis.

Figure 18:
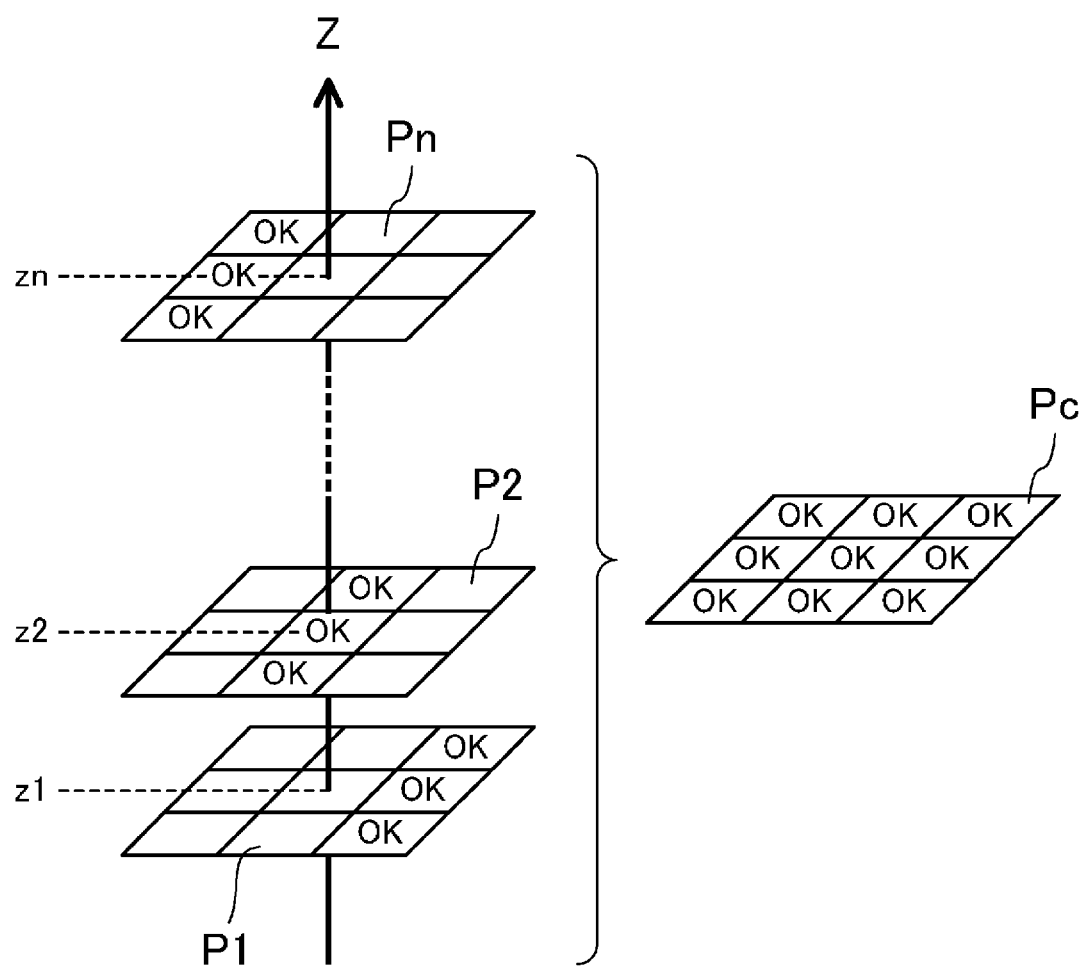
FIG. 18 is a view for describing generation of an omni-focal image.

Further, the imaging controller 214 can also display an omnifocal image Pc as the live image (high-magnification image) Pl in both the first mode and the second mode. Specifically, the imaging controller 214 according to the present embodiment moves the imaging position to a plurality of first positions along the first direction (Z direction) by the placement stage drive 53 and generates the image P at each of the plurality of first positions as illustrated in FIG. 18.

In the example illustrated in the drawing, n height positions z1, z2, . . . , and zn and n images P1, P2, . . . , and Pn captured at the respective height positions are illustrated as the plurality of first positions. Squares of the images P1, 2, . . . , and Pn conceptually indicate pixels, and "OK" attached to each pixel conceptually indicates a pixel in focus. As illustrated in FIG. 18, pixels in focus and pixels out of focus are different for each height position.

Therefore, the imaging controller 214 synthesizes the high-magnification images (images P) generated respectively at the plurality of first positions to generate the omnifocal image Pc of the sample. As illustrated in the drawing, the imaging controller 214 can extract the pixels in focus from each of the n live images P1, P2, . . . , and Pn, and combine those pixels to generate the single omnifocal image Pc. The generated omnifocal image Pc is displayed on the display 22 as the navigation image Pn, and is stored in a storage section as the pre-irradiation image Pb. As a result, a state where the entire live image Pl is in focus is achieved, and the first analysis point Lo1 can be specified more appropriately.

Note that the omnifocal image Pc may be generated during the observation by the second camera 93 of the observation unit 63 (that is, in the second mode), during the observation by the first camera 81 of the analysis unit 62 (that is, in the first mode), or in both the modes. Whether or not to generate the omnifocal image Pc can also be appropriately changed based on an operation input by the user.

Figure 26:
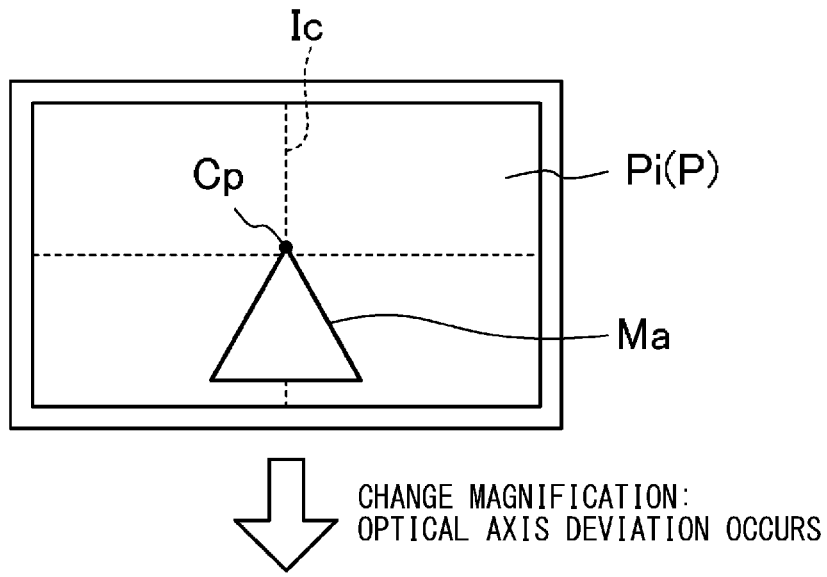
FIG. 26 is a view for describing an optical axis deviation in an observation unit.
Figure 26:
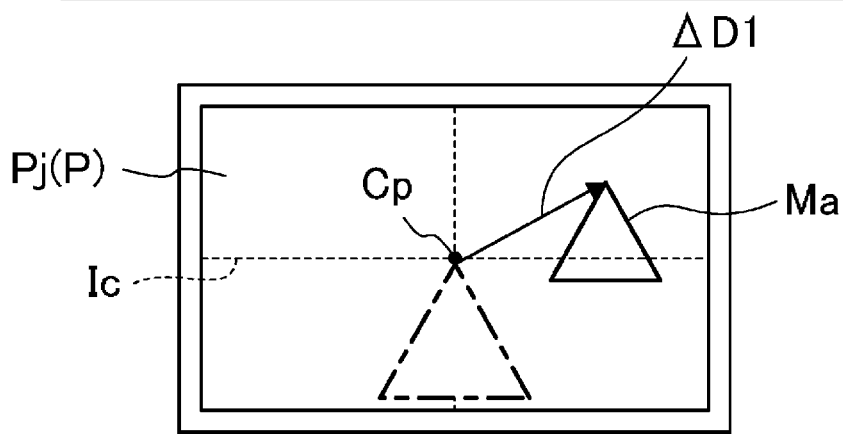

Meanwhile, the enlargement magnification of the image P generated by the second camera 93 can be adjusted by the magnifying optical system 96. For example, as illustrated in FIG. 26, a size of a reference marker Ma reflected in a low-magnification image Pj set to a predetermined magnification (first magnification) on the low magnification side is smaller than a size of the reference marker Ma reflected in a high-magnification image Pi set to a reference magnification (second magnification) whose enlargement magnification is relatively higher than the predetermined magnification.

At that time, there is a possibility that a deviation (hereinafter referred to as "optical axis deviation") occurs at a position where the observation optical axis Ao and the placement surface 51a intersect with each other at the reference magnification, and a position where the observation optical axis Ao and the placement surface 51a intersect with each other at the predetermined magnification due to a physical distortion of the magnifying optical system 96 or the like. When such an optical axis deviation occurs, for example, a vertex of the reference marker Ma and the intersection point Cp of the position information (crosshair) Ic coincide at the reference magnification but do not coincide at the predetermined magnification as illustrated in FIG. 26.

In order to eliminate the influence of such an optical axis deviation, the imaging controller 214 according to the present embodiment controls the magnifying optical system 96 to generate the low-magnification image Pj and the high-magnification image Pi, first, as the images P belonging to one of the live image Pl and the navigation image Pn, and detect the reference markers Ma included in both the low-magnification image Pj and the high-magnification image Pi. Here, as the reference marker Ma, a scale that can be placed on the placement surface 51a may be used, or a pattern displayed on the placement surface 51a may be used. Next, the imaging controller 214 acquires a first position difference ΔD1 indicating a difference between a position of the reference marker Ma detected in the low-magnification image Pj and a position of the reference marker Ma detected in the high-magnification image Pi, and acquires a magnification difference indicating a difference between an enlargement magnification used at the time of generating the low-magnification image Pj and an enlargement magnification used at the time of generating the high-magnification image Pi.

Note that a method for acquiring the position difference ΔD1 is not limited to this method. For example, a high-magnification image and a low-magnification image of an arbitrary measurement object may be acquired, and a difference between a position of a predetermined point of the arbitrary measurement object in the high-magnification image and a position of the predetermined point in the low-magnification image may be detected. Further, it may be configured such that an input of a position difference is received as ΔD1 if the position difference is known based on a low-magnification image and a high-magnification image captured in advance.

Then, the imaging controller 214 calculates a position variation of a visual field center of the image P when the enlargement magnification is set to a predetermined third magnification based on the first position difference ΔD1 and the magnification difference. Here, when the third magnification is located between the predetermined magnification and the reference magnification, the magnitude of the position variation becomes a value smaller than the first position difference ΔD1. Further, when the third magnification is an enlargement magnification on the lower magnification side of the predetermined magnification, the magnitude of the position variation becomes a value larger than the first position difference ΔD1.

Meanwhile, the UI controller 215 detects that the enlargement magnification has changed in the live image Pl, for example, based on a detection signal of the lens sensor Sw1. Then, when detecting a change of the enlargement magnification in the live image Pl, the UI controller 215 updates a superimposed position of the position information Ic in the navigation image Pn based on the position variation calculated by the imaging controller 214. Here, the position information Ic is updated such that the intersection point Cp and the position of the reference marker Ma coincide by calculating a correction amount of the optical axis deviation that cancels the position variation and moving the intersection point Cp of the position information Ic according to the correction amount.

Note that a method for eliminating the influence of the optical axis deviation is not limited to the method described here. For example, the controller 21 detects that the enlargement magnification has changed in the live image Pl based on a detection signal of the lens sensor Sw1. Then, the controller 21 may drive at least one of the head drive 47 and the placement stage drive 53 based on the position variation calculated by the imaging controller 214 to make the visual field center consistent before and after the change in the enlargement magnification. Further, control may be performed by combining the above-described movement of the intersection point Cp and the drive of at least one of the head drive 47 and the placement stage drive 53 such that the visual field center of the live image Pl and the intersection point Cp coincide.

The processor 21a according to the present embodiment can automatically correct the optical axis deviation when, for example, the enlargement magnification is changed by the magnifying optical system 96.

Figure 27:
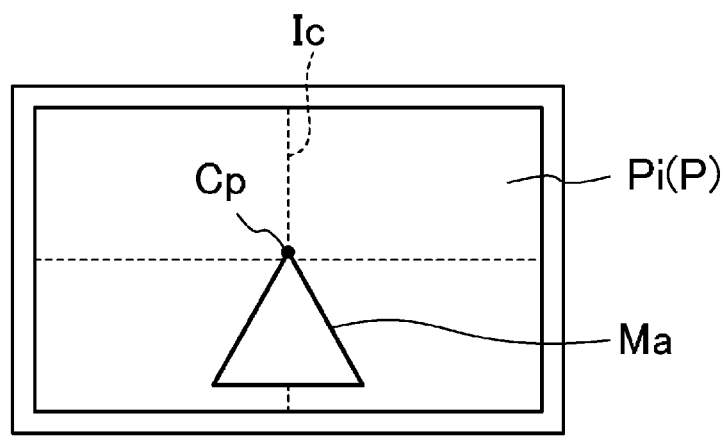
FIG. 27 is a view for describing a visual field deviation at the time of switching a mode from the observation unit to an analysis unit.
Figure 27:
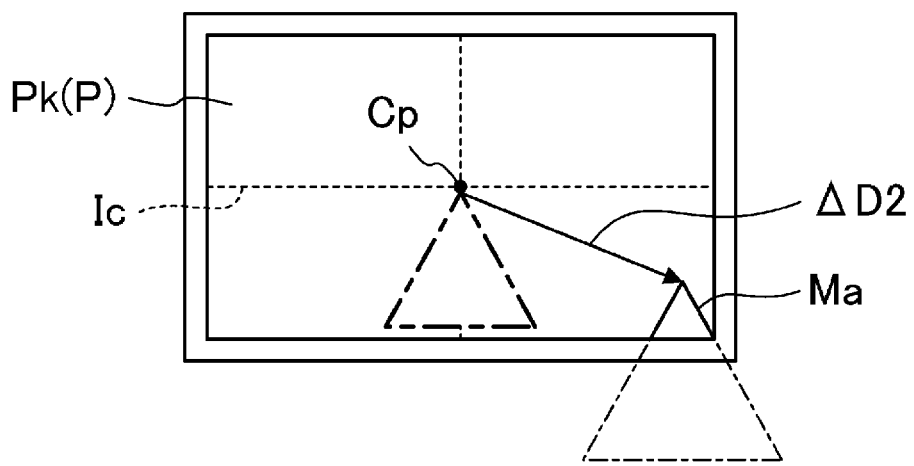

In addition, there is a possibility that a deviation (hereinafter, referred to as "visual field deviation") between a position where the observation optical axis Ao and the placement surface 51a intersect in the second mode and a position where the analysis optical axis Aa and the placement surface 51a intersect in the first mode due to a deviation in assembly of the observation unit 63 with respect to the analysis unit 62 at the time of switching from the second mode to the first mode. When such a visual field deviation occurs, for example, a vertex of the reference marker Ma and the intersection point Cp of the position information (crosshair) Ic coincide, for example, in the second mode (particularly at the reference magnification) but do not coincide in the first mode as illustrated in FIG. 27.

In order to eliminate the influence of such a visual field deviation, the imaging controller 214 according to the present embodiment controls the magnifying optical system 96 to prepare an image Pi generated by the second camera 93 adjusted to the reference magnification and an image Pk generated by the camera 81, first, and detect the reference markers Ma included in both the two image Pi and the image Pk. Next, the imaging controller 214 acquires a second position difference ΔD2 indicating a difference between a position of the reference marker Ma detected in the image Pi generated by the second camera 93 and a position of the reference marker Ma detected in the image Pk generated by the first camera 81.

Then, the imaging controller 214 regards the second position difference ΔD2 as a position variation of the visual field center of the image P that occurs at the time of switching from the second mode to the first mode (particularly, a position variation at the time of switching from the reference magnification).

Meanwhile, the processor 21a detects an enlargement magnification of the second camera 93 used at the time of switching from the second mode to the first mode, for example, based on a detection signal of the lens sensor Sw1. Then, the processor 21a acquires a position variation (for example, the first position difference ΔD1) when the detected enlargement magnification is regarded as the third magnification, and adds this position variation and the second position difference ΔD2 to determine a correction amount of the visual field deviation that occurs at the time of switching to the first mode from a state where the second camera 93 is set to an arbitrary enlargement magnification. Then, the visual field deviation is corrected such that the intersection point Cp and the position of the reference marker Ma coincide by moving the intersection point Cp of the position information Ic or moving the placement stage 5 or the head 6 according to the correction amount of the visual field deviation.

Figure 28:
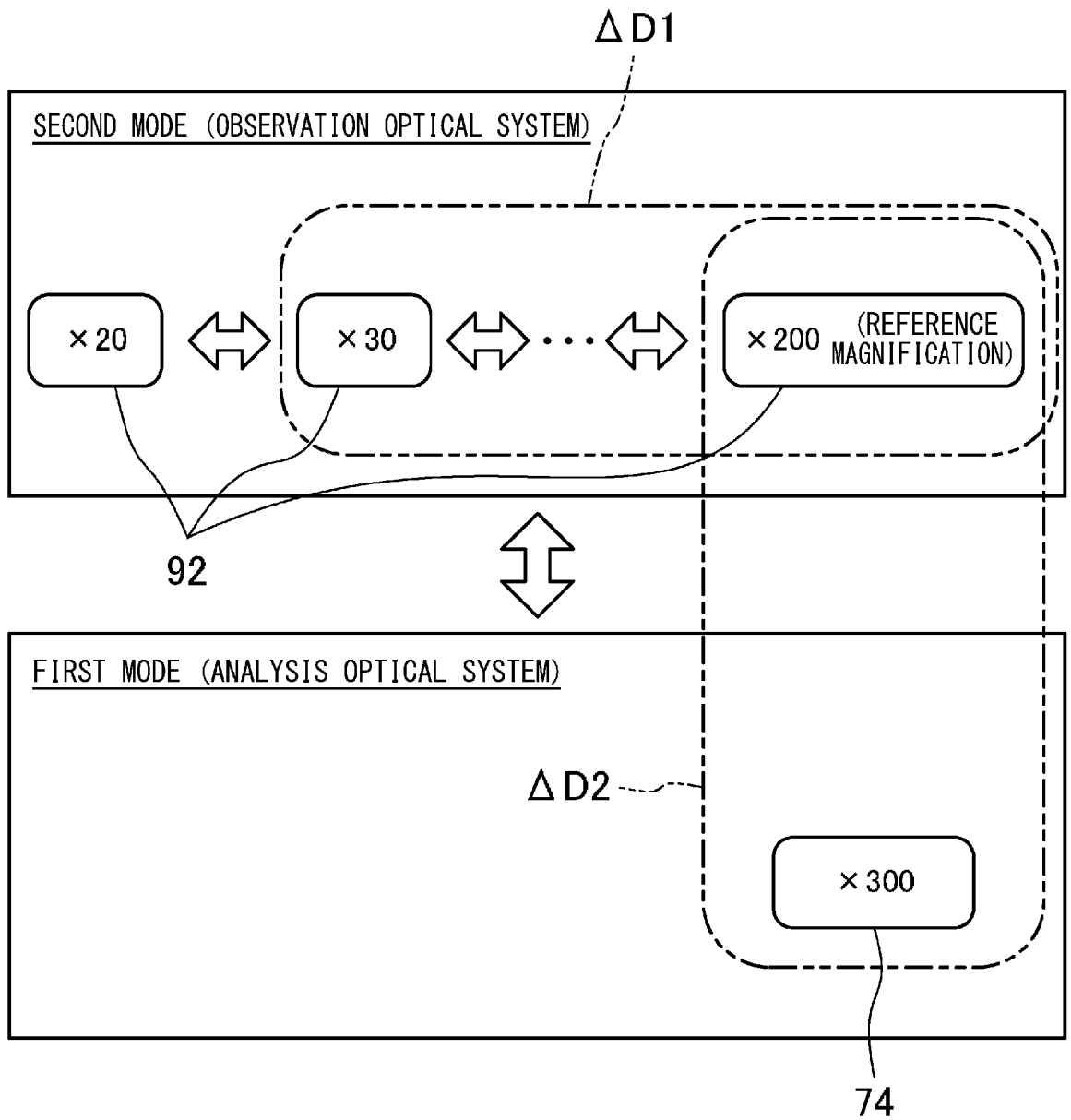
FIG. 28 is a view for describing correction of the optical axis deviation and the visual field deviation.

That is, assuming that the enlargement magnification can be changed in a plurality of ways from 20 times to 200 times in the observation optical system 9 as illustrated in FIG. 28, it is generally considered that it is necessary to calculate the second position difference ΔD2 for all the enlargement magnifications in order to correct the visual field deviation that occurs at the time of switching to the first mode from a state set to any one of the enlargement magnifications.

However, as long as only the first position difference ΔD1 generated between the reference magnification set in advance (for example, 200 times) and the predetermined magnification (for example, 30 times) and the second position difference ΔD2 generated at the time of switching to the first mode from the state set to the reference magnification are obtained in the observation optical system 9, the correction amount of the visual field deviation at all the enlargement magnifications can be obtained by combining the magnitude of the position variation, calculated based on the first position difference ΔD1 and the magnification difference, and the second position difference ΔD2.

The processor 21a according to the present embodiment can automatically correct the visual field deviation at the time of switching from the second mode to the first mode by, for example, the mode switcher 211.

3. Processing Related to Pre-Irradiation Image Pb and Post-Irradiation Image Pa

Here, classification based on a viewpoint of a generation timing of the image P as a second viewpoint and processing related to the classification will be described.

Note that the following description corresponds to a case in the first mode, that is, a case where the first camera 81 is used as the imaging section, but the first camera 81 can be appropriately replaced with the second camera 93. For example, the pre-irradiation image Pb and the post-irradiation image Pa may be generated by the second camera 93 instead of the first camera 81 or in addition to the first camera 81.

That is, the sample SP may be analyzed after generating the pre-irradiation image Pb based on a light reception signal from the first camera 81, and the post-irradiation image Pa may be generated based on a light reception signal from the first camera 81 after the analysis. In addition, the pre-irradiation image Pb may be generated based on a light reception signal from the second camera 93, then, the sample SP may be analyzed after switching from the observation optical system 9 to the analysis optical system 7 by the mode switcher 211, and the post-irradiation image Pa of the sample SP may be generated by the first camera 81 after the analysis.

Furthermore, the pre-irradiation image Pb may be generated based on a light reception signal from the second camera 93, then, the sample SP may be analyzed after switching from the observation optical system 9 to the analysis optical system 7 by the mode switcher 211, and the post-irradiation image Pa based on a light reception signal from the second camera 93 may be generated after switching to the observation optical system 9 by the mode switcher 211 again after the analysis of the sample SP.

The UI controller 215 according to the present embodiment can receive a start trigger signal for starting component analysis of the sample SP, and cause the display 22 to display the image P and an analysis result (see the dialog Wr in FIG. 19) Vd1 of the spectrum analyzer 213 as the component analysis section.

Figure 19:
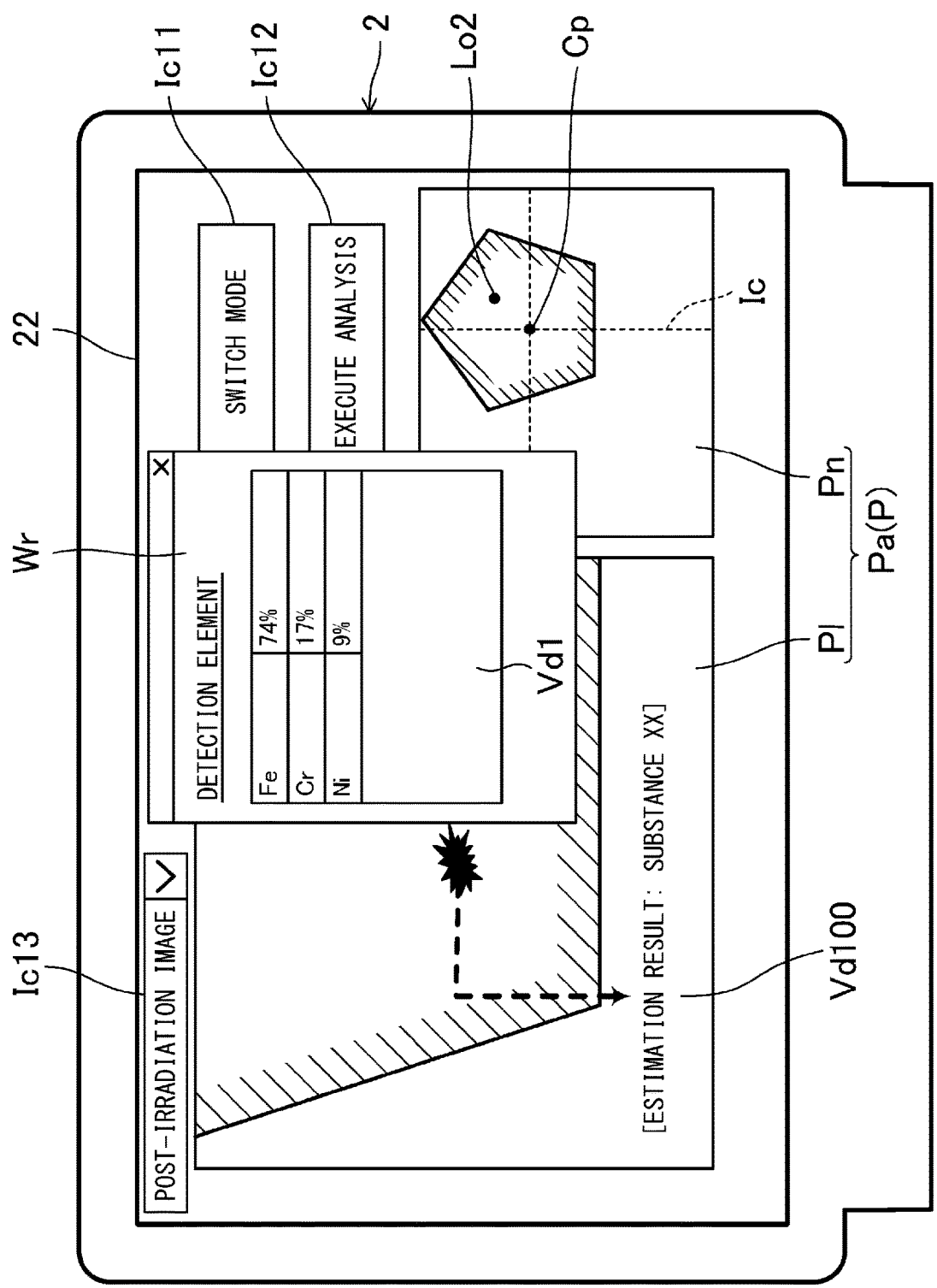
FIG. 19 is a view illustrating a display screen of a post-irradiation image.

At that time, the image P and the analysis result may be displayed in separate windows or may be displayed in a common window. Further, the image P and the analysis result may be sequentially displayed one by one through a click operation performed on a predetermined window (a display screen may be shifted from the image P to the analysis result or a display screen may be shifted from the analysis result to the image P). As illustrated in FIG. 19, the UI controller 215 can generate the image P in which the analysis result (for example, a name of a substance estimated by the component analysis as illustrated in text data Vd100 in FIG. 19) is superimposed on the pre-irradiation image Pb, and cause the image P to be displayed on the display 22.

Here, the UI controller 215 receives, for example, the start trigger signal when the click operation is input to the icon Ic24 in the dialog W1 as illustrated in FIG. 17.

The processor 21a according to the present embodiment generates the pre-irradiation image Pb, which is the image P before the sample SP is irradiated with laser light as a primary electromagnetic wave, as the imaging controller 214 controls the second camera 93 in response to the reception of the start trigger signal by the UI controller 215. The generated pre-irradiation image Pb can be displayed on the display 22 as illustrated in FIG. 14 or stored in the primary storage device 21b or the secondary storage device 21c.

Note that the pre-irradiation image Pb, which is the image before the sample SP is irradiated with the laser light as the primary electromagnetic wave, can also be generated as the imaging controller 214 controls the first camera 81 in response to the reception of the start trigger signal. Furthermore, it may be configured such that a dialog such as "Do you want to capture a pre-irradiation image?" may be displayed to the user in response to the reception of the start trigger signal, and the user's input operation for the dialog is received to generate the pre-irradiation image Pb. In this case, the pre-irradiation image Pb can be left only at a timing desired by the user.

Thereafter, the processor 21a emits laser light to the sample SP as the spectrum acquirer 212 controls the electromagnetic wave emitter 71 after the imaging controller 214 controls the second camera 93.

Here, the image P that can be used as the pre-irradiation image Pb includes an image acquired by the first camera 81 or the second camera 93 before analysis of the sample SP in response to the reception of the start trigger signal described above. Note that at least one of the live image Pl and the navigation image Pn acquired before receiving the start trigger signal may be used as the pre-irradiation image Pb.

In the example illustrated in FIG. 14, the processor 21*a* is configured to store both the live image Pl and the navigation image Pn in a state where the first analysis point Lo1 has been specified as the pre-irradiation image Pb.

When the sample SP is irradiated with the laser light, destruction occurs at the first analysis point Lo1 as an irradiation position according to laser power, the number of times of laser emission, and the like as illustrated in FIG. 19.

At that time, the processor 21*a* according to the present embodiment generates the post-irradiation image Pa, which is an image P after the sample SP is irradiated with the laser light as the imaging controller 214 controls the first camera 81 or the second camera 93 after the spectrum acquirer 212 controls the electromagnetic wave emitter 71 to emit the laser light to the sample SP. The generated post-irradiation image Pa is displayed on the display 22 as illustrated in FIG. 19 or stored in the primary storage device 21*b* or the secondary storage device 21*c*.

Here, the image P that can be used as the post-irradiation image Pa includes an image obtained as the imaging controller 214 controls the first camera 81 or the second camera 93 after the laser light is emitted to the sample SP. Specifically, an image of the sample SP, acquired by controlling the first camera 81 of the analysis optical system 7 without changing the position of the analysis optical system 7 after emitting the laser light to the sample SP, may be included. Further, an image of the sample SP, acquired by switching from the analysis optical system 7 to the observation optical system 9 by the mode switcher after the laser light is emitted to the sample SP and controlling the second camera 93 of the observation optical system 9, may be included.

The processor 21*a* according to the present embodiment is configured to automatically generate and store the pre-irradiation image Pb and the post-irradiation image Pa. Note that the post-irradiation image Pa may include at least one of the live image Pl and the navigation image Pn, which is similar to the pre-irradiation image Pb. As the navigation image included as the post-irradiation image Pa, a low-magnification image reacquired by the imaging controller 214 after emitting the laser light to the sample SP can be used. The processor 21*a* according to the present embodiment is configured to automatically execute the generation and storage of the live image Pl and the navigation image Pn as the pre-irradiation image Pb, and the generation and storage of the live image Pl and the navigation image Pn as the post-irradiation image Pa.

The pre-irradiation image Pb and the post-irradiation image Pa are managed in association with an analysis result of the spectrum analyzer 213. Therefore, the pre-irradiation image Pb and the post-irradiation image Pa corresponding to the analysis result can be switched and displayed as appropriate when the analysis result is displayed on the display 22 as will be described later.

Note that it may be configured such that a scale of the acquired image P and a comment for the acquired image P can be stored in association with each other, in addition to associating the analysis result with the pre-irradiation image Pb and the post-irradiation image Pa.

The scale used at that time can be switched by receiving the user's selection. Examples of setting items that can be switched at that time include "Mesh" that displays a mesh-shaped scale, "Cross" that displays a scale on a cross, a "bar" that displays a bar-shaped scale along a predetermined direction, and an "XY bar" that displays two L-shaped scales along the XY directions in addition to "None" that causes the scale not to be displayed. Further, a width of the scale can also be set in addition to a type of the scale. When the analysis result and the image P are stored in a state where the scale whose type and width have been set is superimposed and displayed on the image P displayed on the display 22 in this manner, it is possible to store the image P on which the analysis result and the scale are superimposed and displayed.

In addition, when a specific icon on the display 22 is selected, a window is displayed on the display 22, and a figure can be superimposed and displayed on the image P, the date, time, and the like can be superimposed and displayed on the image P, or any comment of the user can be superimposed and displayed on the image P by operating the window. Information such as the above superimposed and displayed figure, comment, and the like can be stored in association with the analysis result and the image P when the analysis result and the image P are stored. Both the scale and the information such as the figure and the comment may be stored, or one of them may be stored.

In the examples illustrated in FIGS. 14 and 19, an image that needs to be displayed on the display 22 can be switched to at least one of the pre-irradiation image Pb and the post-irradiation image Pa by operating the icon Ic13.

Further, as described above, an imaging position of each of the images P can be changed as the UI controller 215 receives the specification of the first analysis point Lo1 and the second analysis point Lo2 corresponding to an irradiation position of laser light, respectively, in each of the live image Pl and the navigation image Pn used as the pre-irradiation image Pb. The processor 21*a* can perform emission of the laser light by the spectrum acquirer 212 in a state where the imaging position has been changed.

As described above, the specification can be made for a plurality of points. As a method for specifying a plurality of points, it is possible to consider specification within the same visual field using one live image Pl and specification within a plurality of visual fields using a plurality of live images P1 or one or more navigation images Pn. The UI controller 215 according to the present embodiment can receive both of the two types of specification.

Then, the processor 21*a* according to the present embodiment is configured to sequentially generate the pre-irradiation image Pb for each irradiation position when the irradiation position of the laser light is specified over a plurality of points.

Specifically, the UI controller 215 is configured to be capable of receiving the specification of the first analysis point Lo1 on the live image Pl over a plurality of points. When the UI controller 215 receives the specification of the first analysis point Lo1 over the plurality of points, the processor 21*a* causes the placement stage drive 53 to move the imaging position such that one first analysis point Lo1 among the plurality of received first analysis points Lo1 is brought close to the visual field center of the live image Pl for each of the plurality of received first analysis points Lo1.

Then, the processor 21*a* causes the imaging controller 214 to generate the pre-irradiation image Pb in a state where the one first analysis point Lo1 is brought close to the visual field range of the live image Pl, causes the electromagnetic wave emitter 71 to emit the laser light to the sample SP after generating the pre-irradiation image Pb by the imaging controller 214, and causes the spectrum analyzer 213 to execute component analysis at the one first analysis point Lo1. When the plurality of first analysis points Lo1 have been specified within the same visual field that falls within one live image Pl in this manner, the pre-irradiation images Pb can be generated from the live images Pl at the respective first analysis points Lo1, and the component analysis can be performed by irradiating the respective first analysis points Lo1 with the laser light.

The same processing can also be performed in the specification of the second analysis point Lo2 on the navigation image Pn. Specifically, the UI controller 215 is configured to be capable of receiving the specification of the second analysis point Lo2 on the navigation image Pn over a plurality of points. When the UI controller 215 receives the specification of the second analysis point Lo2 over the plurality of points, the processor 21a causes the placement stage drive 53 to move the imaging position such that one second analysis point Lo2 among the plurality of received second analysis points Lo2 falls within the visual field range of the live image Pl for each of the plurality of received second analysis points Lo2.

Then, the processor 21a causes the imaging controller 214 to generate the pre-irradiation image Pb in a state where the one second analysis point Lo2 falls within the visual field range of the live image Pl, causes the electromagnetic wave emitter 71 to emit the laser light to the sample SP after generating the pre-irradiation image Pb by the imaging controller 214, and causes the spectrum acquirer 212 to execute component analysis at the one second analysis point Lo2.

Figure 20:
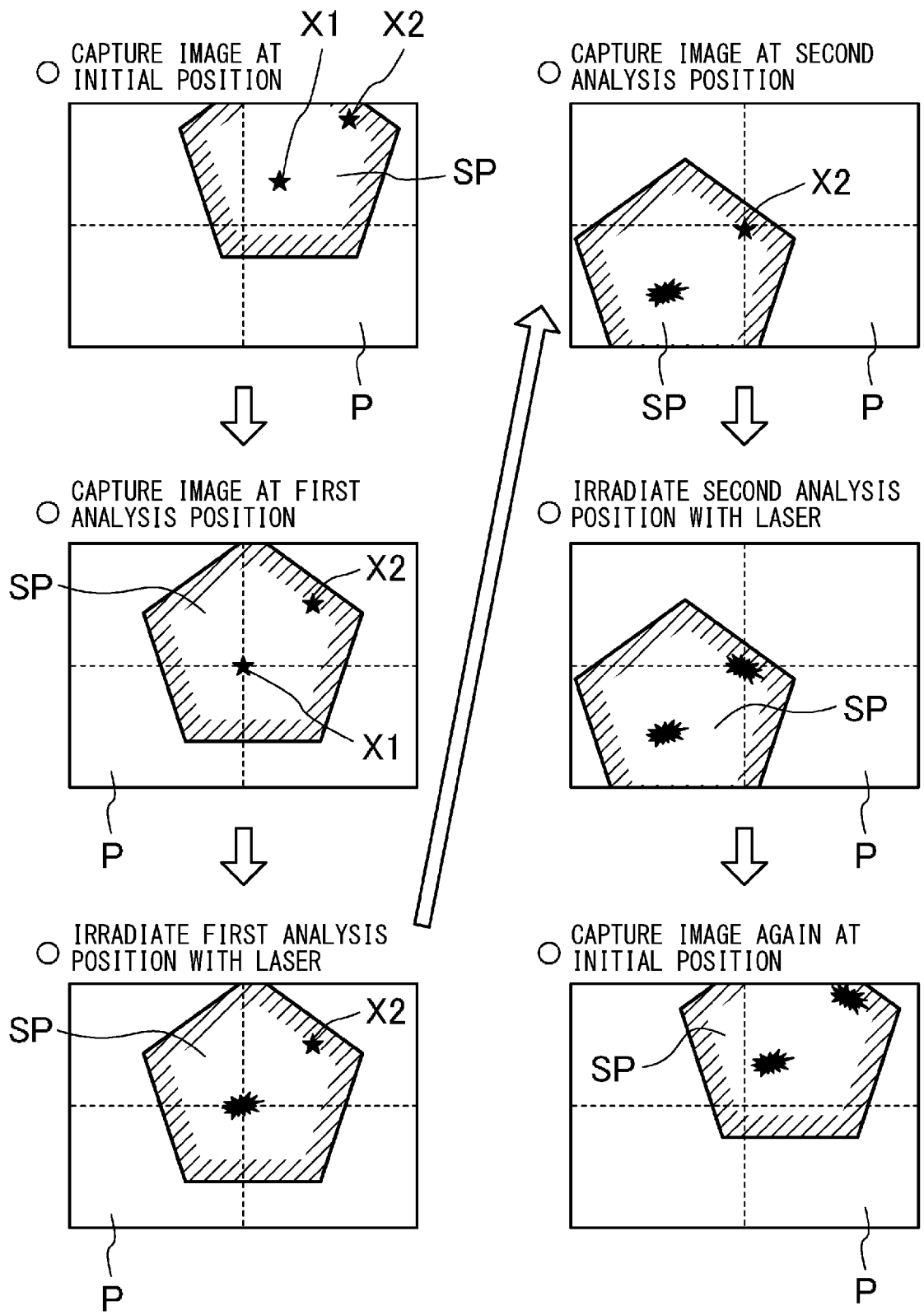
FIG. 20 is a view for describing processing when a plurality of points are irradiated with laser light.

For example, as illustrated in FIG. 20, considered is a case where at least one of the first analysis point Lo1 and the second analysis point Lo2 has been specified over a plurality of points on at least one image P of the live image Pl and the navigation image Pn. In this case, assuming that at least one of the first analysis point Lo1 and the second analysis point Lo2 is simply collectively referred to as an "analysis point" and two analysis points X1 and X2 are specified on the surface of the sample SP, the imaging controller 214 first generates the pre-irradiation image Pb at an initial position without moving an imaging position from the initial position (an imaging position at a timing when the analysis points X1 and X2 have been specified) (see the upper view in the left part of FIG. 20).

Thereafter, the imaging controller 214 moves the placement stage 5 such that one analysis point (first analysis position) X1 of the two analysis points X1 and X2 is brought close to a visual field center, and generates the pre-irradiation image Pb corresponding to the first analysis position X1 in a state were the placement stage 5 has been moved (see the central view in the left part of FIG. 20).

Thereafter, the imaging controller 214 generates the post-irradiation image Pa corresponding to the first analysis position X1 after the spectrum acquirer 212 irradiates the first analysis position X1 with laser light (see the lower view in the left part of FIG. 20). The spectrum analyzer 213 executes component analysis at the first analysis position X1 before and after the generation of the post-irradiation image Pa or simultaneously with the generation of the post-irradiation image Pa.

Thereafter, the imaging controller 214 moves the placement stage 5 such that the other analysis point (second analysis position) X2 of the two analysis points X1 and X2 is brought close to a visual field center, and generates the pre-irradiation image Pb corresponding to the second analysis position X2 in a state were the placement stage 5 has been moved (see the upper view in the right part of FIG. 20).

Thereafter, the imaging controller 214 generates the post-irradiation image Pa corresponding to the second analysis position X2 after the spectrum acquirer 212 irradiates the second analysis position X2 with laser light (see the central view in the right part of FIG. 20). The spectrum analyzer 213 executes component analysis at the second analysis position X2 before and after the generation of the post-irradiation image Pa or simultaneously with the generation of the post-irradiation image Pa.

Thereafter, the imaging controller 214 moves the imaging position to the initial position and generates the post-irradiation image Pa at the initial position (see the lower view in the right part of FIG. 20).

In this manner, the imaging controller 214 according to the present embodiment is configured to generate the pre-irradiation image Pb and the post-irradiation image Pa at each of the plurality of analysis points X1 and X2, generate the pre-irradiation images Pb of the entire sample SP at the timing before the start of the analysis (timing before each of the plurality of analysis points X1 and X2 is irradiated with the laser light), and generate the post-irradiation images Pa of the entire sample SP at the timing after the completion of the analysis (timing after all of the plurality of analysis points X1 and X2 are irradiated with the laser light). Further, the spectrum analyzer 213 performs the component analysis for each of the plurality of analysis points X1 and X2 so that the component analysis can be performed at various points on the surface of the sample SP.

Note that it is not always necessary to generate the pre-irradiation image Pb at the timing before the start of the analysis at each of the plurality of analysis points X1 and X2. For example, in a case where the plurality of analysis points X1 and X2 are set on different samples SP, it is possible to generate both the pre-irradiation image Pb before the analysis point X1 is irradiated with the laser light and the pre-irradiation image Pb before the analysis point X2 is irradiated with the laser light. On the other hand, in a case where the plurality of analysis points X1 and X2 are set on the same sample SP, only the pre-irradiation image Pb before the analysis point X1, which is the initial position, is irradiated with the laser light may be generated.

Furthermore, an analysis result can also be superimposed and displayed on at least one of the pre-irradiation image Pb and the post-irradiation image Pa. At that time, in a case where a plurality of analysis points have been set, the analysis result as illustrated in the text data Vd100 in FIG. 19 may be superimposed and displayed for each analysis point. For example, when component analysis of the sample SP is performed by irradiating the sample SP with laser light, the sample SP changes with the irradiation of the laser light. When the analysis result is superimposed on the pre-irradiation image Pb, a state before the change occurs in the sample SP and the result obtained by analyzing the sample SP can be displayed, which is convenient for the user.

Further, the imaging controller 214 can synthesize the images P generated at different Z-positions to generate the omnifocal image Pc as described above. At that time, the processor 21a can acquire height data of the surface of the sample SP by utilizing the fact that the focus is different at each Z-position, and perform focusing suitable for each of the plurality of analysis points X1 and X2 using the height data.

That is, the imaging controller 214 according to the present embodiment generates the image P at each of a plurality of height positions by utilizing the fact that the head drive 47 as the electric drive is configured to move a collection position indicating a relative position of the placement stage 5 with respect to the reflective object lens 74 along the Z direction. The spectrum acquirer 212 identifies a height along the Z direction at the first analysis point Lo1 received by the UI controller 215 based on each of the generated images P, and stores the height in the primary storage device 21b or the like as the height data. The spectrum acquirer 212 also controls the head drive 47 or the placement stage drive 53 based on the identified height to move the collection position along the first direction such that the laser light emitted from the electromagnetic wave emitter 71 is focused on the first analysis point Lo1.

Figure 21:
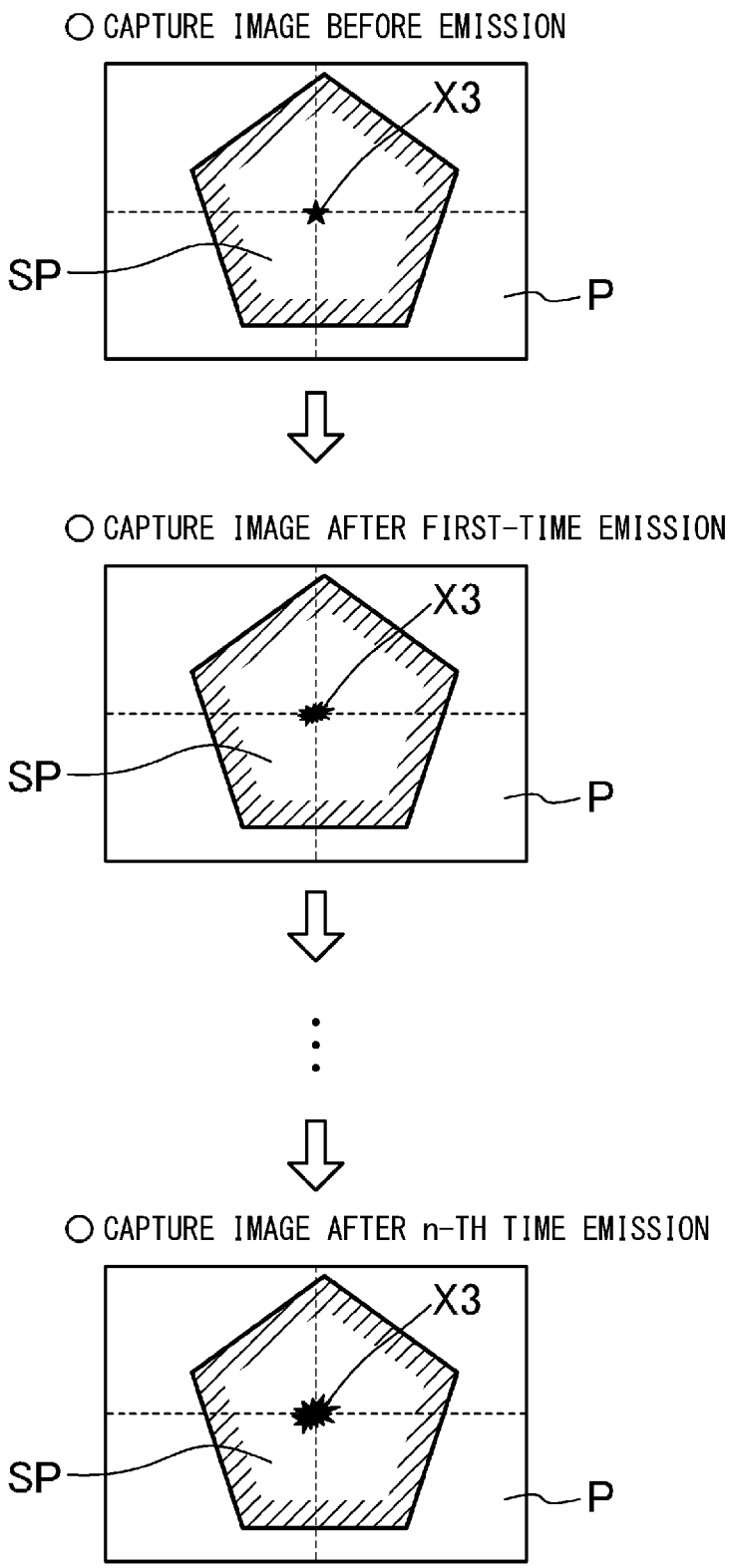
FIG. 21 is a view for describing processing when the identical point is irradiated with laser light.

Note that the plurality of analysis points are set to be at different positions from each other in the example illustrated in FIG. 20, but a plurality of analysis points may be set at the same position as illustrated in FIG. 21, for example. In this case, the analysis and observation device A irradiates a specific analysis point X3 with laser light a plurality of times (n times in the example illustrated in the drawing).

In the case of the example illustrated in FIG. 21, first, the imaging controller 214 generates the pre-irradiation image Pb at an initial position without moving an imaging position from the initial position (imaging position at a timing when the analysis point X3 has been specified) (see the upper view of FIG. 21).

Thereafter, the imaging controller 214 generates the post-irradiation image Pa corresponding to the analysis position X3 after the spectrum acquirer 212 irradiates the analysis point X3 with laser light (see the central view of FIG. 21). The spectrum analyzer 213 executes component analysis at the analysis point X3 before and after the generation of the post-irradiation image Pa or simultaneously with the generation of the post-irradiation image Pa.

Thereafter, the imaging controller 214 generates the post-irradiation image Pa corresponding to the analysis position X3 every time the spectrum acquirer 212 irradiates the analysis point X3 with the laser light. Each time the laser light is emitted, the spectrum analyzer 213 executes the component analysis at the analysis point X3 before or after the generation of the post-irradiation image Pa or simultaneously with the generation of the post-irradiation image Pa.

After a total of n times of the irradiation with the laser light have been completed, one pre-irradiation image Pa and n post-irradiation images Pb are generated, and at the same time, results of the component analysis executed n times are obtained.

In this manner, the imaging controller 214 according to the present embodiment generates the post-irradiation image Pa every time the specific analysis point X3 is irradiated with the laser light. As a plurality of the post-irradiation images Pa generated in this manner are collated with the pre-irradiation image Pa generated in advance, the user can grasp the change in the sample SP caused by the irradiation of the laser light as a primary electromagnetic wave. Further, the spectrum analyzer 213 repeatedly performs the component analysis at the specific analysis point X3 so that the surface of the sample SP can be excavated and information on a component in the sample SP can be acquired.

Further, in the case where the specific analysis point X3 is repeatedly irradiated with the laser light, the component analysis can be executed every time the laser light is emitted, and a result of the analysis can also be superimposed and displayed on the display 22. In this case, the user can intuitively grasp a relationship between a depth of the excavation of the sample SP and an analysis result at the depth.

4. Processing Related to Overhead Camera 48

The imaging controller 214 also generates a bird's-eye view image Pf of the sample SP based on a light reception amount of reflection light detected by the overhead camera 48. The bird's-eye view image Pf thus generated is displayed on the display 22 by the UI controller 215.

Figure 22:
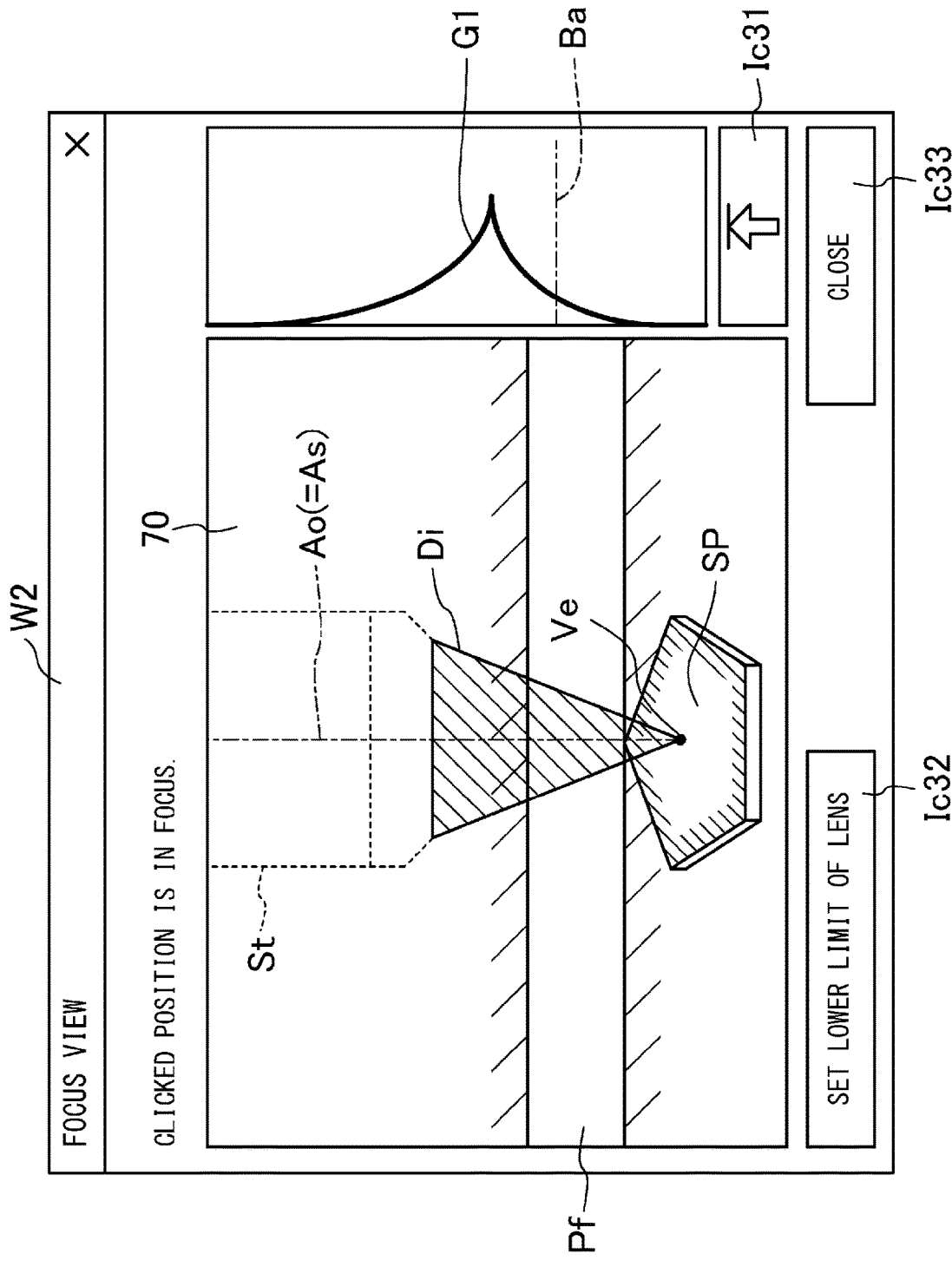
FIG. 22 is a view illustrating a display screen of a bird's-eye view image.
Figure 23:
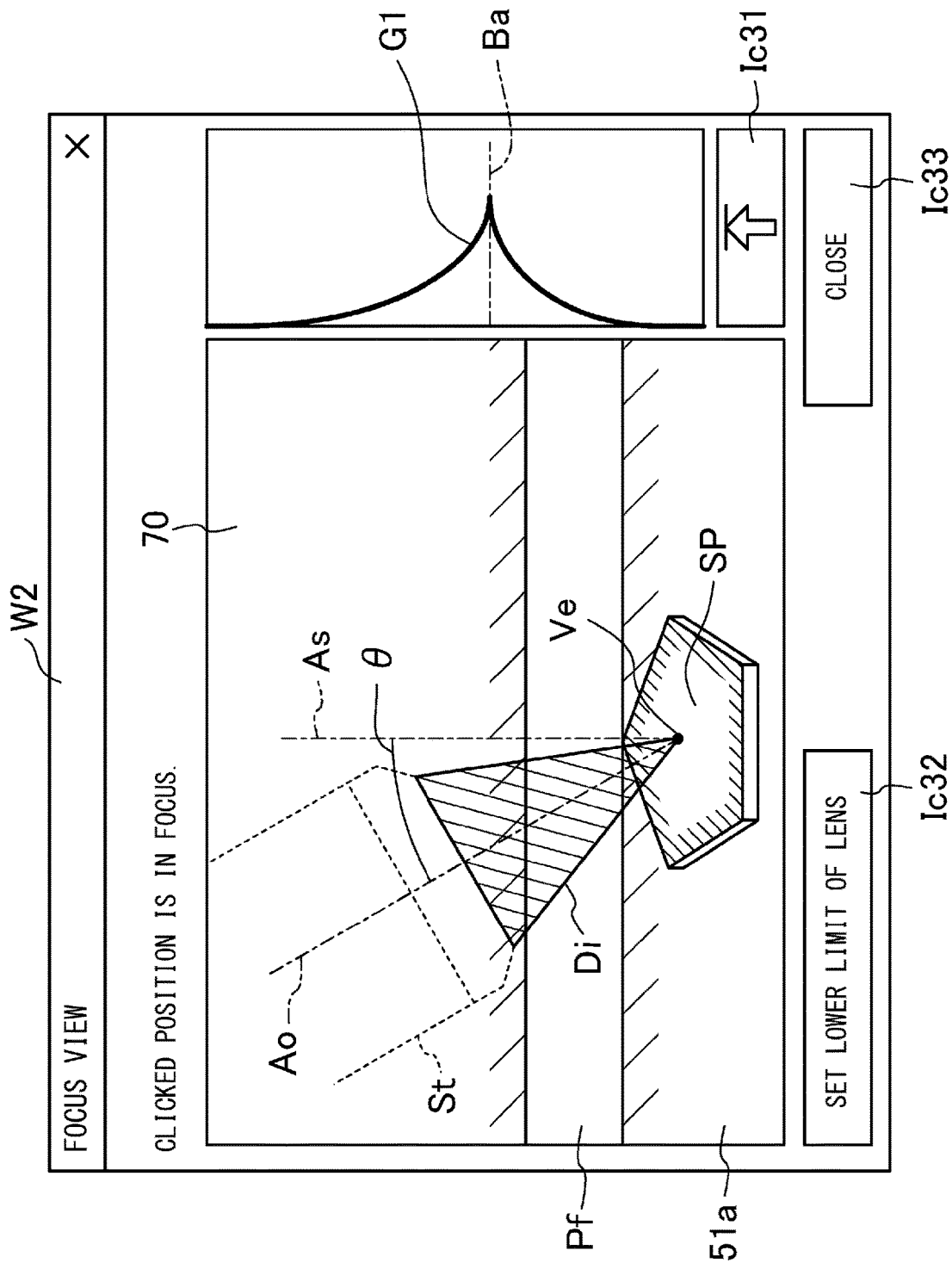
FIG. 23 is a view illustrating the display screen of the bird's-eye view image.

FIGS. 22 and 23 are views illustrating a display screen of the bird's-eye view image Pf. As illustrated in FIG. 22, the imaging controller 214 displays a window W2 illustrating the bird's-eye view image Pf on the display 22. The bird's-eye view image Pf corresponds to an image of the sample SP viewed from the side.

Note that the analysis housing 70 of the analysis unit 62 is interposed between the overhead camera 48 and the objective lens 92 of the observation unit 63 as illustrated in FIG. 6. Therefore, there is a possibility that the objective lens 92 is hidden by the analysis housing 70 depending on dimensions of the analysis housing 70. This is inconvenient for grasping a relative positional relation between the objective lens 92 and the sample SP through the bird's-eye view image Pf.

Therefore, the UI controller 215 according to the present embodiment generates a schematic shape St representing a contour of the objective lens 92, and superimposes and displays the schematic shape St on the bird's-eye view image Pf. As a result, the user can grasp the relative positional relation between the objective lens 92 and the sample SP through the bird's-eye view image Pf.

Further, the UI controller 215 is configured to tilt the schematic shape St superimposed and displayed on the bird's-eye view image Pf as the observation unit 63 is tilted by the tilting mechanism 45 as illustrated in FIG. 23. As a result, the user can intuitively grasp the tilt θ of the observation optical axis Ao with respect to the reference axis As.

Further, a figure Di corresponding to visible light emitted from the objective lens 92 is also superimposed and displayed on the bird's-eye view image Pf as illustrated in FIGS. 22 and 23. This figure Di is displayed as an isosceles triangle with its vertex Ve directed downward. The vertex Ve of the figure Di indicates a focal position formed by the objective lens 92. Therefore, a state where the vertex Ve is located on the surface of the sample SP corresponds to a state where the visible light is focused (state where the visible light is in focus) on the surface of the sample SP. The figure Di functions as a criterion at the time of moving the objective lens 92 in the Z direction.

Further, in the window W2 in which the bird's-eye view image Pf is displayed, a graph (more accurately, graph of which the vertical axis represents a height position of the objective lens 92 and the horizontal axis represents the magnitude of a focus value) G1 representing the magnitude of the focus value of the visible light with respect to the height position of the objective lens 92 is displayed. Here, the "height position" indicates a relative position of the objective lens 92 with respect to the placement surface 51a in the Z direction (first direction). It is assumed that the "height position" similarly indicates relative positions in the Z direction with respect to the placement surface 51a regarding components other than the objective lens 92.

A bar Ba indicating a current height position of the objective lens 92 is superimposed and displayed on this graph G1, and it is possible to make the visible light in focus by receiving an operation input of an icon Ic31 in a state where the height position of the objective lens 92 is adjusted such that the bar Ba is positioned at a peak position of the focus value.

Further, a lower limit of the height position of the objective lens 92 can be set by receiving an operation input of an icon Ic32 in a state where the objective lens 92 and the sample SP are brought close to each other. The lower limit set in this manner is used at the time of generating the omnifocal image or the like.

Here, the tilting mechanism 45 and the placement stage drive 53 are configured to maintain a eucentric relation. Thus, even if the observation optical axis Ao is tilted by the tilting mechanism 45 or the placement stage 5 is rotated by the placement stage drive 53, it is possible to maintain the state where the vertex Ve of the figure Di is located on the surface of the sample SP. When the observation optical axis Ao is tilted with respect to the reference axis As, for example, as illustrated in FIG. 23, the vertex Ve of the figure Di does not move from the surface of the sample SP and holds the position before the tilting.

The bird's-eye view image Pf generated by the imaging controller 214 can be displayed on a report Rep output by the report output section 218. For use in such an application, the imaging controller 214 can capture an image of the sample SP to generate the bird's-eye view image Pf after the component analysis of the sample SP by the spectrum acquirer 212 and the spectrum analyzer 213 is completed or before the component analysis of the sample SP is performed. A setting of whether or not to generate the bird's-eye view image Pf and a setting of a timing for generating the bird's-eye view image Pf can be appropriately changed based on, for example, an operation input with respect to the operation section 3.

Further, when the bird's-eye view image Pf is generated after the component analysis of the sample SP is completed or before the component analysis of the sample SP is performed, the imaging controller 214 retracts at least one of the placement stage 5 and the head 6 before the generation of the bird's-eye view image Pf. Specifically, the imaging controller 214 can retract the placement stage 5 and the head 6 by operating at least one of the placement stage 5 and the head 6 such that the head 6 and the placement stage 5 are separated from each other along the Z direction. As the placement stage 5 is retracted, it is possible to prevent the analysis housing 70, the objective lens 92, and the like from being reflected on the bird's-eye view image Pf.

Further, there is a case where it is difficult to obtain a bird's-eye view of the entire sample SP simply by capturing an image of the sample SP with the overhead camera 48 depending on a shape of the sample SP. Therefore, it may be configured such that the sample SP can be directed in a direction opposing the overhead camera 48, for example, by partially tilting the placement stage 5.

Specifically, it may be configured such that a rotation axis provided in the left-right direction of the placement surface 51a and a substantially semicircular stage member rotating about the rotation axis are provided on the placement stage 5 and the stage member is tilted to face the overhead camera 48 side only when it is necessary to capture an image of the sample SP with the overhead camera 48. Note that, instead of the configuration in which the placement stage 5 is provided with the tilting mechanism, the placement stage 5 may be provided with a fitting groove for fitting with a tilting plate such that the tilting plate engaged with the fitting groove may form a tilted surface that is tilted with respect to the placement stage 5.

The bird's-eye view image Pf generated by the imaging controller 214, and the schematic shape St and the figure Di superimposed on the bird's-eye view image Pf are input to the report output section 218, which will be described later, and used for report generation.

5. Association of Each Image P with Analysis Result

The UI controller 215 can cause the display 22 to display the navigation image Pn as a low-magnification image, the live image Pl as a high-magnification image, the bird's-eye view image Pf, and the dialog Wr indicating the analysis result Vd1, and further, also cause the display 22 to display a first interface W3 that receives an operation input for storing at least one image P of the navigation image Pn and the live image Pl in association with an analysis result.

Figure 24:
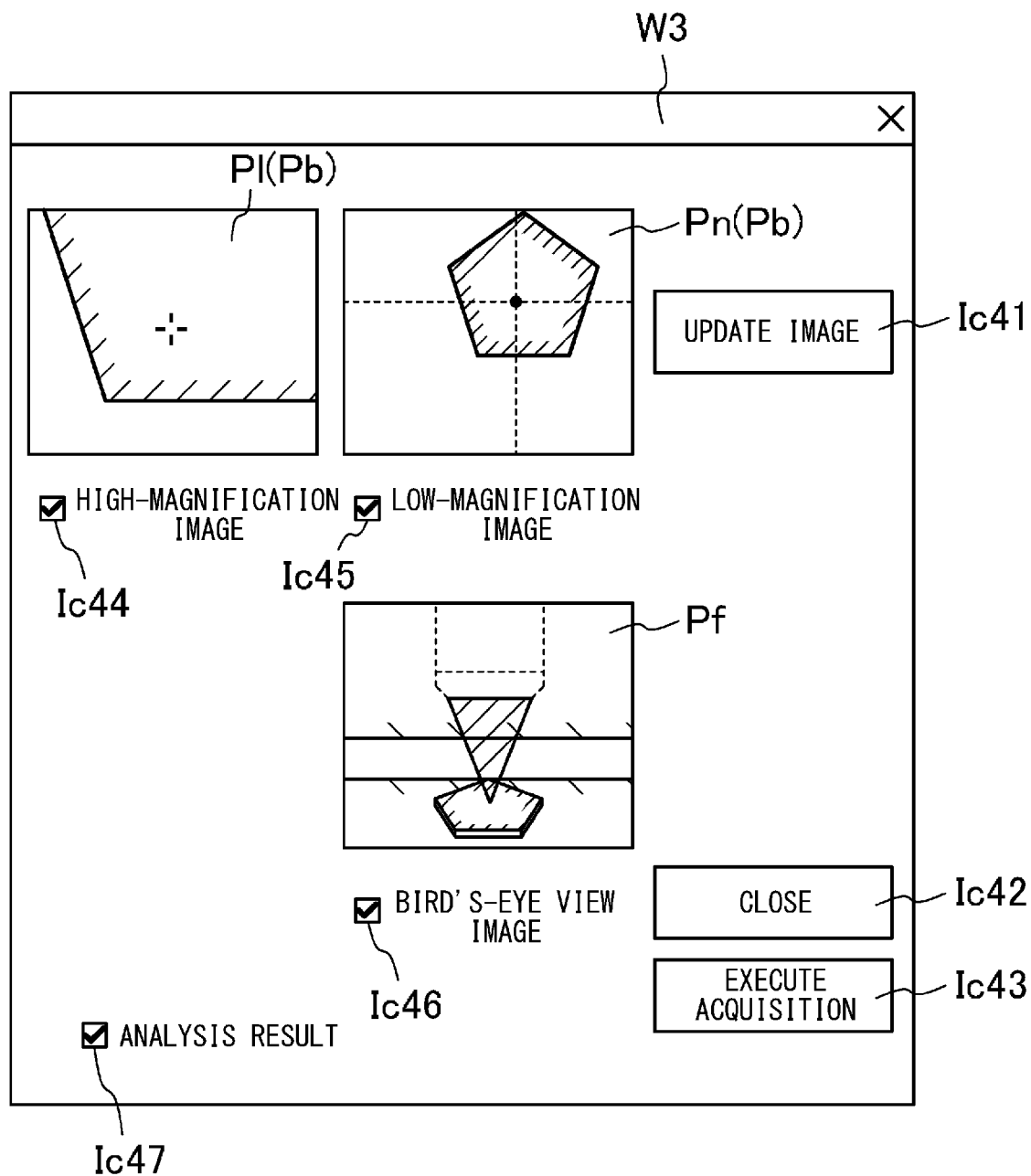
FIG. 24 is a view for describing association of each image.

The first interface W3 can be configured using, for example, a dialog as illustrated in FIG. 24. In this first interface W3, displayed are a check box Ic44 that receives an operation input for storing the live image Pl, which is a high-magnification image, in association with the analysis result, a check box Ic45 that receives an operation input for storing the navigation image Pn, which is a schematic image, in association with the analysis result, and a check box Ic46 that receives an operation input for storing the bird's-eye view image Pf in association with the analysis result. For example, the live image Pl is stored in association with the analysis result if the check box Ic44 is checked, and the live image Pl is not stored in association with the analysis result if the check box is unchecked. The live image Pl associated with the analysis result is output to the report Rep by the report output section 218.

The same applies to the other check boxes Ic45 to Ic47. For example, if the check box Ic47 is unchecked, the live image Pl, the navigation image Pn, and the bird's-eye view image Pf are stored in association with each other, but the analysis result is not stored. The first interface W3 functions as a selection screen configured to individually select whether or not to display each of the navigation image Pn as the low-magnification image, the live image Pl as the high-magnification image, and the analysis result on a report Rep when the report output section 218 outputs the report Rep.

In addition, an icon Ic41 on the first interface W3 is a button configured to update at least one image P of the navigation image Pn used as the low-magnification image and the live image Pl used to generate the high-magnification image and the pre-irradiation image Pb. That is, the icon Ic41 is the button configured to change an image to be stored at the time of storing the analysis result in at least one of the primary storage device 21b and the secondary storage device 21c as the storage section to a newly acquired image or one image selected from the other already acquired images, instead of the image displayed on the first interface W3. The UI controller 215 causes the display 22 to display a display screen W4 configured to update the at least one image P in response to the reception of an instruction for such a change.

An icon Ic42 is a button for closing the display of the first interface W3. When an operation input corresponding to the icon Ic42 is received, the first interface W3 for the image update is closed to return to the screen illustrated in FIG. 14 or the like. On the other hand, when an operation input corresponding to an icon Ic43 is received on the first interface W1, the image P displayed in a display area is stored as will be described later. Note that the configuration in which the icon Ic43 is displayed on the first interface W1 is not essential, and the icon Ic43 may be displayed on the screen illustrated in FIG. 14 or the like.

Figure 25:
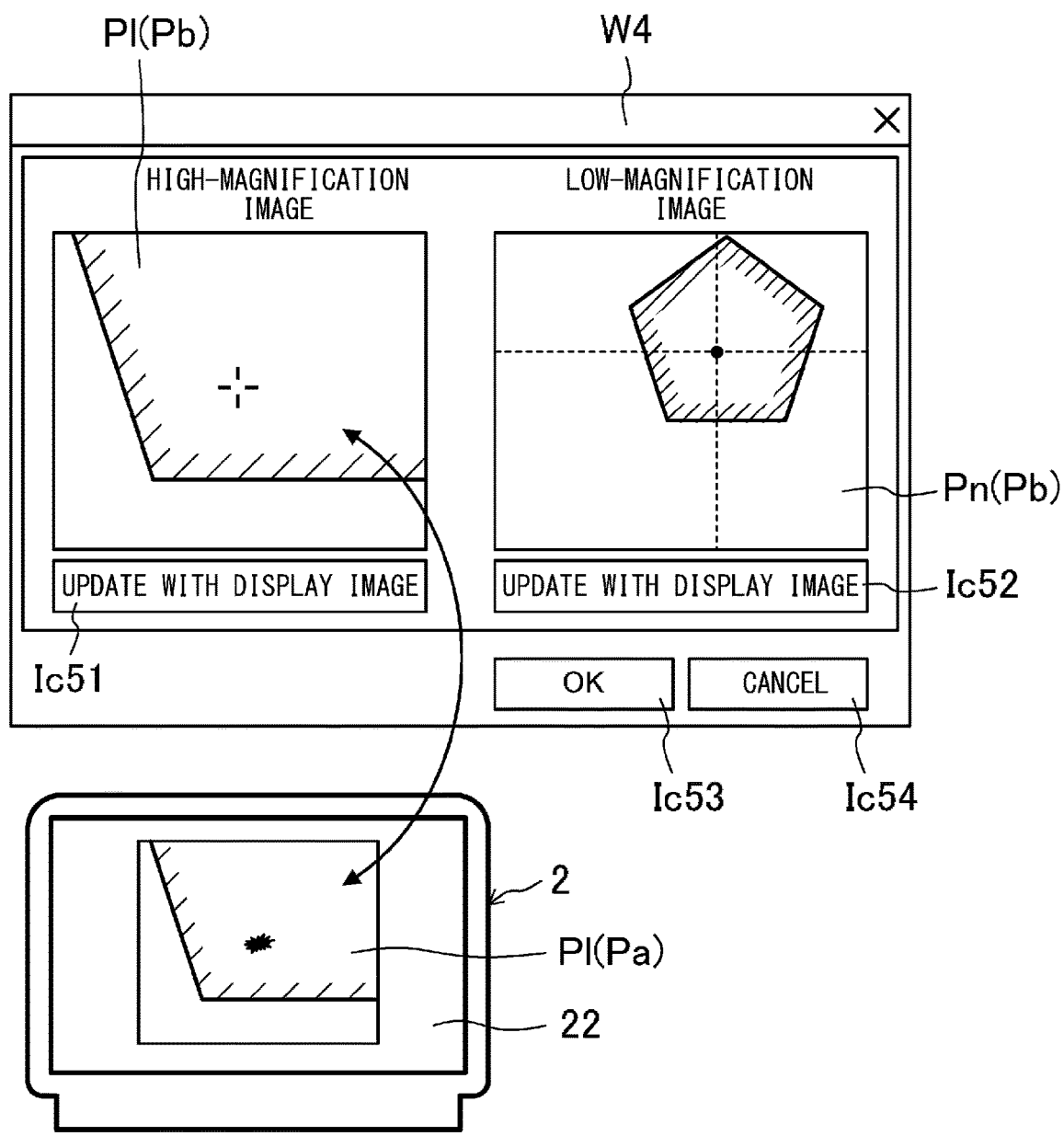
FIG. 25 is a view for describing update of each image.

As illustrated in FIG. 25, the display screen W4 is updated with the at least one image (both the navigation image Pn and the live image Pl in the example illustrated in the drawing) P and icons Ic51 and Ic52 serving as a second interface for updating the image P. When the UI controller 215 receives, for example, an operation input for the icon Ic51, the live image Pl that needs to be associated with the analysis result is updated with the image P displayed on the display 22 at the time of the reception. At that time, the live image Pl may be updated with the post-irradiation image Pa displayed on the display 22 at the time of reception, or the live image Pl may be replaced with the pre-irradiation image Pb generated before the acquisition of the analysis result. The same applies to the navigation image Pn. Further, when an operation input for an icon Ic53 displayed as "OK" is received, the UI controller 215 completes the update of the live image Pl and the navigation image Pn. Further, when an operation input for an icon Ic54 displayed as "Cancel" is received, the UI controller 215 cancels the update of the live image Pl and the navigation image Pn.

Further, when the operation input for the icon Ic43 on the first interface W3 is received, the UI controller 215 can complete the association of the live image Pl, the navigation image Pn, the bird's-eye view image Pf, the analysis result, and the like, and store a result of the association in the secondary storage device 21c.

—Illumination Setting Section 216—

When switching from the first mode to the second mode or switching from the second mode to the first mode, the illumination setting section 216 stores an illumination condition before the mode switching and sets an illumination condition after the mode switching based on the stored illumination condition.

Specifically, the illumination setting section 216 according to the present embodiment sets the illumination condition after the switching such that an illumination condition, which has been referred to before the switching among an illumination condition related to the coaxial illuminator 79 and an illumination condition related to the side illuminator 84 in the first mode, and an illumination condition related to the second coaxial illuminator 94 and an illumination condition related to the second side illuminator 95 in the second mode, is reproduced before and after the switching between the first mode and the second mode.

Here, the illumination condition refers to control parameters related to the first camera 81, the coaxial illuminator 79, and the side illuminator 84 and control parameters related to the second camera 93, the second coaxial illuminator 94, and the second side illuminator 95. The illumination conditions include a light amount of each illuminator, a lighting state of each illuminator, and the like. The illumination conditions include a plurality of items that can be changed in setting.

The control parameters related to the light amount of each illuminator include a magnitude of a current flowing through the LED light source 79a, a timing of energizing with the current, an energizing time, and the like. For example, the light amount of the coaxial illuminator 79 can be controlled through the magnitude of the current flowing through the LED light source 79a. The control parameters also include each exposure time of the first camera 81, the second camera 93, and the like.

The illumination setting section 216 compares a current illumination condition, that is, an item that has been referred to before the mode switching and an item that can be set after the mode switching among the illumination conditions including a plurality of setting items to extract a common item.

The illumination setting section 216 sets an illumination condition such that a setting content before the mode switching is used for the extracted common item, and stores the illumination condition in the primary storage device 21b or the secondary storage device 21c. For example, it is possible to consider a case where the second side illuminator 95 is used in the second mode before switching and the side illuminator 84 is used in the first mode after the switching at the time of switching from the second mode to the first mode. In this case, the illumination setting section 216 stores, for example, the light amount of the second side illuminator 95. The illumination setting section 216 sets the illumination condition including the light amount, and stores the illumination condition in the primary storage device 21b or the secondary storage device 21c.

Note that the illumination setting section 216 can set a current illumination condition by reading an initial setting of the illumination condition or reading an illumination condition used in the previous use if there is an item unique to one of illumination conditions before and after switching. That is, illumination conditions which have been referred to in the past use are stored in the primary storage device 21b and the secondary storage device 21c in the order of use, and the illumination setting section 216 can set an item that is not usable among the illumination conditions based on the stored content.

Further, the illumination condition can be manually changed through operation section 3 after the mode switching.

Further, a visible light transmittance of the optical element of the analysis optical system 7 through which light reflected by the sample SP passes when returning to the first camera 81, such as the dispersing element 75 and the imaging lens 80 and a light receiving sensitivity of the imaging element forming the first camera 81, and a visible light transmittance of the optical element forming the observation optical system 9, such as the mirror group 91 and a light receiving sensitivity of the imaging element forming second camera 93 may be considered in the initial setting and adjustment of the illumination condition.

Further, the exposure time of the first camera 81 and the exposure time of the second camera 93 can be made common by making the brightness of image data displayed on the display 22 constant at the time of switching from the first mode to the second mode or from the second mode to the first mode.

As a result, frame rates of the first camera 81 and the second camera 93 can be made common. Note that the brightness of the image data can be made constant, for example, by controlling the product of the visible light transmittance and the light receiving sensitivity associated with each of the first camera 81 and the second camera 93 to be constant.

—Illumination Controller 217—

The illumination controller 217 reads the illumination condition set by the illumination setting section 216 from the primary storage device 21b or the secondary storage device 21c, and controls the coaxial illuminator 79, the side illuminator 84, the second coaxial illuminator 94, or the second side illuminator 95 so as to reflect the read illumination condition. With this control, one or both of the coaxial illuminator 79 and the side illuminator 84 can be turned on, or one or both of the second coaxial illuminator 94 and the second side illuminator 95 can be turned on.

The illumination controller 217 further temporarily turns off all of the coaxial illuminator 79 and the side illuminator 84 regardless of the content of the illumination condition when laser light is emitted in the first mode.

The illumination controller 217 further causes the primary storage device 21b or the secondary storage device 21c to store the illumination condition that has been referred at the time of execution of the turn-off before turning off the coaxial illuminator 79 or the side illuminator 84.

The illumination controller 217 releases the turn-off of the coaxial illuminator 79 and the side illuminator 84 at a timing after the emission of laser light is completed (for example, timing before and after analysis by the spectrum analyzer 213). At that time, the illumination controller 217 reads the illumination condition stored in the primary storage device 21b or the secondary storage device 21c before execution of the turn-off, and reflects the illumination condition in turning on the coaxial illuminator 79 or the side illuminator 84.

—Report Output Section 218—

Figure 29:
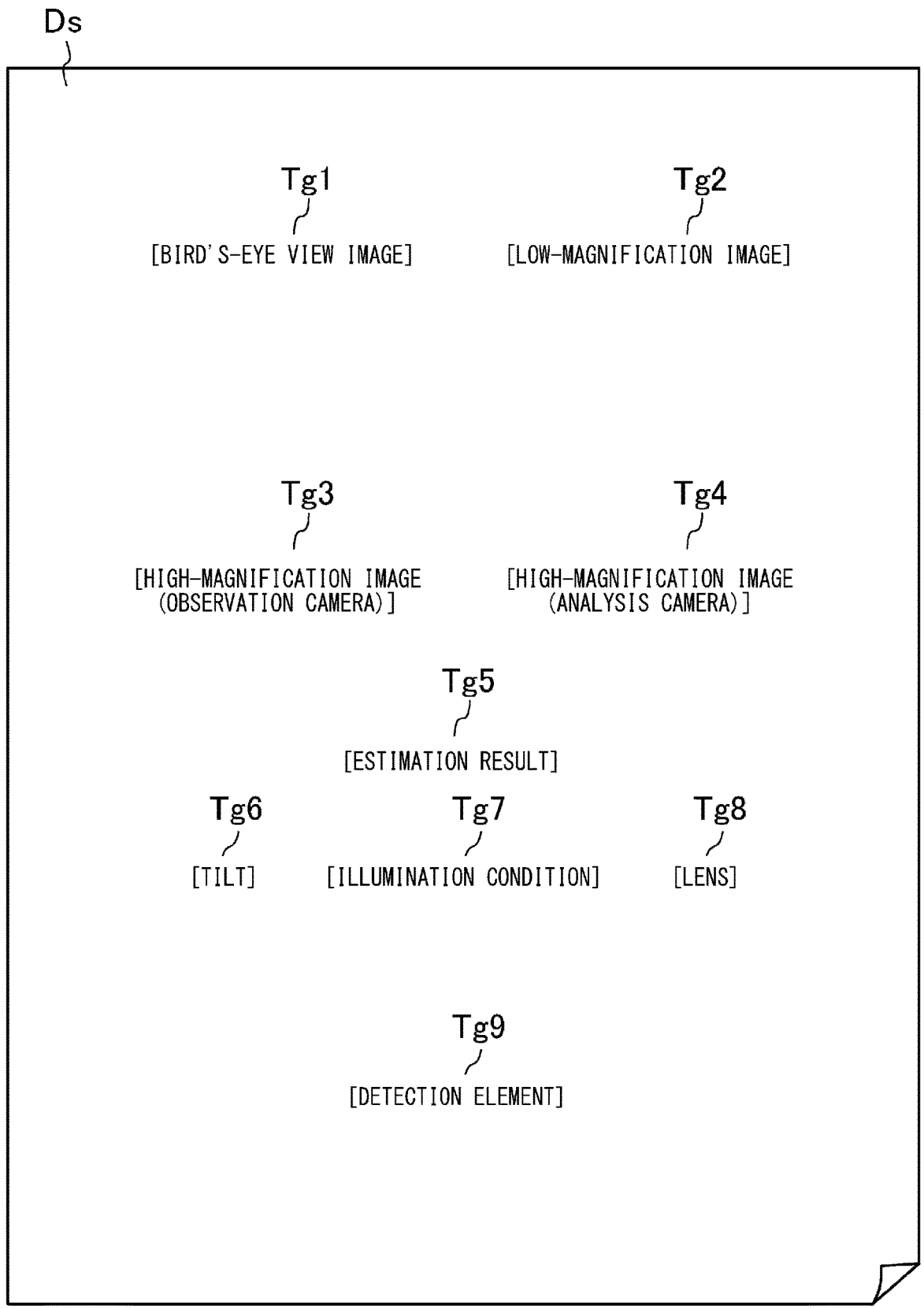
FIG. 29 is a view illustrating a template of a report.
Figure 30:
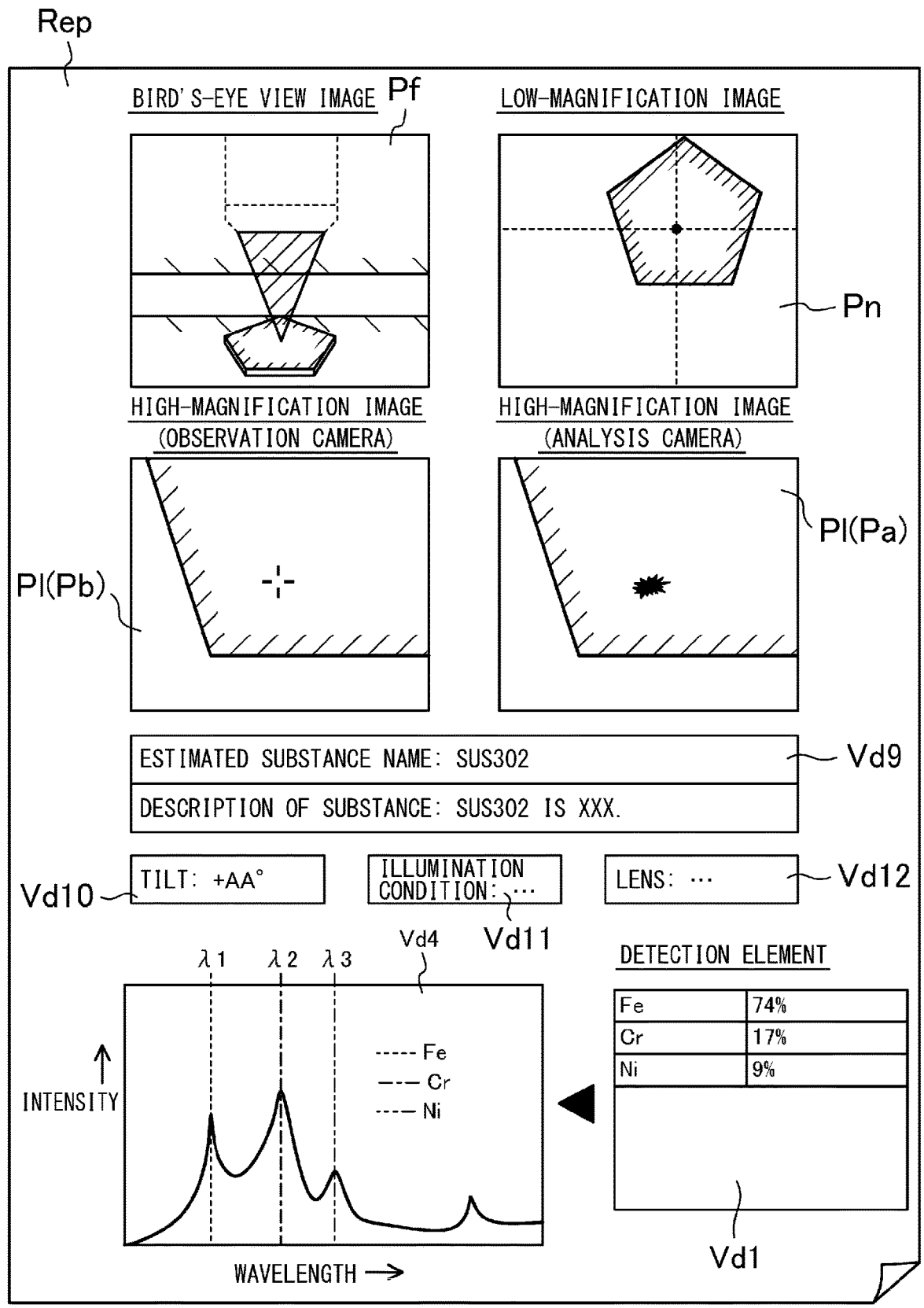
FIG. 30 is a view illustrating an output example of the report.

FIG. 29 is a view illustrating a template Ds of the report Rep, and FIG. 30 is a view illustrating an output example of the report Rep. The report output section 218 is configured to output the report Rep that summarizes the live image Pl, the navigation image Pn, and information indicating the analysis result (first information Vd1) after the analysis of the sample SP by the spectrum analyzer 213 is completed.

Specifically, the report output section 218 according to the present embodiment can output the report Rep in which at least one of the navigation image Pn and the live image Pl (more specifically, the pre-irradiation image Pb generated using the live image Pl or the pre-irradiation image Pb and the post-irradiation image Pa), and the analysis result is displayed at each of positions on the template Ds to which output positions of the navigation image Pn as a low-magnification image, the live image Pl as a high-magnification image used to generate the pre-irradiation image Pb and the post-irradiation image Pa, and the analysis result are assigned.

Note that the pre-irradiation image Pb may be at least one of the pre-irradiation image Pb acquired by the second camera 93 of the observation optical system 9 and the pre-irradiation image Pb acquired by the first camera 81 of the analysis optical system 7. The UI controller 215 can display the image P associated with the first interface W2, for example, the live image Pl with the check box Ic44 being checked (more specifically, the pre-irradiation image Pb or the pre-irradiation image Pb and the post-irradiation image Pa), the navigation image Pn with the check box Ic45 being checked, and the like on the report Rep when the report output section 218 outputs the report Rep.

At that time, as the live image Pl used to generate the pre-irradiation image Pb, at least one of the live image Pl generated by the second camera (observation camera) 93 in the second mode and the live image Pl generated by the first camera (analysis camera) 81 in the first mode can be used.

Further, for example, a spreadsheet as illustrated in FIG. 29 can be used as the template Ds to which the output position of the live image Pl or the like is assigned. As the spreadsheet, a data sheet for software installed on a computer as a so-called Office suite can be used. Instead of such a spreadsheet, a text file for word processing software may be used.

As illustrated in FIG. 29, a first tag Tg1 displayed as [bird's-eye view image], a second tag Tg2 displayed as [navigation image], a third tag Tg3 displayed as [live image (observation camera)], a fourth tag Tg4 displayed as [live image (analysis camera)], a fifth tag Tg5 displayed as [estimation result], a sixth tag Tg6 displayed as [tilt], a seventh tag Tg7 displayed as [illumination condition], an eighth tag Tg8 displayed as [lens], and a ninth tag Tg9 displayed as [detection element] can be arranged in the template Ds.

Then, the report output section 218 outputs information corresponding to each tag at each position of the first tag Tg1 to the ninth tag Tg9 arranged on the template Ds as illustrated in FIG. 30. For example, the bird's-eye view image Pf can be output to the first tag Tg1, the navigation image Pn can be output to the second tag Tg2, the live image Pl generated by the second camera 93 in the second mode can be output to the third tag Tg3, the live image Pl generated by the first camera 81 in the first mode can be output to the fourth tag Tg4, information Vd9 (corresponding to fifth information Vd5 to be described later) indicating an estimation result of the sample SP acquired by the spectrum analyzer 213 can be output to the fifth tag Tg5, information Vd10 indicating the tilt θ detected by the first tilt sensor Sw3 and the second tilt sensor Sw4 can be output to the sixth tag Tg6, information Vd11 indicating the illumination condition set by the illumination setting section 216 can be output to the seventh tag Tg7, information Vd12 related to the lens unit 9a detected by the lens sensor Sw1 can be output to the eighth tag Tg8, and information indicating the detection element of the sample SP acquired by the spectrum analyzer 213 (corresponding to the first information Vd1 and fourth information Vd4 to be described later) can be output to the ninth tag Tg9.

An output position of each information can be changed by changing the arrangement of the first tag Tg1 to the ninth tag Tg9. Further, when any tag is deleted from the template Ds, the information corresponding to that tag can be removed from the report Rep. For example, if the sixth tag Tg is deleted from the template Ds, the information Vd10 indicating the tilt θ is removed from the report Rep.

<Specific Example of Control Flow>

Figure 31:
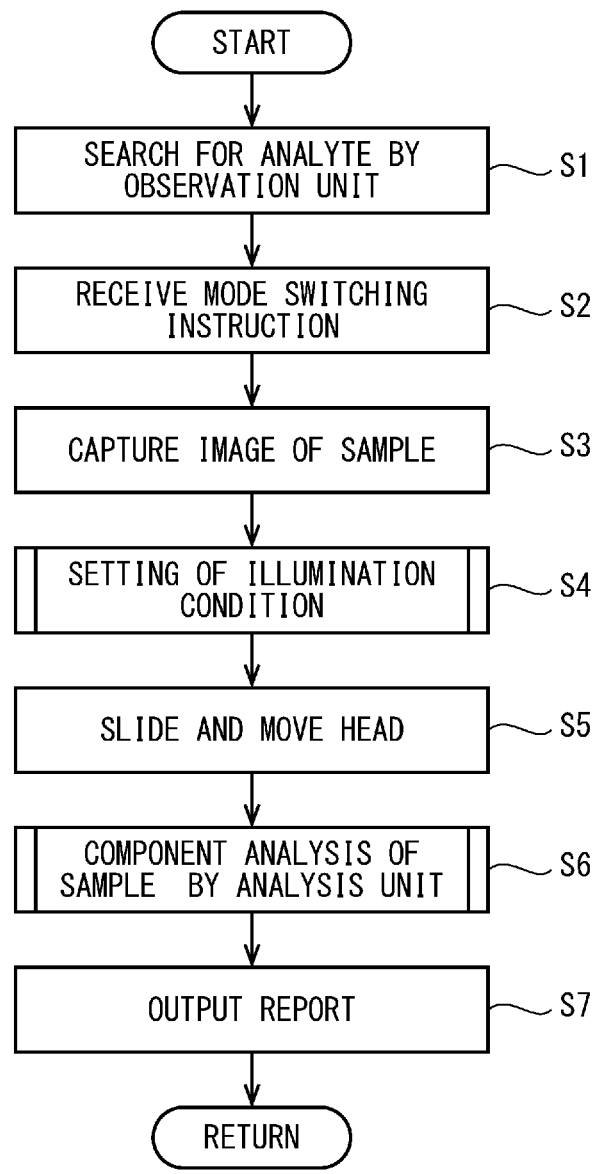
FIG. 31 is a flowchart illustrating a basic operation of the analysis and observation device.
Figure 32:
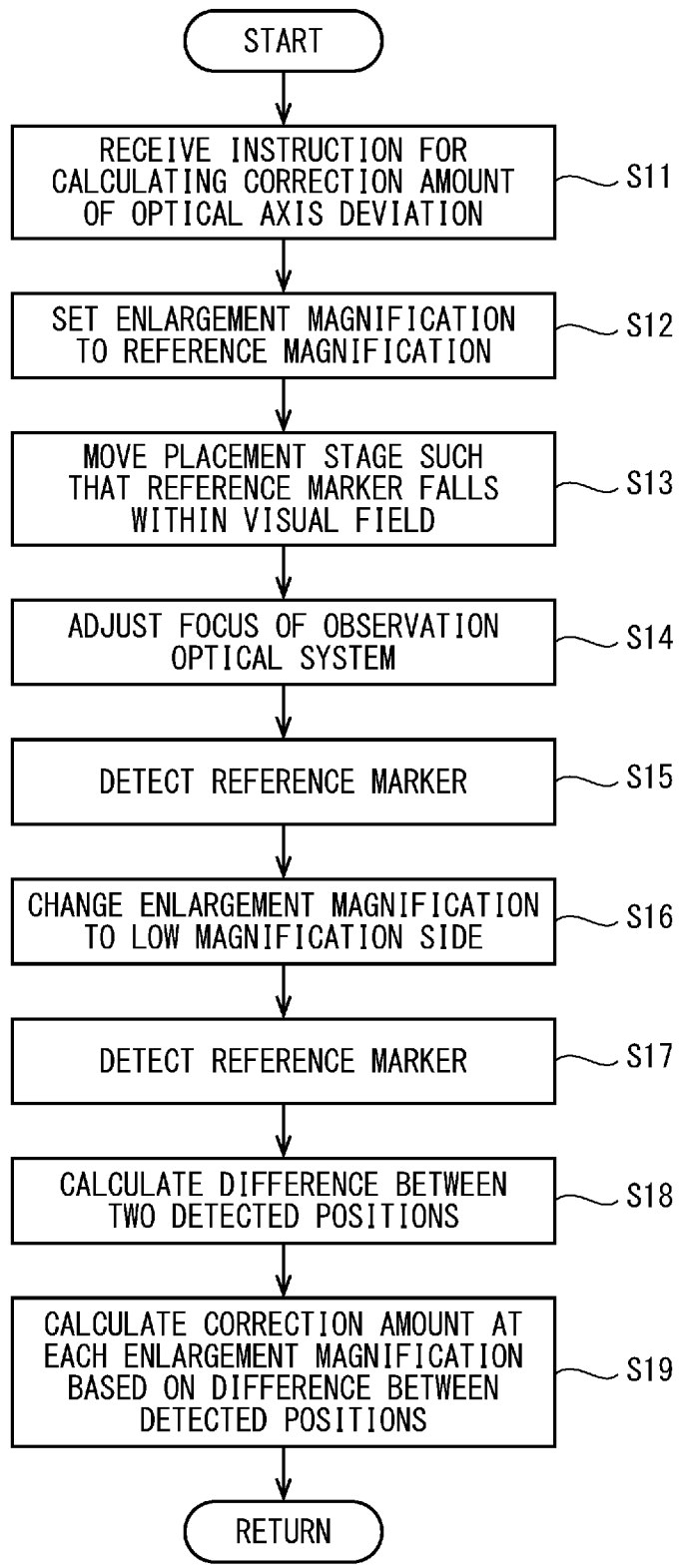
FIG. 32 is a flowchart illustrating a calculation procedure of a correction amount of the optical axis deviation.
Figure 33:
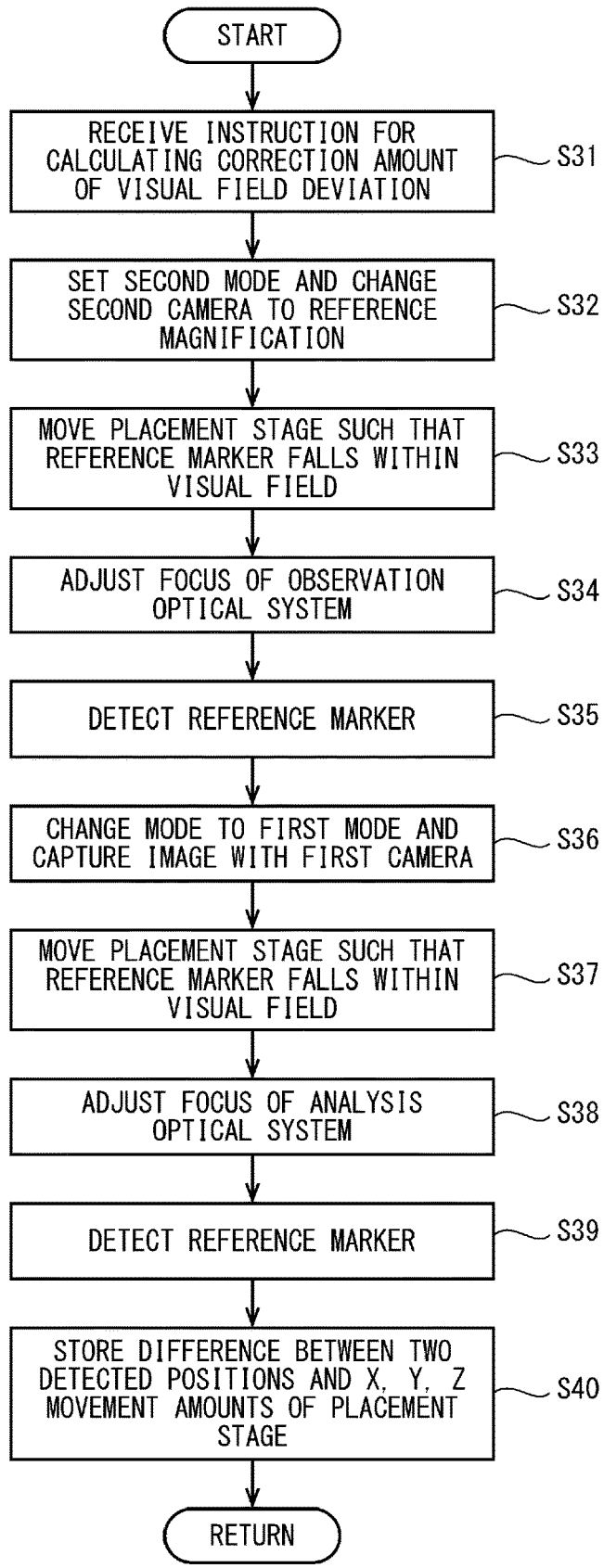
FIG. 33 is a flowchart illustrating a calculation procedure of a correction amount of the visual field deviation.
Figure 34:
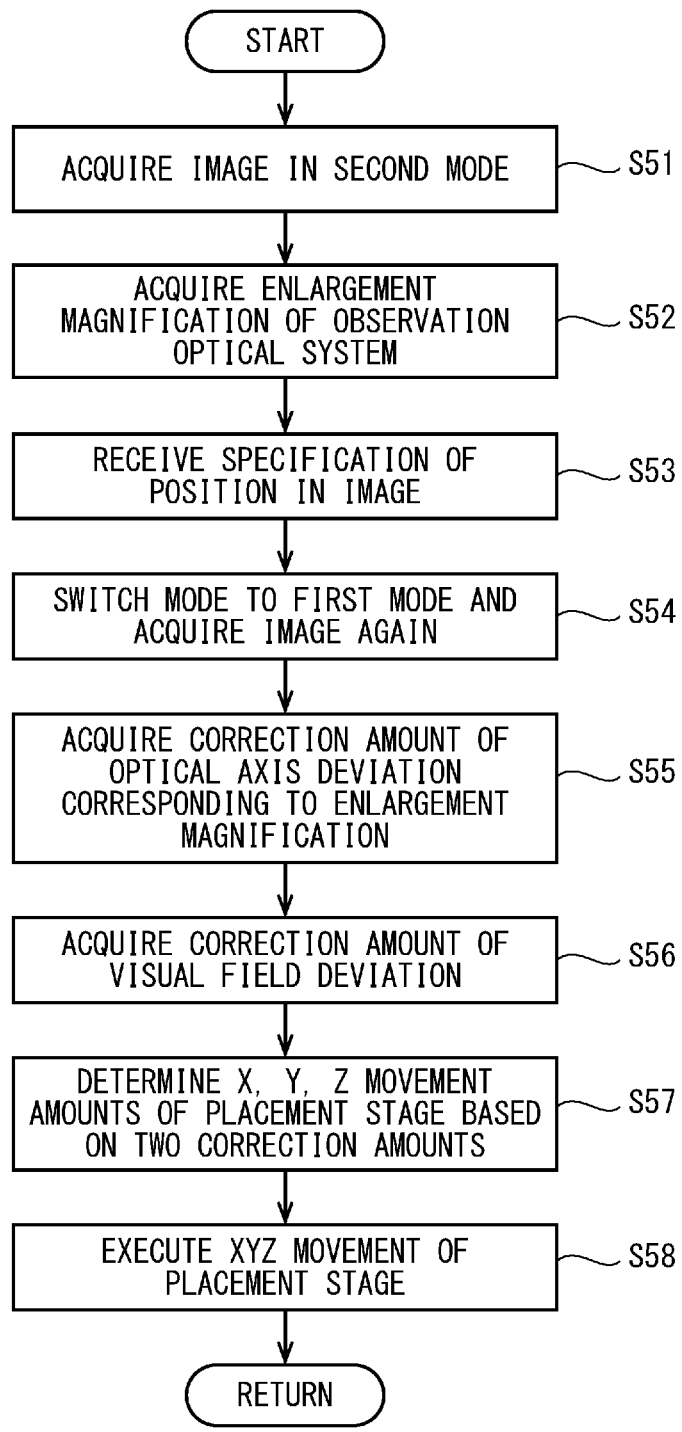
FIG. 34 is a flowchart illustrating a correction procedure of the optical axis deviation and the visual field deviation.
Figure 35:
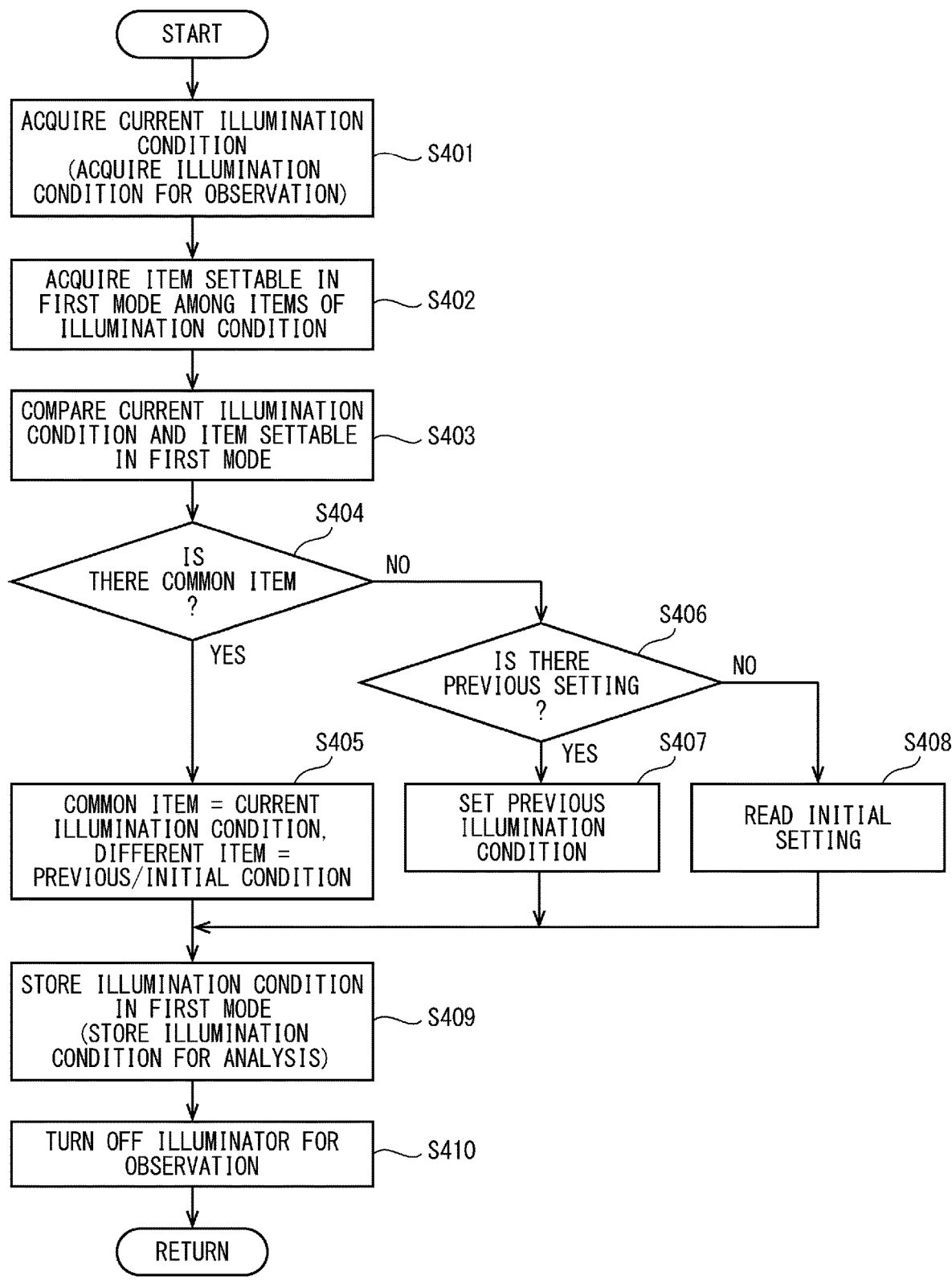
FIG. 35 is a flowchart illustrating an illumination condition setting procedure by an illumination setting section.
Figure 36A:
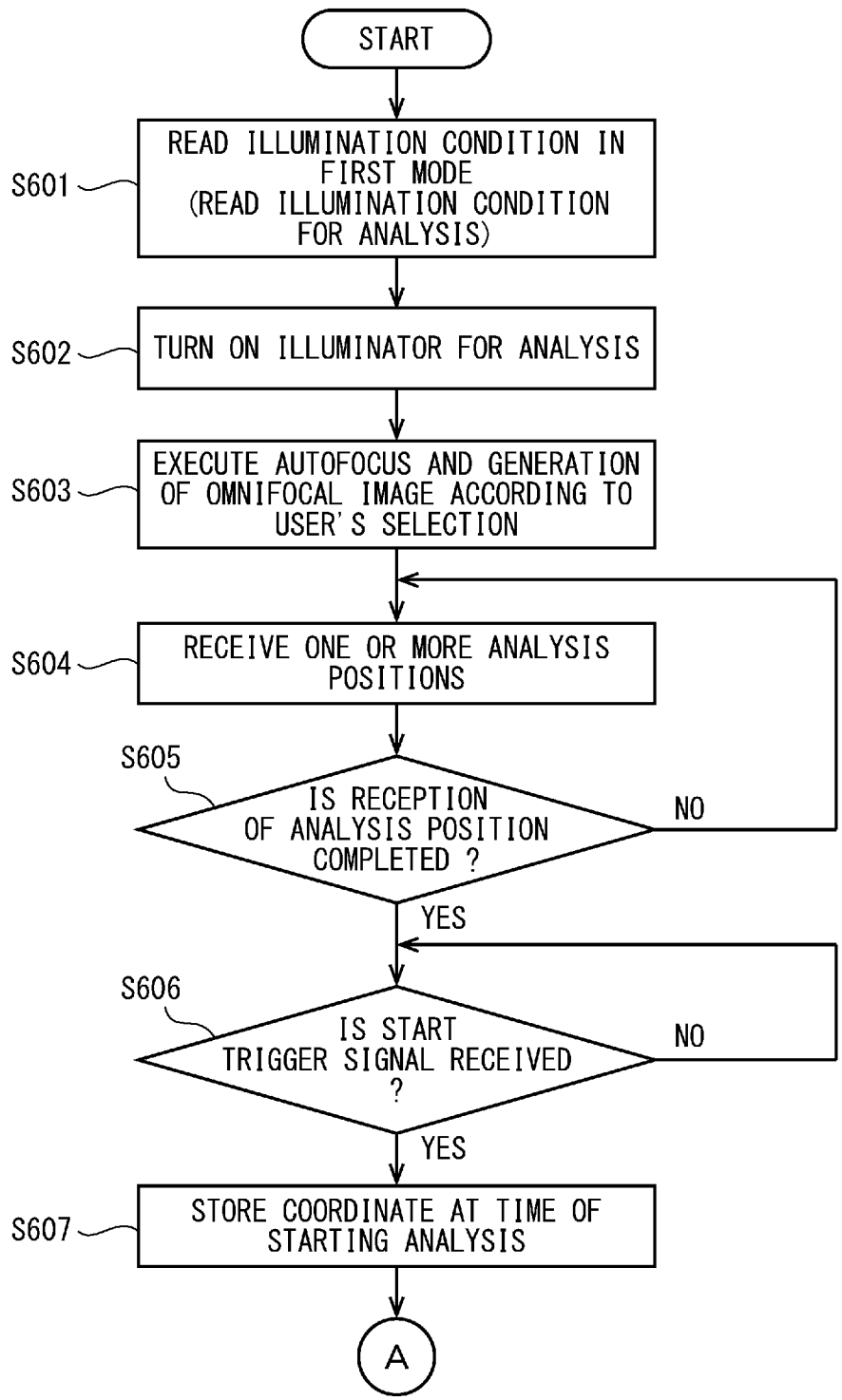
FIG. 36A is a flowchart illustrating various types of processing performed by the analysis and observation device.
Figure 36B:
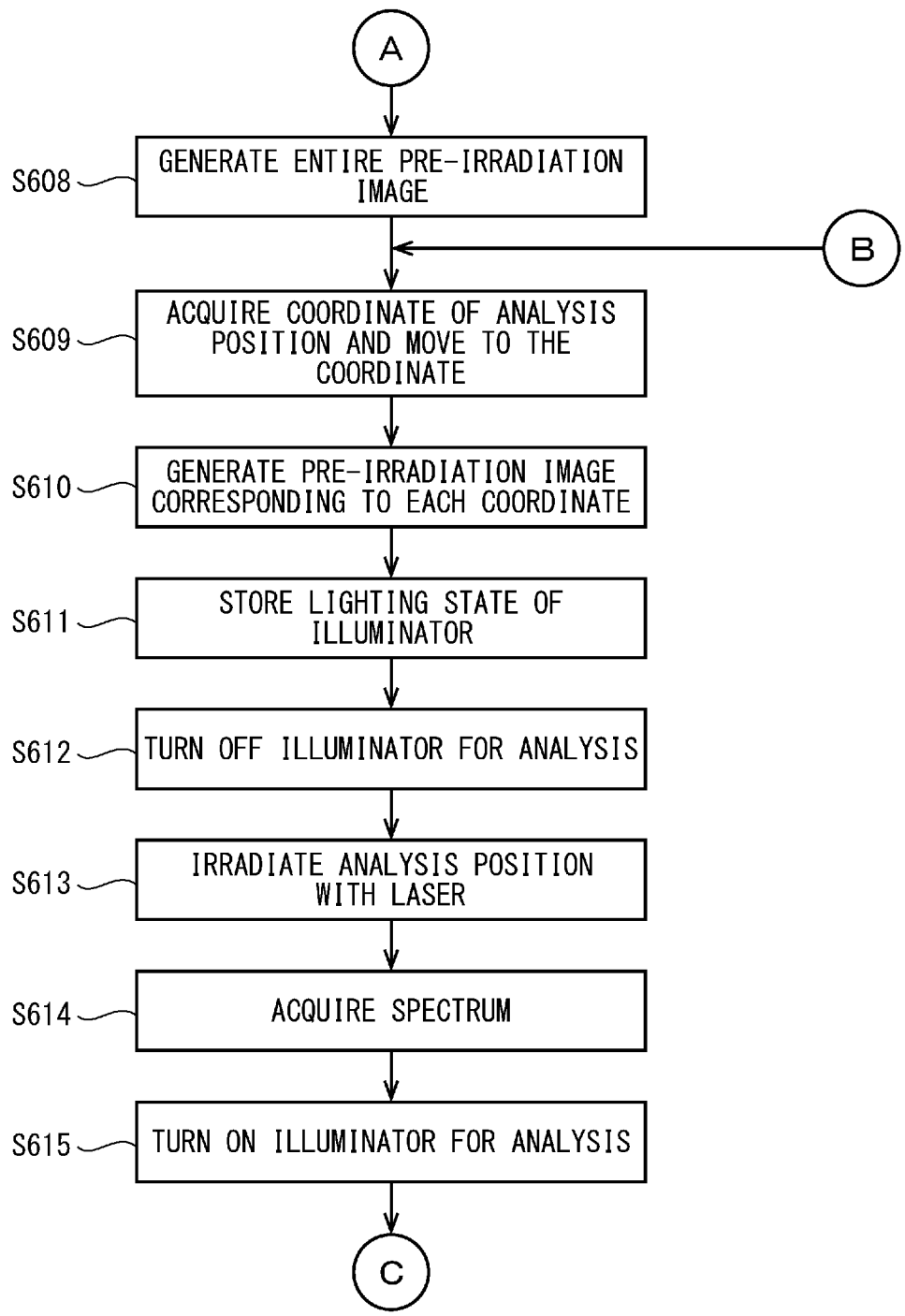
FIG. 36B is a flowchart illustrating the various types of processing performed by the analysis and observation device.
Figure 36C:
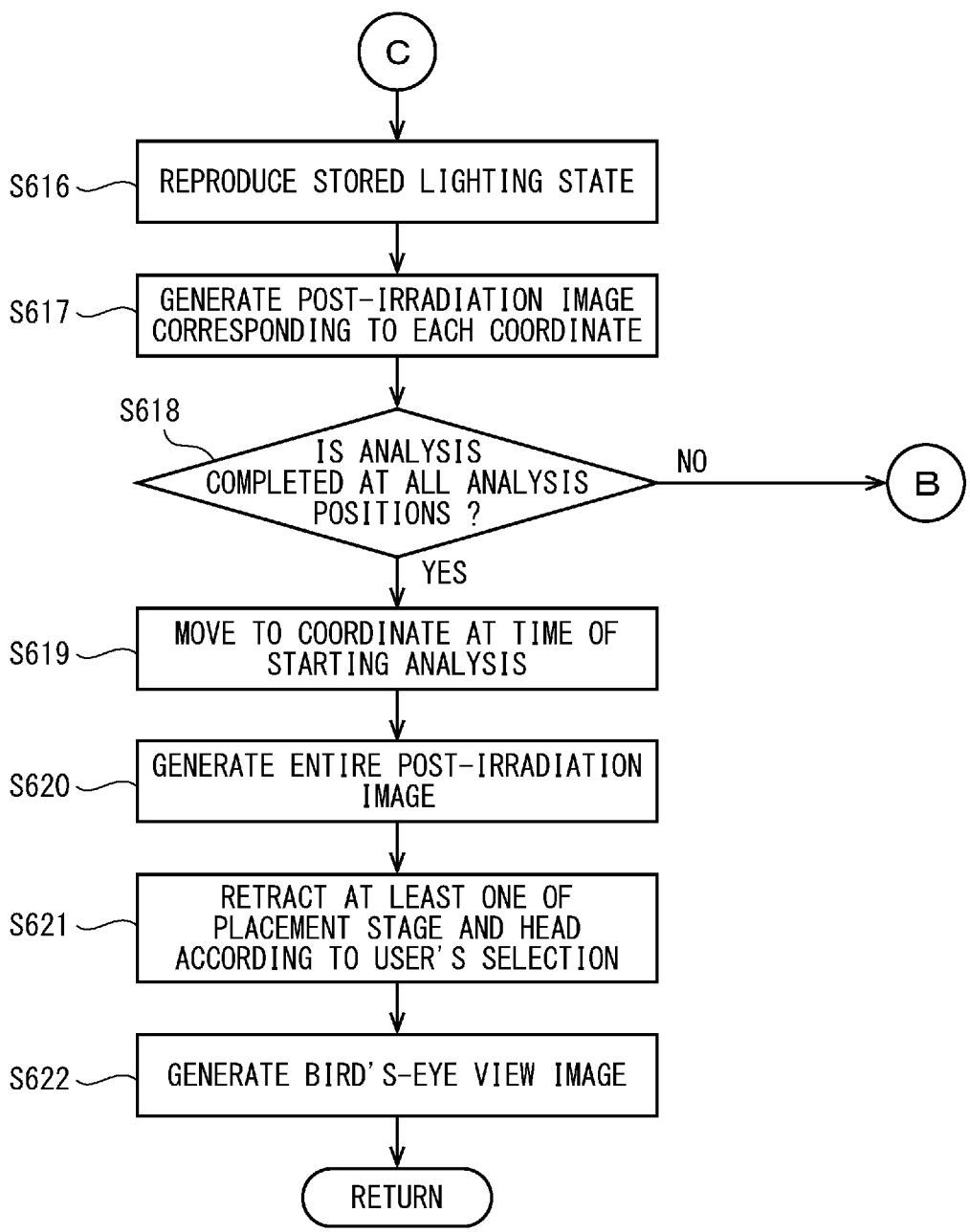
FIG. 36C is a flowchart illustrating the various types of processing performed by the analysis and observation device.
Figure 37:
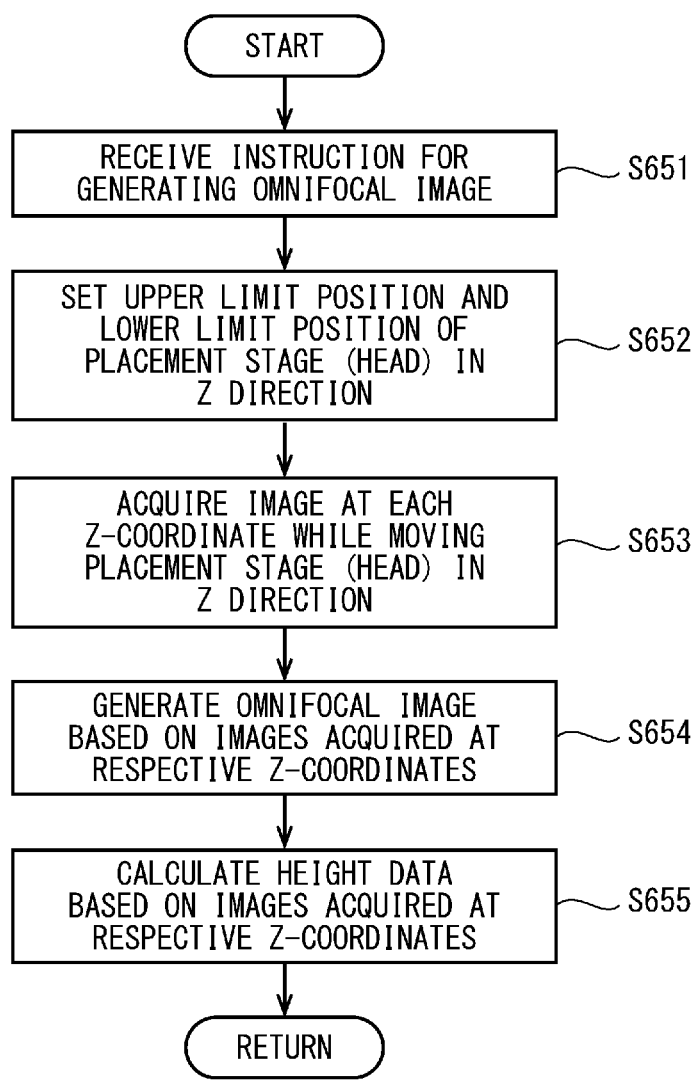
FIG. 37 is a flowchart illustrating an execution procedure of depth synthesis.

FIG. 31 is a flowchart illustrating a basic operation of the analysis and observation device A. FIG. 32 is a flowchart illustrating a calculation procedure of a correction amount D1 of an optical axis deviation, and FIG. 33 is a flowchart illustrating a calculation procedure of a correction amount D2 of a visual field deviation. FIG. 34 is a flowchart illustrating a correction procedure of the optical axis deviation and the visual field deviation. FIG. 35 is a flowchart illustrating an illumination condition setting procedure by the illumination setting section 216. FIGS. 36A to 36C are flowcharts illustrating various types of processing performed by the analysis and observation device A. FIG. 37 is a flowchart illustrating an execution procedure of depth synthesis.

First, the observation optical system 9 searches for an analyte in the second mode in step S1 of FIG. 31. In this step S1, the controller 21 searches for a portion (analyte) to be analyzed by the analysis optical system 7 among portions of the sample SP while adjusting conditions, such as the exposure time of the second camera 93 and the brightness of each of the live image Pl and the navigation image Pn generated by the second camera 93, such as illumination light guided by the optical fiber cable C3, based on an operation input by the user.

Note that the adjustment of the exposure time of the second camera 93 and the adjustment of the brightness of the illumination light can be also configured to be automatically executed by the controller 21 based on a detection signal of the lens sensor Sw1 without accompanying the operation input by the user.

In step S1, a screen as illustrated in FIG. 14 is displayed on the display 22. The search for the analyte can be performed smoothly by referring to the live image P1 and the navigation image Pn on the screen. At that time, the live image Pl is dynamically updated by specifying the first analysis point Lo1 on the live image Pl or specifying the second analysis point Lo2 on the navigation image Pn.

Further, an enlargement magnification is changed appropriately by the magnifying optical system 96 at the time of searching for the analyte by the observation optical system 9. The change in the enlargement magnification causes the optical axis deviation as described above. Therefore, the controller 21 executes the correction of the optical axis deviation based on the first correction amount D1 every time the enlargement magnification is changed. As a result, it is possible to change the enlargement magnification without causing the user to feel the influence of the optical axis deviation.

Note that the first correction amount D1 can be calculated in advance at the timing of setting up the analysis and observation device A or the like. A specific example of the calculation procedure of the first correction amount D1 and details of the correction procedure will be described later.

In the subsequent step S2, the controller 21 receives an instruction for switching from the second mode to the first mode based on an operation input by the user. This switching instruction is received by the UI controller 215, for example, as a click operation is performed on the icon Ic11 illustrated in FIG. 14. Note that the operation of the slide mechanism 65 by the mode switcher 211 has not been executed at the time when step S2 is executed.

In the subsequent step S3, the image of the sample SP is captured by the second camera 93. The image P generated in step S3 can be output to the report Rep as the pre-irradiation image Pb generated by the second camera 93.

Subsequently, in step S4, an illumination condition is set by the illumination setting section 216 before executing the mode switching. The processing performed in step S4 is illustrated in FIG. 35. That is, step S4 in FIG. 31 includes steps S401 to S410 in FIG. 35.

First, in step S401 of FIG. 35, the illumination setting section 216 acquires each of items forming a current illumination condition (illumination condition being referred to in the second mode).

In the subsequent step S402, the illumination setting section 216 acquires an item available in the first mode among items forming an illumination condition that needs to be referred to in the first mode.

In the subsequent step S403, the illumination setting section 216 compares each item of the current illumination condition acquired in step S401 with the available item acquired in step S402, and extracts a common item therebetween.

In the subsequent step S404, the illumination setting section 216 determines whether or not a common item has been extracted in step S403 (whether or not there is a common item), and proceeds to step S405 if the determination is YES or proceeds to step S406 if the determination is NO.

In step S405, the illumination setting section 216 uses the current illumination condition for the common item extracted in step S403 (item that can be used in both the first mode and the second mode, such as irradiation forms of the side illuminator 84 and the second side illuminator 95) among the illumination conditions including the plurality of items. On the other hand, previously used settings, initial settings, and the like are read for items not extracted in step S403 (for example, setting items unique to the first mode related to the configuration of analysis optical system 7). When the setting of each item is completed, the illumination setting section 216 advances the control process to step S39 and stores the illumination condition for the first mode in at least one of the primary storage device 21*b* and the secondary storage device 21*c*.

On the other hand, in step S406, the illumination setting section 216 determines whether or not there are the previously used settings, and proceeds to step S407 if the determination is YES, and proceeds to step S408 if the determination is NO. In step S407, the illumination setting section 216 reads the previously used settings as an illumination condition, proceeds to step S409, and stores the read illumination condition as the illumination condition for the first mode in at least one of the primary storage device 21*b* and the secondary storage device 21*c*. Further, in step S408, the illumination setting section 216 reads the initial settings as an illumination condition, proceeds to step S409, and stores the read illumination condition as the illumination condition for the first mode in at least one of the primary storage device 21*b* and the secondary storage device 21*c*.

In step S410 subsequent to step S409, the illumination controller 217 turns off an illumination for observation (the second coaxial illuminator 94 or the second side illuminator 95) and ends the flow illustrated in FIG. 35. Thereafter, the control process proceeds from step S4 to step S5 in FIG. 31.

In step S5, the mode switcher 211 operates the slide mechanism 65 to slide the observation optical system 9 and the analysis optical system 7 integrally, so that the switching from the second mode to the first mode is executed.

When the switching to the first mode is completed, the image P generated by the first camera 81 is displayed on the display 22 as the live image Pl, instead of the image P generated by the second camera 93. The navigation image Pn can also be replaced with the image P generated by the first camera 81 similarly to the live image Pl. Even in the first mode, the user is provided with the same display screen as that in the second mode as illustrated in FIG. 14.

In the first mode, the user refers to the live image Pl generated by the first camera 81, and an irradiation position of laser light is specified. This specification is received by the UI controller 215 and used for processing by the spectrum acquirer 212.

Further, the switching from the second mode to the first mode causes the visual field deviation as described above. Therefore, the controller 21 executes the correction of the visual field deviation based on the second correction amount D2 every time the second mode is switched to the first mode. As a result, it becomes possible to switch from the observation by the second camera 93 to the observation by the first camera 81 without causing the user to feel the influence of the visual field deviation.

Note that the second correction amount D2 can be calculated in advance at the timing of setting up the analysis and observation device A or the like. A specific example of the calculation procedure of the second correction amount D2 and details of the correction procedure will be described later.

In the subsequent step S6, the illumination control by the illumination controller 217 and the component analysis of the sample SP by the spectrum acquirer 212 and the spectrum analyzer 213 are executed after the mode switching is completed. The processing performed in step S6 is illustrated in FIGS. 36A, 36B, and 36C. That is, step S6 in FIG. 31 includes steps S601 to S607 in FIG. 36A and steps S608 to S615 in FIG. 36B.

First, in step S601, the illumination controller 217 reads the illumination condition set by the illumination setting section 216 from the primary storage device 21*b* or the secondary storage device 21*c*. In the subsequent step S602, the illumination controller 217 turns on an illuminator for analysis (the coaxial illuminator 79 or the side illuminator 84) so as to reflect the illumination condition read in step S601. As a result, the respective control parameters related to the illuminator for analysis, such as the exposure time of the first camera 81 and the light amount of illumination light emitted from the LED light source 79a, reproduce the control parameters in the second mode as much as possible.

In the present embodiment, the reflective object lens 74 for component analysis has a shallower subject depth during observation than the objective lens 92 for observation. Therefore, the illumination controller 217 may execute autofocus at each position in the second image data 12 and generate an omnifocal image in step S603 subsequent to step S602. Specifically, in this step S603, for example, the processing illustrated in FIG. 37 is executed. Note that it may be configured such that the omnifocal image is generated only when the processor 21a receives whether or not to execute the generation of the omnifocal image, and only when an instruction for generating the omnidirectional image is received in step S603. With the configuration in which the generation of the omnifocal image is executed only when being required by the user, the processing can be made efficient.

Specifically, the processor 21a receives a synthesis instruction of the omnifocal image in step S651 of FIG. 37. This synthesis instruction may be configured to be automatically output immediately after a control step proceeds to step S602 described above.

In the subsequent step S652, the processor 21a sets an upper limit position (see the height position zn in FIG. 18) and a lower limit position (see the height position z1 in FIG. 18) of the placement stage 5 or the head 6. The upper limit position and the lower limit position may be automatically set by the processor 21a, or may be set by reading values input in advance by the user.

In the subsequent step S653, the processor 21a moves the placement stage 5 or the head 6 in the Z direction within a range between the upper limit position and the lower limit position described above, and the image P is generated by the first camera 81 at each Z-position (Z-coordinate).

In the subsequent step S654, the processor 21a generates the omnifocal image Pc as illustrated in FIG. 18 based on the images P generated at the respective Z-positions. The generated omnifocal image Pc is displayed on the display 22 as at least one of the live image Pl and the navigation image Pn. Here, if it is preset to acquire a three-dimensional shape of the sample SP, the control step proceeds from step S654 to step S655. In step S655, height data of the surface of the sample SP is calculated based on the images P generated at the respective Z-positions. The calculated height data can be displayed on the display 22 as the three-dimensional shape of the sample SP.

When the process illustrated in step S654 is completed or the process illustrated in step S655 subsequent step S654 is completed according to the preset setting, the control step returns from the flow illustrated in FIG. 37 to the flow illustrated in FIG. 36A, and proceeds from S603 to step S604.

In step S604, the UI controller 215 receives the specification of the first analysis point Lo1 as an analysis position on the live image Pl. At that time, the UI controller 215 superimposes and displays the information (intersection point X) indicating the position of each of the first analysis points Lo1 on the navigation image Pn as illustrated in FIG. 14.

In the subsequent step S605, the UI controller 215 determines whether or not the reception of the analysis position is completed, and the control process proceeds to step S606 in the case of YES in this determination, and the control process returns to step S604 in the case of NO. This determination can be performed, for example, based on whether or not the icon Ic12 in FIG. 14 has received the click operation.

In the subsequent step S606, the UI controller 215 determines whether or not a start trigger signal has been received, and the control process proceeds to step S607 in the case of YES in this determination, and the determination in step S606 is repeated in the case of NO. This determination can be performed, for example, based on whether or not the icon Ic24 in FIG. 17 has received the click operation.

In the subsequent step S607, the imaging controller 214 stores a coordinate (for example, a relative coordinate of the reflective object lens 74 with respect to the placement stage 5) at the start of the analysis (specifically, the time when the start trigger signal has been received) in the primary storage device 21b or the secondary storage device 21c for temporary storage.

Subsequently, in step S608 illustrated in FIG. 36B, the imaging controller 214 generates the entire pre-irradiation image Pb as described with reference to the upper view in the left part of FIG. 20. When there is one first analysis point Lo1, step S608 may be omitted.

In the subsequent step S609, the imaging controller 214 acquires a coordinate corresponding to the first analysis point Lo1 and moves the head 6 to the coordinate. The placement stage 5 may be moved instead of moving the head 6. When the movement of the head 6 or the placement stage 5 is completed, the coordinate and the analysis optical axis Aa intersect with each other.

In the subsequent step S610, the imaging controller 214 generates the pre-irradiation image Pb corresponding to the first analysis point Lo1 as described with reference to the central view in the left part of FIG. 20.

In the subsequent step S611, the illumination controller 217 sets a lighting state (an illumination condition at the timing immediately before the emission of the laser light) at that time (the time when the pre-irradiation image Pb has been generated in step S610) in the primary storage device 21b or the secondary storage device 21c. In the subsequent step S612, the illumination controller 217 turns off the illuminator for analysis (the coaxial illuminator 79 or the side illuminator 84). Then, in step S613, the spectrum acquirer 212 irradiates the one first analysis point Lo1 as the analysis position with the laser light. In step S613, the first and second detectors 77A and 77B receive light (secondary electromagnetic wave) emitted due to plasma occurring on the sample SP. At that time, light reception timings of the first and second detectors 77A and 77B are set to be synchronized with an emission timing of the laser light.

In the subsequent step S614, the spectrum acquirer 212 acquires an intensity distribution spectrum in accordance with the emission timing of the laser light. During a period from step S614 to step S618 to be described later, the spectrum analyzer 213 executes component analysis of the sample SP at the one first analysis point Lo1. A result of the component analysis is stored in the primary storage device 21b or the secondary storage device 21c in association with the coordinate of the first analysis point Lo1.

In the subsequent step S615, the illumination controller 217 turns on the illuminator for analysis (the coaxial illuminator 79 or the side illuminator 84). Subsequently, in step S616 of FIG. 36C, the illumination controller 217 reads the illumination condition stored in the primary storage device 21b or the secondary storage device 21c, and controls the illuminator for analysis so as to reflect the illumination condition. As a result, the lighting state immediately before emission of the laser light is reproduced.

In the subsequent step S617, the imaging controller 214 generates the post-irradiation image Pa corresponding to the first analysis point Lo1 as described with reference to the lower view in the left part of FIG. 20.

In the subsequent step S618, the spectrum acquirer 212 determines whether or not the component analysis at all the first analysis points Lo1 (in other words, the emission of the laser light to all the first analysis points Lo1) has been completed, and the control process proceeds to step S619 in the case of YES in this determination, the control process returns to step S609 in FIG. 36B in the case of NO. This determination can be performed not only when the positions of the first analysis points Lo1 are different from each other, but also when the positions of the first analysis points Lo1 are the same.

Further, when the height data of the sample SP has been acquired, a relative height position of the analysis unit 62 with respect to the placement stage 5 may be adjusted for each of the first analysis points Lo1 and the laser light may be omitted in a state where a focal position is optimized at each of the first analysis points Lo1.

In the subsequent step S619, the imaging controller 214 moves the head 6 to the coordinate stored in the step S607. The placement stage 5 may be moved instead of moving the head 6. When the movement of the head 6 or the placement stage 5 is completed, the stored coordinate and the analysis optical axis Aa intersect with each other.

In the subsequent step S620, the imaging controller 214 generates the entire post-irradiation image Pa as described with reference to the lower view in the right part of FIG. 20. When there is one first analysis point Lo1, step S620 may be omitted.

In the subsequent step S621, the imaging controller 214 retracts at least one of the placement stage 5 and the head 6 along the Z direction so as to be separated from the head 6, particularly the analysis housing 70.

In the subsequent step S622, the imaging controller 214 operates the overhead camera 48 to generate the bird's-eye view image Pf. Note that it may be configured such that the processor 21a receives whether or not to generate the bird's-eye view image Pf, and the bird's-eye view image Pf is generated only when an instruction for generating the bird's-eye view image Pf is received in step S622. With the configuration in which the generation of the bird's-eye view image Pf is executed only when being required by the user, the processing can be made efficient.

Note that the UI controller 215 receives various instructions for the dialogs W3 and W4 to associate the pre-irradiation image Pa, the post-irradiation image Pb, and the bird's-eye view image Pf with the component analysis result during a period from step S614 to step S622. This association may be performed for each of the first analysis points Lo1 or collectively for the plurality of first analysis points Lo1.

Thereafter, the processor 21a ends the flow illustrated in FIGS. 36A to 36C, and the control process proceeds from step S6 to step S7 in FIG. 31. Then, in step S7, the report output section 218 outputs the live image Pl or the like to each position set on the template Ds, so that the report Rep is output as electronic data.

—Correction of Optical Axis Deviation and Visual Field Deviation—

FIG. 32 is the flowchart illustrating the calculation procedure of the correction amount of the optical axis deviation, and FIG. 33 is the flowchart illustrating the calculation procedure of the correction amount of the visual field deviation. Further, FIG. 34 is the flowchart illustrating the correction procedure of the optical axis deviation and the visual field deviation.

First, in step S11 of FIG. 32, the UI controller 215 receives an instruction for calculating the correction amount of the optical axis deviation. In the subsequent step S12, the magnifying optical system 96 sets an enlargement magnification to a reference magnification.

In the subsequent step S13, for example, the placement stage 5 or the head 6 is moved such that the reference marker Ma falls within the visual field range of the second camera 93 as illustrated in the upper view of FIG. 26 described above.

In the subsequent step S14, the focus of the observation optical system 9 is adjusted.

In the subsequent step S15, the reference marker Ma is detected by the second camera 93. This detection can be performed based on whether or not a specific site of the reference marker Ma (for example, a vertex when the reference marker Ma is a triangle or a distal end when the reference marker Ma is an arrow-shaped figure) is included in the image P generated by the second camera 93. A coordinate of the detected specific site is stored in the primary storage device 21b or the like.

In the subsequent step S16, the magnifying optical system 96 sets the enlargement magnification to a predetermined magnification on the low magnification side.

In the subsequent step S17, the reference marker Ma is detected again by the second camera 93. A coordinate of a detected specific site is stored in the primary storage device 21b or the like similarly to step S15.

In the subsequent step S18, a difference between a detected position (coordinate of the specific site) of the reference marker Ma detected in step S15 and a detected position of the reference marker Ma detected in step S17 is detected. This difference is stored in the primary storage device 21b or the like as the first position difference ΔD1 described above.

In the subsequent step S19, the correction amount of the optical axis deviation at each enlargement magnification realized by the magnifying optical system 96 is calculated based on the first position difference ΔD1 obtained in step S18 and a difference (magnification difference) between the reference magnification and the predetermined magnification used for the calculation. The correction amount calculated in this manner is continuously stored in the primary storage device 21b, the secondary storage device 21c, or the like, and is read out every time the lens sensor Sw1 or the like detects the adjustment of the enlargement magnification performed by the magnifying optical system 96. The imaging controller 214 may correct the optical axis deviation every time based on the correction amount read out in this manner.

On the other hand, in step S31 of FIG. 33, the UI controller 215 receives an instruction for calculating the correction amount of the visual field deviation. In the subsequent step S32, the mode switcher 211 sets the second mode, and the magnifying optical system 96 changes an enlargement magnification of the second camera 93 to a reference magnification.

In the subsequent step S33, for example, the placement stage 5 or the head 6 is moved such that the reference marker Ma falls within the visual field range of the second camera 93.

In the subsequent step S34, the focus of the observation optical system 9 is adjusted.

In the subsequent step S35, the reference marker Ma is detected by the second camera 93. This detection can be performed based on whether or not a specific site in the reference marker Ma is included in the image P generated by the second camera 93. A coordinate of the detected specific site is stored in the primary storage device 21b or the like.

In the subsequent step S36, the mode switcher 211 changes from the second mode to the first mode to cause the first camera 81 to capture an image (generate the image P).

In the subsequent step S37, for example, the placement stage 5 or the head 6 is moved such that the reference marker Ma falls within the visual field range of the first camera 81.

In the subsequent step S38, the focus adjustment of the analysis optical system 7, particularly the first camera 81, is executed.

In the subsequent step S39, the reference marker Ma is detected by the first camera 81. A coordinate of a detected specific site is stored in the primary storage device 21b or the like similarly to step S35.

In the subsequent step S40, a difference between a detected position (coordinate of the specific site) of the reference marker Ma detected in step S35 and a detected position of the reference marker Ma detected in step S39 is detected. This difference is stored in the primary storage device 21b or the like as the second position difference $\Delta D2$ described above. At the same time, a movement amount of the placement stage 5 along the X and Y directions executed to make the reference marker Ma fall within the visual field range, and a movement amount of the placement stage 5 along the Z direction executed when adjusting the focus of the first camera 81 or the like are continuously stored in the primary storage device 21b, the secondary storage device 21c, or the like in the state of being associated with the second position difference $\Delta D2$.

Then, the control process illustrated in FIG. 34, for example, can be executed when the visual field deviation that occurs at the time of switching from the second mode to the first mode is corrected. This control process can be executed automatically or manually at the time of switching to the first mode.

First, in step S51 of FIG. 34, the generation (acquisition) of the image P by the second camera 93 in the second mode is executed.

In the subsequent step S52, for example, an enlargement magnification (the above-described third magnification) of the observation optical system 9 set by the magnifying optical system 96 is acquired based on a detection signal of the lens sensor Sw1.

In the subsequent step S53, specification of a position in the image P is received. The position specified here may be, for example, the analysis position X described with reference to FIG. 14. Alternatively, it can be configured to store a position of the intersection point Cp instead of receiving the position specification.

In the subsequent step S54, the switching from the second mode to the first mode is executed by the mode switcher 211, and the image P is generated (acquired) by the first camera 81. With this switching, the position specified in step S53 varies in the image P.

In the subsequent step S55, the correction amount of the optical axis deviation corresponding to the third magnification is read out. As the correction amount of the optical axis deviation, what is calculated in advance by the control process illustrated in FIG. 32 can be used.

In the subsequent step S56, the above-described second position difference $\Delta D2$ is acquired as the correction amount of the visual field deviation. As the correction amount of the visual field deviation, what is calculated in advance by the control process illustrated in FIG. 33 can be used.

In the subsequent step S57, the movement amount of the placement stage 5 in each of the X, Y, and Z directions is determined by adding up the correction amount read in step S55 and the correction amount read in step S56.

In the subsequent step S58, the placement stage 5 is moved in the X direction, the Y direction, and the Z direction based on the movement amount in each direction determined in the step S57. As a result, the variation of the position specified in step S53 is eliminated.

—Specific Examples of User Interface—

Figure 38:
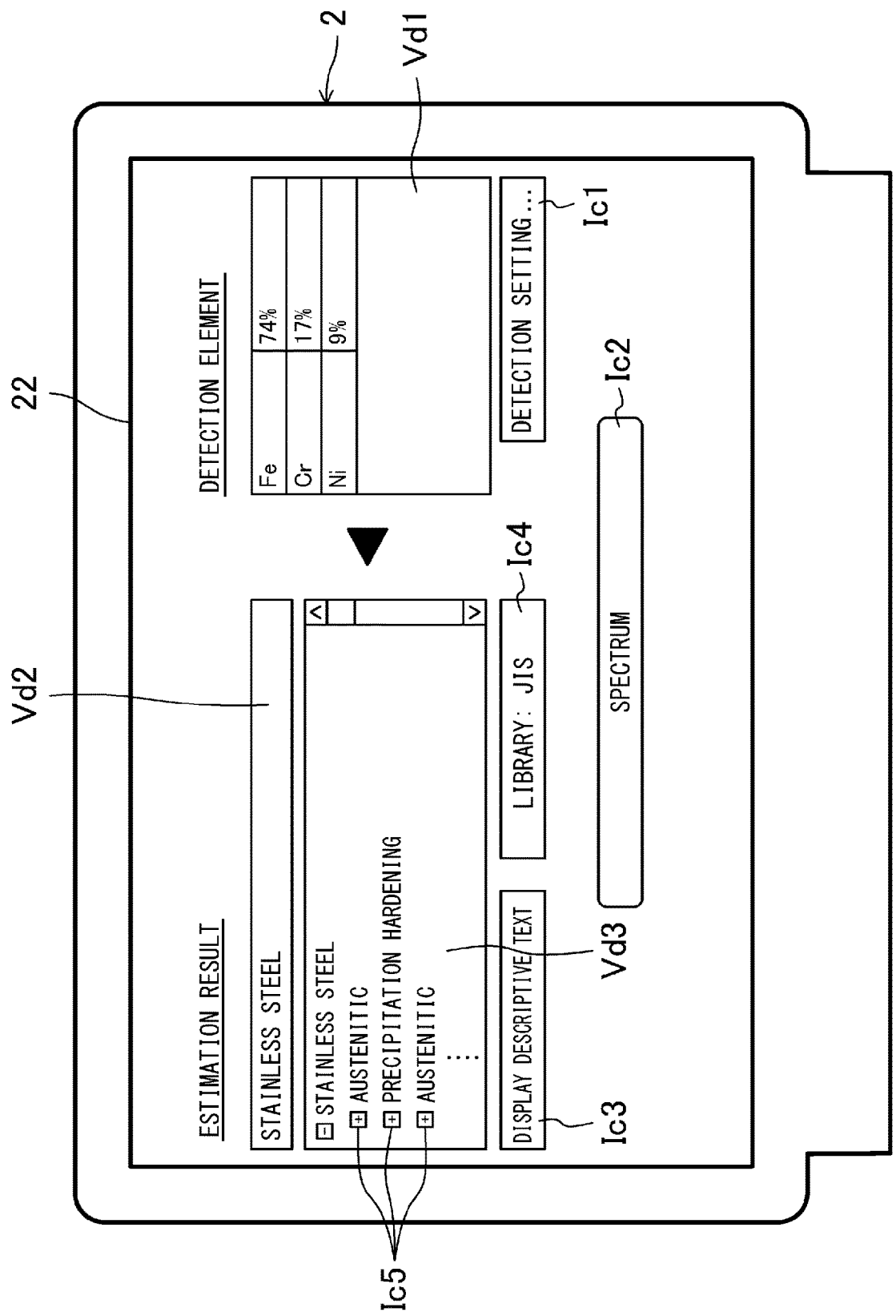
FIG. 38 is a view illustrating a display screen of the display.

FIGS. 38 to 44 are views illustrating the display screen of the display 22. At any timing from step S614 in FIG. 36B to step S618 in FIG. 36C, the UI controller 215 causes the display 22 to display the first information Vd1 indicating a characteristic Ch of a substance considered to be contained in the sample SP, the second information Vd2 indicating a type of the substance and the third information Vd3 indicating a hierarchical structure of the substance as illustrated in FIG. 38. The first information Vd1, the second information Vd2, and the third information Vd3 are all configured to be acquired by the spectrum analyzer 213. For example, when the LIBS method is used as the analysis method, the characteristic Ch of the substance contains information that summarizes a constituent element of the sample SP and a content (or content rate) of the constituent element in one set.

Note that a "superclass" represents a general term of the substance considered to be contained in the sample SP in the following description. In addition, a "subclass" appearing in the following description represents the type of the substance belonging to the superclass. The superclass can be configured to include at least one belonging subclass. In addition, one or more intermediate classes may be provided between the superclass and the subclass. This intermediate class represents a plurality of strains belonging to the superclass.

In the example illustrated in FIG. 38, the fact that the sample SP contains iron, chromium, and nickel and numerical data indicating that a content of iron is 74%, and a content of chromium is 17%, and a content of nickel is 9% are displayed as the first information Vd1. Here, a first icon Ic1 that receives a click operation or the like by the mouse 31 is displayed below the first information Vd1. Although details will be described later, the setting related to the processing performed by the spectrum analyzer 213 can be changed by clicking the first icon Ic1 with a note "detection setting . . . ".

Figure 40:
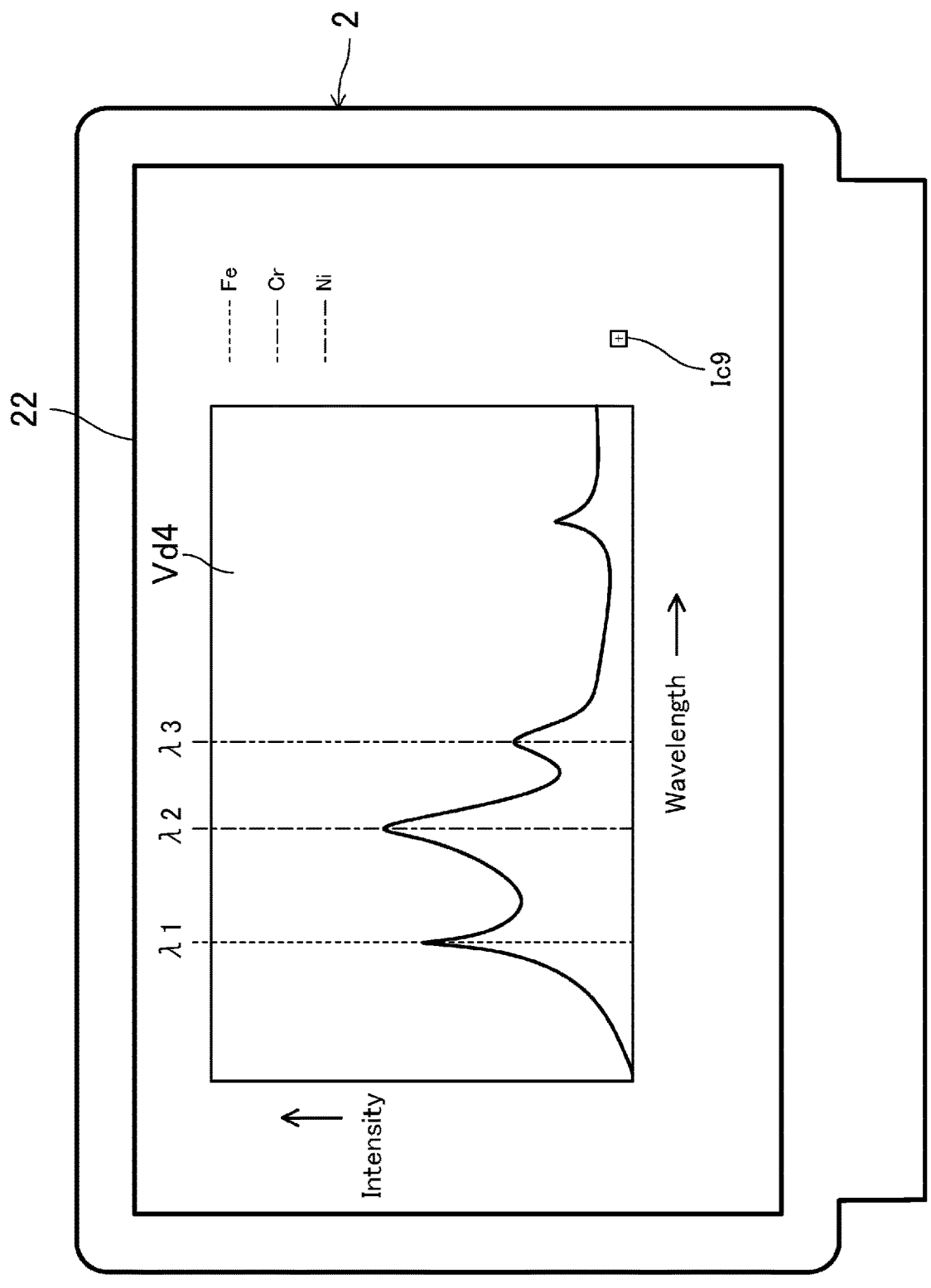
FIG. 40 is a view illustrating the display screen of the display.

Further, a second icon Ic2 that receives a click operation or the like by the mouse 31 is displayed further below the first icon Ic1. As illustrated in FIG. 40, the fourth information Vd4 indicating an intensity distribution spectrum acquired by the spectrum acquirer 212 and the characteristic Ch extracted from the intensity distribution spectrum can be displayed on the display 22 by operating the second icon Ic2 with a note "spectrum". In the example illustrated in the drawing, chain lines indicating peak positions of a wavelength $\lambda 1$ corresponding to iron, a wavelength $\lambda 2$ corresponding to chromium, and a wavelength $\lambda 3$ corresponding to nickel are superimposed and displayed on the intensity distribution spectrum. It can be seen that the intensity distribution spectrum has a peak at each wavelength.

Returning to FIG. 38, the fact that a superclass of the substance is "stainless steel" is displayed, as the second information Vd2, on the left side of the first information Vd1. Further, as the third information Vd3, the intermediate classes belonging to the superclass are displayed in the order of "austenitic", "precipitation hardening" and "austenitic" below the second information Vd2. This order is equal to the order of accuracy of a subclass belonging to each of the intermediate classes. In this example, it is suggested that "austenitic" includes both a subclass that is more accurate than a subclass that belongs to "precipitation hardening" and a subclass that is less accurate than a subclass that belongs to "precipitation hardening". In the example illustrated in the drawing, subclasses with a relatively high accuracy includes SUS302 and the like, the intermediate classes include SUS631 and the like, and subclasses with a relatively low accuracy include SUS304, SUS321, SUS305, and the like (not illustrated).

Here, a fifth icon Ic5 displayed on the left side of the intermediate class such as "austenitic" may be clicked in order to know details of the subclass. Although detailed illustration is omitted, the fifth icon Ic5 is an icon for switching the display and non-display of a "second intermediate class" belonging to the intermediate class and to which the subclass belongs, and is displayed on the display 22, particularly in a display column of the third information Vd3 by the UI controller 215.

The second intermediate class is a class obtained by subdividing the intermediate class. When this second intermediate class is further subdivided, the subclasses in this example can be obtained. Note that the second intermediate class is not essential. Further, a third intermediate class belonging to the second intermediate class may be set, or an additional intermediate class belonging to the third intermediate class may be set. The subclass may be associated with the lowest layer of the intermediate class set in this manner.

Here, when the fifth icon Ic5 located on the left side of the "austenitic" arranged at the top in FIG. 38 is operated, the second intermediate class belonging to "austenitic" can be displayed in the display 22, particularly in the display column of the third information Vd3. Although not illustrated in the drawing, for example, "SUS300 series" can be displayed as the second intermediate class.

Further, a third icon Ic3 that receives a click operation by the mouse 31 is displayed below the third information Vd3. When the third icon Ic3 with a note "descriptive text display" is operated, text data describing the substance contained in the sample SP can be displayed on the display 22.

Figure 39:
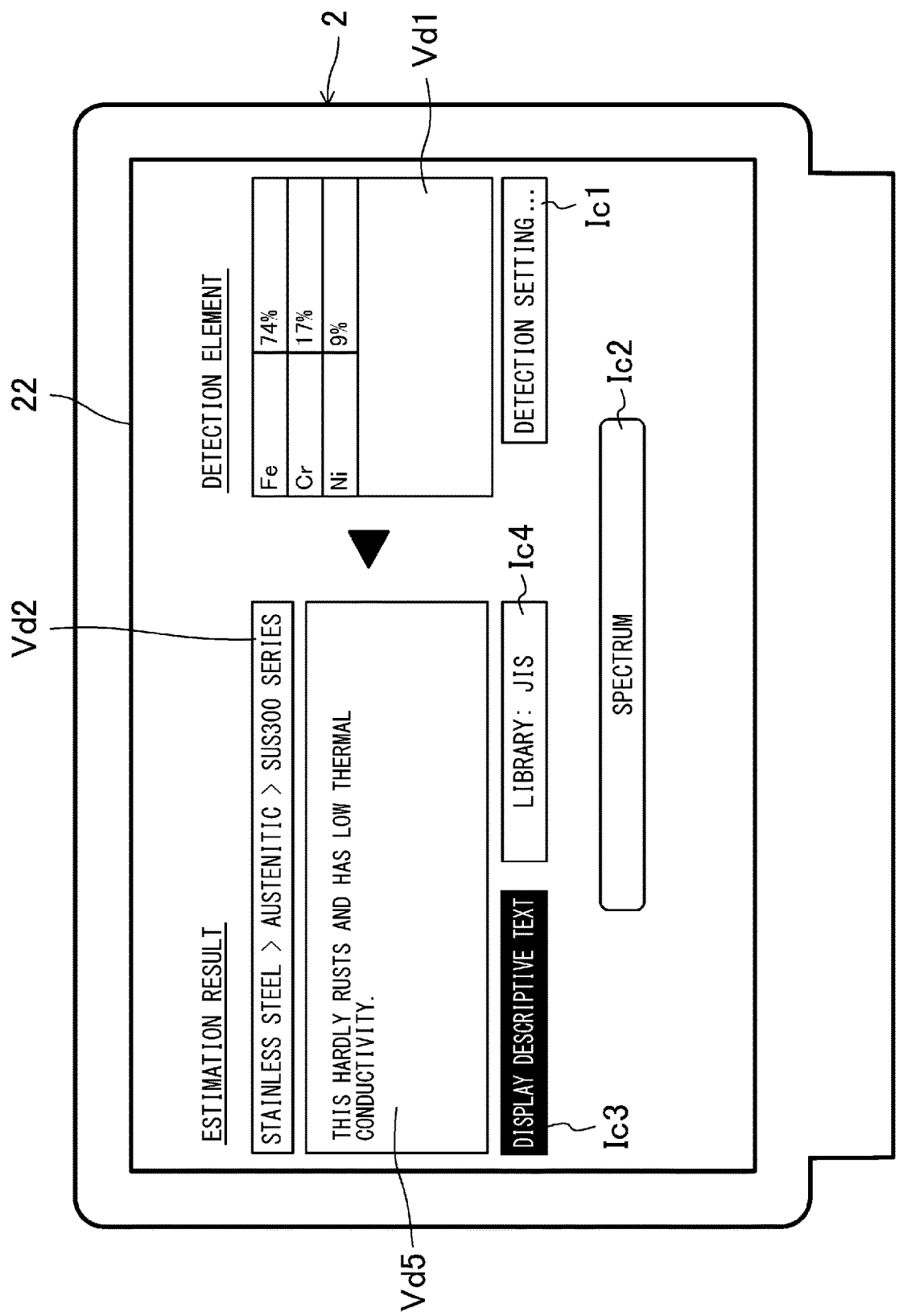
FIG. 39 is a view illustrating the display screen of the display.

Here, FIG. 39 illustrates a display screen when the third icon Ic3 is operated from the state illustrated in FIG. 38. On this display screen, the fifth information Vd5 indicating text data obtained by coupling one or more text data describing a superclass of a substance contained in the sample SP, text data describing an intermediate class thereof, and text data describing a subclass thereof.

Further, a fourth icon Ic4 that receives a click operation by the mouse 31 is displayed on the right side of the third icon Ic3. When receiving the operation of the fourth icon Ic4, the UI controller 215 can cause the display 22 to display an interface for selecting classification standards for the superclass to the subclass. The classification standards that can be selected via this interface can include, for example, one or more of Japanese Industrial Standards (JIS), standards based on the International Organization for Standardization (ISO), EN standards defined by the European Standards Institute, standards defined by the American National Standards Institute (ANSI), and standards set by the user. In addition, a commercial standard or a similar database can be used.

For example, when the standard "JIS" is selected, identification information indicating that "JIS" has been selected can be superimposed and displayed on the fourth icon Ic4 as illustrated in FIG. 38 and the like.

Figure 41:
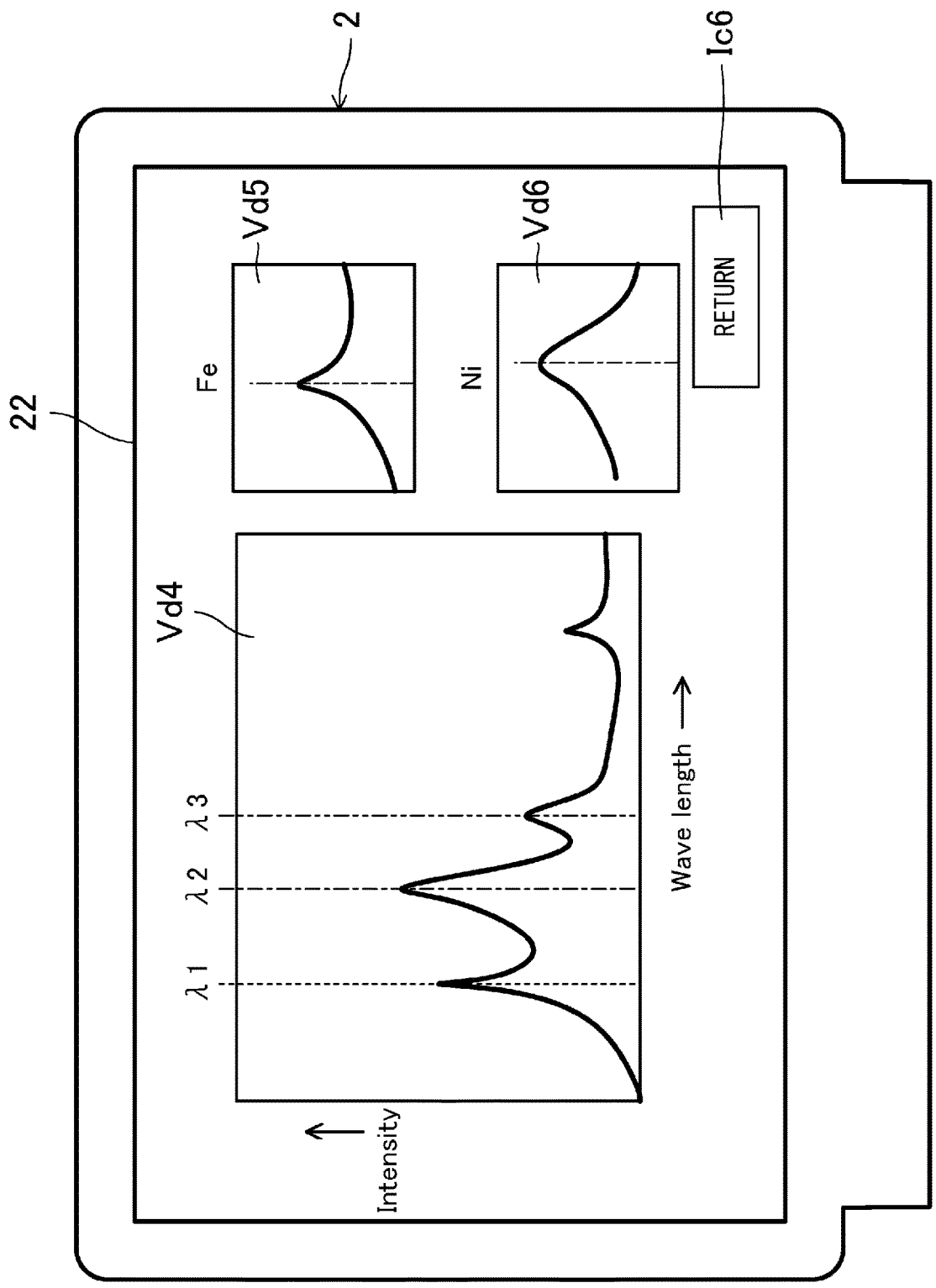
FIG. 41 is a view illustrating the display screen of the display.

Further, returning to the display screen illustrated in FIG. 40, the UI controller 215 according to the present embodiment can extract and display a spectrum near a peak of each element as illustrated in FIG. 41 by receiving an operation input for the ninth icon Ic9 arranged near the intensity distribution spectrum. Although only the spectrum Vd5 corresponding to iron and a spectrum Vd6 corresponding to nickel are displayed in the example illustrated in the drawing, a spectrum corresponding to chromium, which is also detected as the element contained in the sample SP, may be displayed in the same manner. Further, a spectrum indicating an element (an element other than iron, nickel, and chromium) not detected as the element contained in the sample SP may be displayed in addition to these elements. Further, there are a plurality of peaks respectively corresponding to elements in general, spectra indicating the plurality of peaks may be displayed side by side.

Further, the UI controller 215 can return to the display screen illustrated in FIG. 40 from the display screen illustrated in FIG. 41 when receiving an operation input for a sixth icon Ic6 with a note "return" on the display screen illustrated in FIG. 41.

Figure 42:
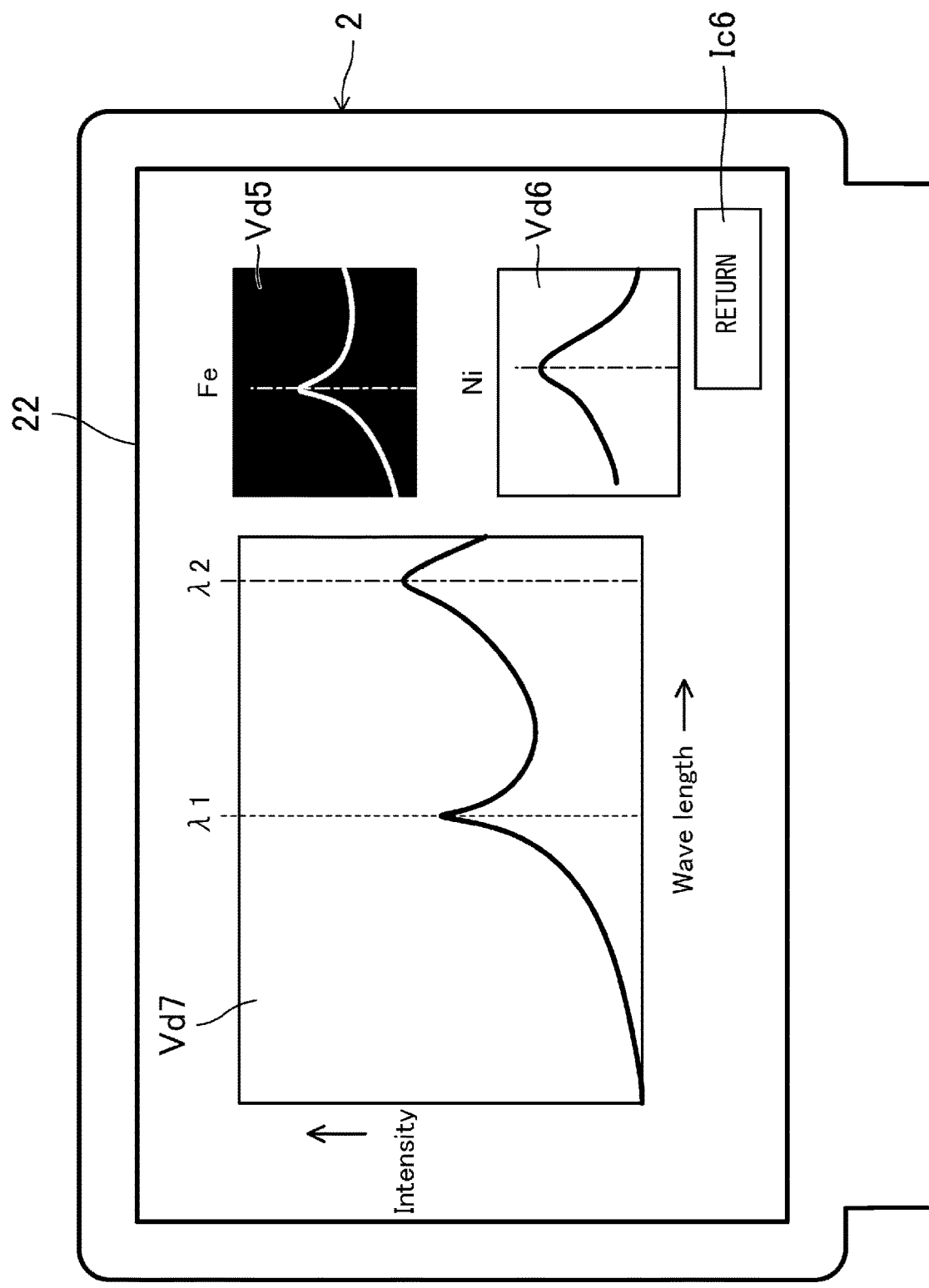
FIG. 42 is a view illustrating the display screen of the display.

Further, the UI controller 215 can receive an operation of selecting a spectrum extracted for each element and enlarge and display a point corresponding to the selected spectrum in the fourth information Vd4. For example, as illustrated in FIG. 42, when the spectrum Vd5 corresponding to iron is selected, the UI controller 215 displays seventh information Vd7 in which an intensity distribution near the iron is enlarged, instead of the fourth information Vd4.

Figure 43:
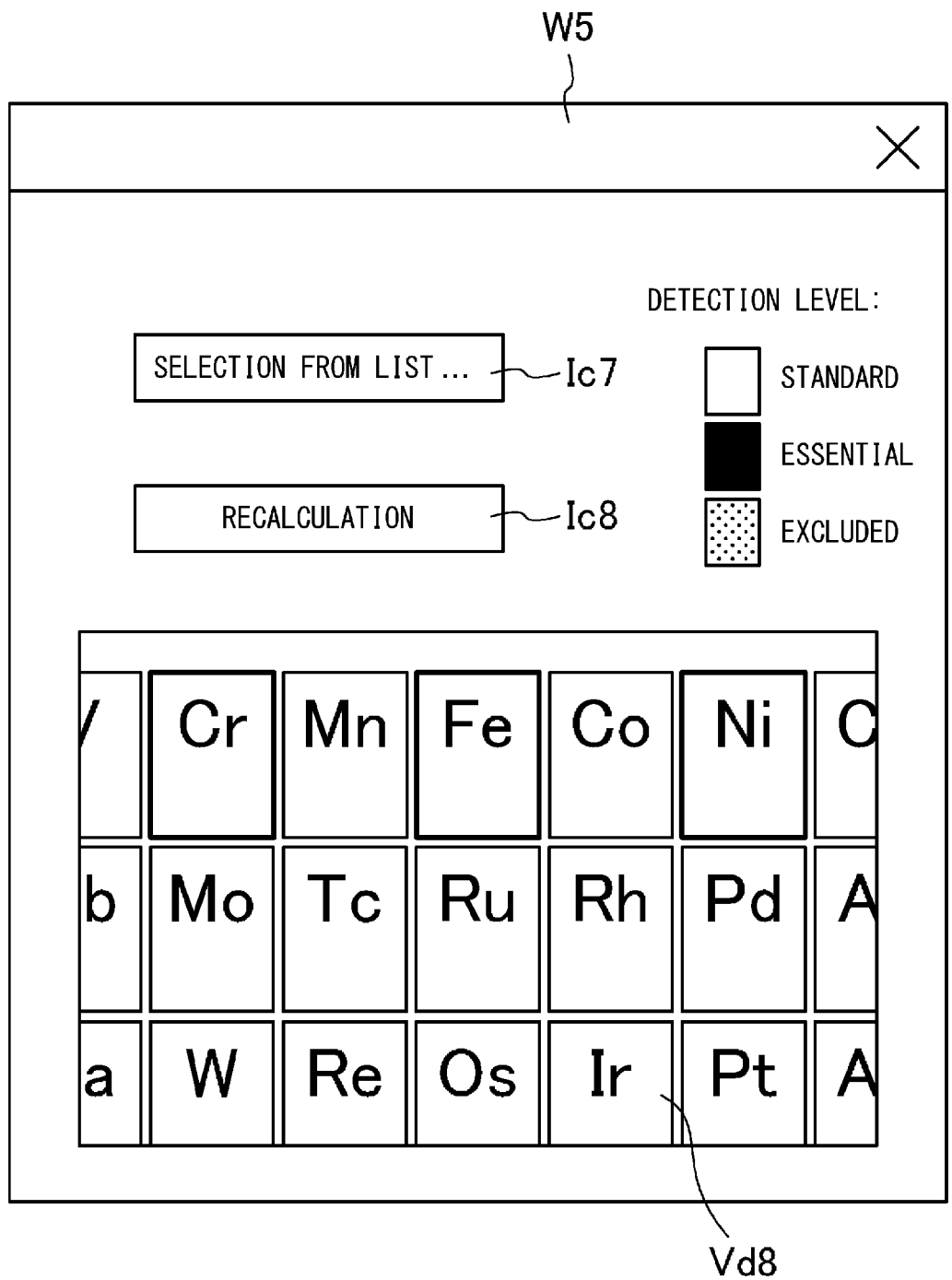
FIG. 43 is a view illustrating the display screen of the display.
Figure 44:
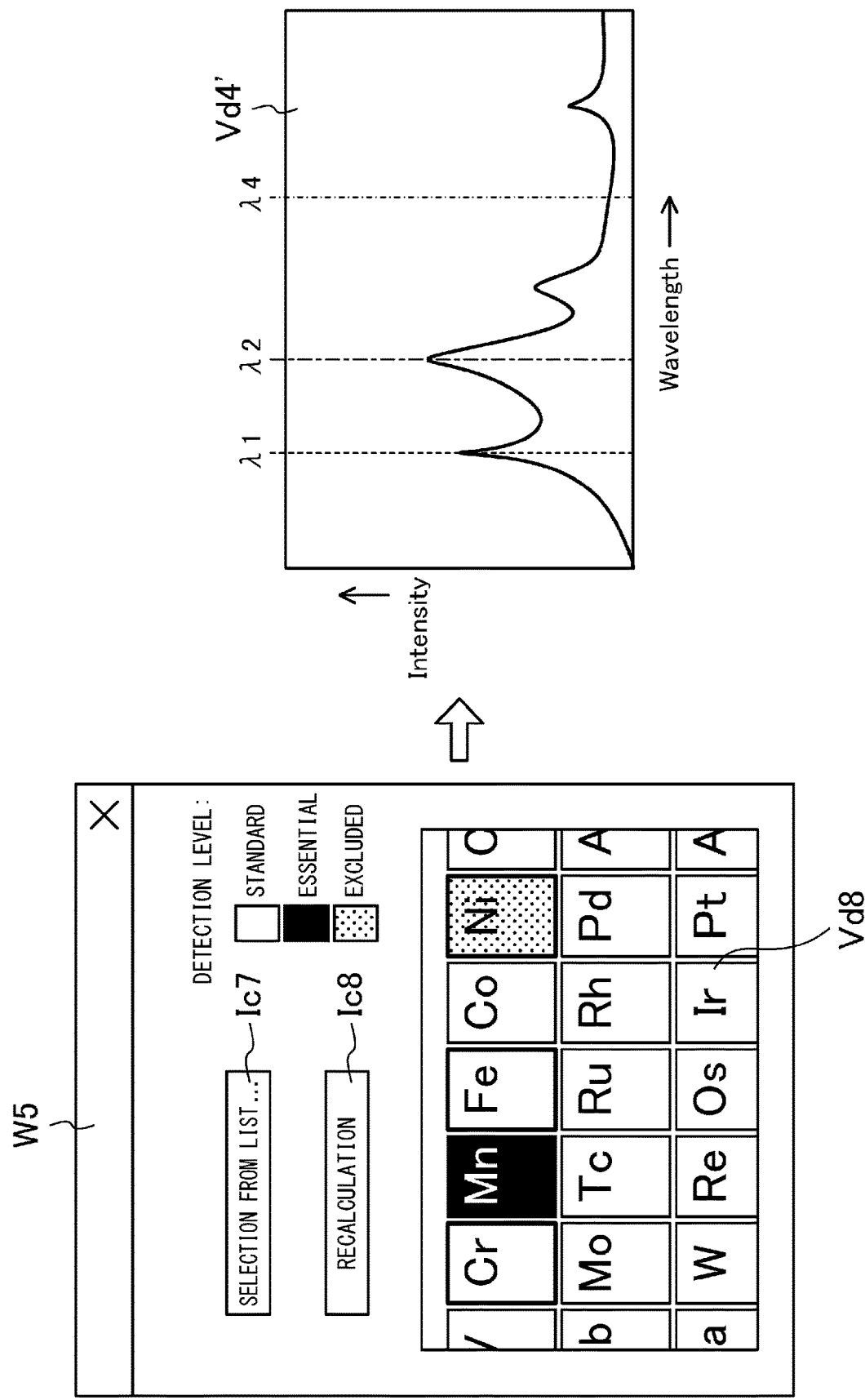
FIG. 44 is a view illustrating the display screen of the display.

Further, returning to FIG. 38, when the UI controller 215 causes the display 22 to display a dialog W5 as illustrated in FIG. 43 when receiving the operation input for the first icon Ic1 with the note "detection setting . . . ". As in the example illustrated in the drawing, eighth information Vd8 displaying a periodic table (only a part of the periodic table is illustrated in the example illustrated in the drawing), a seventh icon Ic7 with a note "selection from list", and an eighth icon Ic8 with a note "recalculation" can be displayed in this dialog W5.

Here, the UI controller 215 is configured to receive an operation input for each element in the periodic table displayed as the eighth information Vd. As illustrated in FIG. 43, each of the elements can be classified based on the operation input made for each of the elements into "standard" displaying an element name in black, "essential" displaying an element name in white, and "excluded" displaying an element name overlapping with a polka-dot pattern. When an operation input for the eighth icon Ic8 is performed in a state where the classification for each of the elements has been set, the UI controller 215 having received the operation input executes recalculation of the first information Vd1 and resetting of peak positions (chain lines corresponding to the wavelength λ1 to wavelength λ3) superimposed and displayed on the intensity distribution spectrum as chain lines, together with the spectrum analyzer 213.

Of these, an element classified as "standard" is extracted as a detection element by the spectrum analyzer 213 only when a peak is found in the intensity distribution spectrum. The element extracted as the detection element is displayed in the first information Vd1 and the like, such as iron, nickel and chromium in FIG. 39.

In addition, an element classified as "essential" is extracted as a detection element regardless of whether or not a peak is present in the intensity distribution spectrum. In the example illustrated in FIG. 44, manganese is classified as "essential". In this case, the UI controller 215 can superimpose and display a position of a wavelength λ4 corresponding to manganese on the fourth information Vd4. For example, when the sample SP does not contain manganese, a chain line indicating the wavelength λ4 is superimposed and displayed at a position where a peak does not appear in the intensity distribution spectrum as illustrated in information Vd4' in FIG. 44.

In addition, an element classified as "excluded" is excluded from the detection elements regardless of whether or not a peak is present in the intensity distribution spectrum. In the example illustrated in FIG. 44, nickel is classified as "excluded". In this case, the chain line indicating the wavelength λ3 is not displayed at the peak position corresponding to nickel regardless of a size of the intensity distribution spectrum, which is different from the fourth information Vd4 exemplified in FIG. 40. Further, when nickel is classified as "excluded", nickel is not displayed even in the first information Vd1 illustrated in FIG. 39 and the like although not illustrated.

Further, when a mouse cursor is placed on one element in the eighth information Vd8, the UI controller 215 can also superimpose and display a peak position corresponding to the one element on the intensity distribution spectrum.

Further, when receiving an operation input for the seventh icon Ic7, the UI controller 215 displays a list of the respective elements in a bulleted list on the display 22 (not illustrated). In that case, the respective elements in the list can be individually classified into the above-described "standard", "essential", and "excluded".

<Characteristic Section Contributing to Improvement of Usability>

As described above, the processor 21a according to the present embodiment generates the pre-irradiation image Pb with the first camera 81 at the timing immediately before the sample SP is irradiated with the laser light, for example, as illustrated in FIGS. 14 and 20, and steps S608 and S610 of FIG. 36B. At that time, elements for observing the sample SP such as the first camera 81 and the second camera 93 and elements for analyzing the sample SP such as the electromagnetic wave emitter 71 are controlled by the common processor 21a, so that the observation and analysis of the sample SP can be performed seamlessly, and the time and effort required for imaging the analysis point X can be saved. As a result, the usability of the analysis and observation device A can be improved.

Further, the processor 21a generates the post-irradiation image Pa with the first camera 81 at the timing after the sample SP is irradiated with the laser light as illustrated in FIGS. 19 and 21 and steps S617 and S620 of FIG. 36C. The user can grasp the change occurring in the sample SP by the laser induced breakdown spectroscopy, for example, by comparing the pre-irradiation image Pb and the post-irradiation image Pa. This is suitable for enhancing the usability of the analysis and observation device A. Furthermore, the generation of the post-irradiation image Pa can also be performed seamlessly similarly to the generation of the pre-irradiation image Pb, and thus, it is possible to save the time and effort required for the generation. As a result, it is advantageous in terms of improving the usability of the analysis and observation device A.

Further, the processor 21a generates the two types of images P having different enlargement magnifications as illustrated in FIGS. 14 and 19. For example, between the two types of images P, the low-magnification image is used for the navigation of the user, and the high-magnification image is used for the specification of the analysis point X, so that it is possible to further improve the usability of the analysis and observation device A.

Further, the UI controller 215 provides the user with the first user interface W3 configured to associate at least one of the two types of images with the analysis result as illustrated in FIG. 24. As a result, it is possible to meet a detailed need that, for example, storage of the low-magnification image is desired but storage of the high-magnification image is unnecessary. This is advantageous in terms of improving the usability of the analysis and observation device A.

Further, the UI controller 215 provides the user with the icons Ic51 and Ic52 configured to update the image as illustrated in FIG. 24. As a result, it is possible to meet a detailed need, for example, replacement of the low-magnification image from the pre-irradiation image Pb to the post-irradiation image Pa. This is advantageous in terms of improving the usability of the analysis and observation device A.

Further, the UI controller 215 outputs the report Rep in which the pre-irradiation image Pb, the post-irradiation image Pa, and the like obtained during the component analysis are displayed via the report output section 218 as illustrated in FIGS. 29 and 30. As a result, the user can grasp an irradiation position of the laser light, the destruction caused by the irradiation of the laser light, and the like. This is advantageous in terms of improving the usability of the analysis and observation device A.

Figure 16:
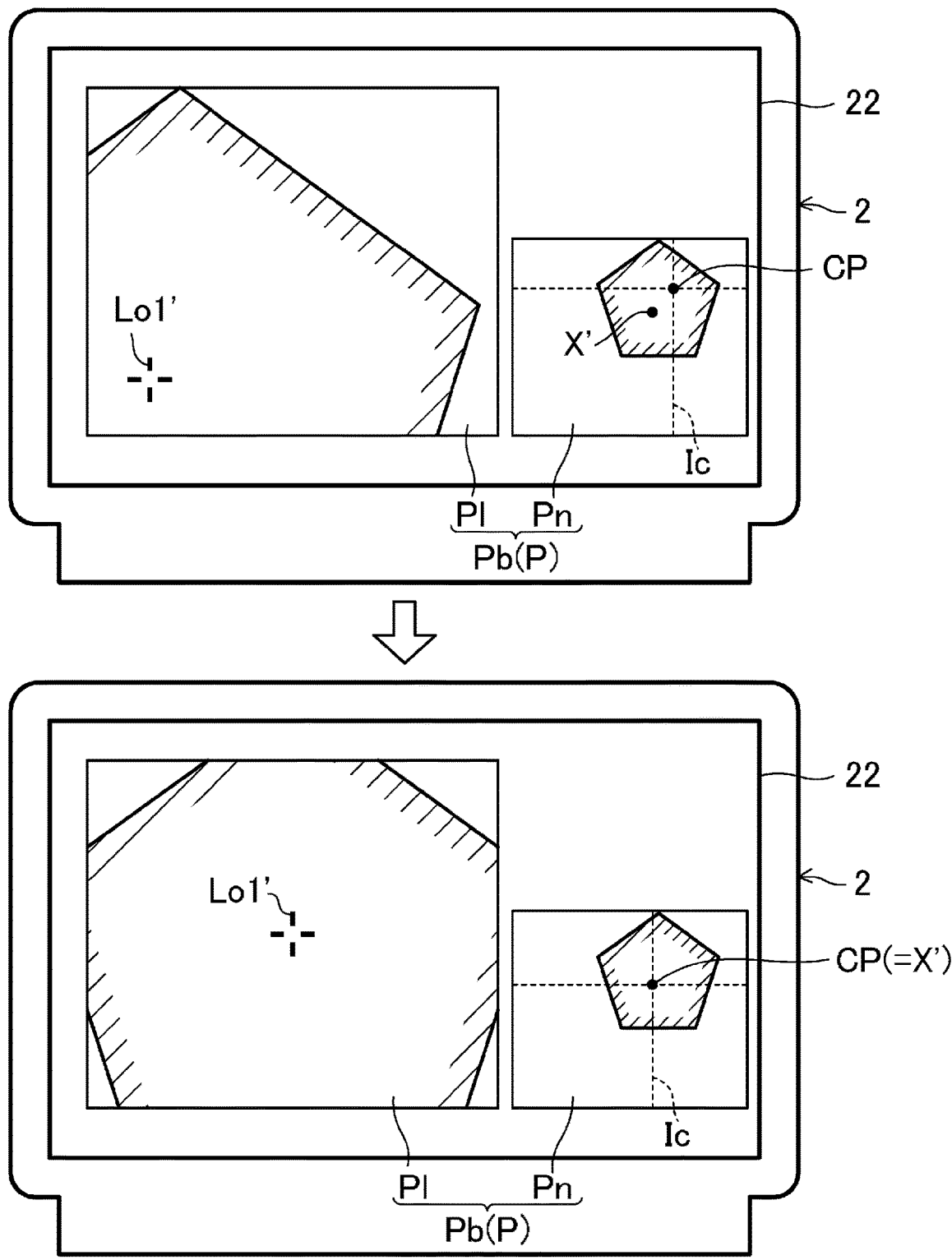
FIG. 16 is a view for describing processing when specification of a first analysis point is received.

Further, the analysis and observation device A can move the placement stage 5 so as to capture the image of the second analysis point Lo2 specified on the navigation image Pn as the low-magnification image or move the placement stage 5 such that the first analysis point Lo1 specified on the live image Pl as the high-magnification image is brought close to the visual field center as illustrated in FIGS. 15 and 16. As a result, it is possible to easily specify the irradiation position of the laser light in detail, which is advantageous in terms of improving the usability of the analysis and observation device A.

Further, the analysis and observation device A executes the regeneration of the live image Pl every time the placement stage 5 is moved in response to the specification of the first analysis point Lo1 or the second analysis point Lo2 as illustrated in FIGS. 15 and 16. As a result, it is possible to more appropriately specify the irradiation position of the laser light, which is advantageous in terms of improving the usability of the analysis and observation device A.

Further, the analysis and observation device A repeatedly receives the specification of the first analysis points Lo1 and Lo1', and executes the movement of the placement stage 5 and the regeneration of the high-magnification image every time the specification is received as illustrated in FIG. 16. As a result, it is possible to specify the irradiation position of the laser light in more detail, which is advantageous in terms of improving the usability of the analysis and observation device A.

Further, the imaging controller 214 generates the omni-focal image Pc of the sample SP as described with reference to FIG. 18, so that the live image Pl focused on substantially the entire visual field range can be generated. This is advantageous in terms of improving the usability of the analysis and observation device A.

Further, the laser light can be emitted to each of the plurality of analysis points X1 and X2, and the component analysis can be performed at each of the analysis points X1 and X2 as described with reference to FIG. 20. This is advantageous in terms of improving the usability of the analysis and observation device A.

Furthermore, the user can grasp the relative positional relation between the live image Pl and the navigation image Pn through the position information Ic by superimposing the position information Ic on the navigation image Pn as illustrated in FIG. 14. In addition, the user can grasp the irradiation position of the laser light as the primary electromagnetic wave through information X by superimposing the information X, which indicates the position of the first analysis point Lo1 on the live image Pl, on the navigation image Pn. As a result, it is possible to improve the usability of the analysis and observation device A.

Further, it is possible to calculate the position variation of the visual field center accompanying the change of the enlargement magnification using the first position difference D1 and the magnification difference as described with reference to FIGS. 26 and 31. As a result, the placement stage 5 can be moved so as to correct the position variation of the visual field center, and the position information Ic can be updated according to the position variation. This is advantageous in terms of improving the usability of the analysis and observation device A.

Other Embodiments

In the above embodiment, the second camera 93 in the observation optical system 9 is exemplified as the imaging section, and the first camera 81 in the analysis optical system 7 is exemplified as the second imaging section, but the present disclosure is not limited to such a configuration. The first camera 81 may be used as the imaging section, and the second camera 93 may be used as the second imaging section.

For example, when the first camera 81 is regarded as the imaging section, the pre-irradiation image Pb, the post-irradiation image Pa, the live image Pl, and the navigation image Pn is generated by the first camera 81 as the imaging section as described above.

Further, when the first camera 81 is regarded as the imaging section, the magnification changer according to the present disclosure changes the enlargement magnification of the first camera 81. That is, it suffices that the magnification changer according to the present disclosure can change the enlargement magnification of the sample SP by at least one of the first camera 81 and the second camera 93.

What is claimed is:

1. A laser-induced breakdown spectroscope that performs component analysis of an analyte using laser induced breakdown spectroscopy, the laser-induced breakdown spectroscope comprising:
a placement stage on which an analyte is placed;
a coaxial illuminator;
a side illuminator;
a camera which receives reflection light reflected by the analyte placed on the placement stage and detects a light reception amount of the received reflection light;
a laser light emitter which emits laser light to the analyte;
a collection head which collects plasma light generated in the analyte as the analyte is irradiated with the laser light emitted from the laser light emitter;
a detector which receives the plasma light generated in the analyte and collected by the collection head, and generates an intensity distribution spectrum that is an intensity distribution of the plasma light for each wavelength; and
a processor which includes: an imaging controller that generates an image of the analyte based on the light reception amount of the reflection light detected by the camera; a component analysis section that receives a start trigger signal for starting component analysis of the analyte and performs the component analysis of the analyte based on the intensity distribution spectrum generated by the detector; a user interface controller that receives a specification of an analysis point; and an illumination setting section that sets an illumination condition, which includes a control parameter of the coaxial illuminator and a control parameter of the side illuminator,
wherein the processor
receives the specification of the analysis point having a coordinate,
receives the start trigger signal for starting component analysis after receiving the specification of the analysis point,
controls the camera to generate a pre-irradiation image that is the image corresponding to the analysis point having the coordinate before the analysis point of the analyte is irradiated with the laser light in response to the reception of the start trigger signal while at least one of the coaxial illuminator and the side illuminator are turned on,
stores the illumination condition, which includes the control parameter of the coaxial illuminator and the control parameter of the side illuminator, in a storage device,
turns off the coaxial illuminator and the side illuminator,
controls the laser light emitter after controlling the camera to emit the laser light to the analysis point of the analyte having the coordinate to occur destruction to the analysis point of the analyte while the coaxial illuminator and the side illuminator are turned off,
reads the illumination condition from the storage device, which includes the control parameter of the coaxial illuminator and the control parameter of the side illuminator,
turns on at least one of the coaxial illuminator and the side illuminator based on the control parameter of the coaxial illuminator and the control parameter of the side illuminator in the illumination condition,
controls the camera to generate a post-irradiation image that is the image corresponding to the analysis point having the coordinate after the analysis point of the analyte is irradiated with the laser light, which occurs after controlling the laser light emitter to emit the laser light to the analysis point of the analyte, and the analyte is destructed by the irradiation of the laser light while at least one of the coaxial illuminator and the side illuminator are turned on based on the control parameter of the coaxial illuminator and the control parameter of the side illuminator in the illumination condition,
associates the pre-irradiation image corresponding to the analysis point having the coordinate, the post-irradiation image corresponding to the analysis point having the coordinate, and a component analysis result corresponding to the analysis point having the coordinate based on the intensity distribution spectrum generated by emitting the laser light to the analysis point of the analyte and receiving the plasma light by the detector, stores the component analysis result associated with the pre-irradiation image and the post-irradiation image to a non-volatile memory, the pre-irradiation image and the post-irradiation image corresponding to the analysis point having the coordinate, reads the component analysis result, the pre-irradiation image and the post-irradiation image, the pre-irradiation image and the post-irradiation image being associated with the component analysis result corresponding to the analysis point having the coordinate, from the non-volatile memory, and causes a display to display the pre-irradiation image and the post-irradiation image associated with the component analysis result read from the non-volatile memory when the component analysis result is displayed for collating the pre-irradiation image and the post-irradiation image to show the destruction occurring at the analysis point caused by the irradiation of the laser light.

2. The laser-induced breakdown spectroscope according to claim 1, wherein
the processor generates an image in which the component analysis result is superimposed on the pre-irradiation image, and causes the display to display the image.

3. The laser-induced breakdown spectroscope according to claim 1, further comprising:
a second camera which receives reflection light reflected by the analyte placed on the placement stage and detects a light reception amount of the received reflection light; and
a mode switcher which switches to one of the camera and the second camera,
wherein
an enlargement magnification of the analyte is set to be relatively higher in the second camera than in the camera, and
the imaging controller
generates a low-magnification image in which the enlargement magnification is relatively low in a state where the mode switcher switches to the camera, and
generates a high-magnification image in which the enlargement magnification is relatively high in a state where the mode switcher switches to the second camera.

4. The laser-induced breakdown spectroscope according to claim 3, further comprising:
an observation housing which accommodates the camera; and
an analysis housing which is configured separately from the observation housing and accommodates the second camera and the detector,
wherein the mode switcher switches to one of the camera and the second camera by moving the observation housing and the analysis housing relative to the placement stage.

5. The laser-induced breakdown spectroscope according to claim 4, wherein
the processor causes the display to display
the low-magnification image,
the high-magnification image, and
a first user interface that receives an operation input for storing at least one image of the low-magnification image and the high-magnification image in association with the component analysis result.

6. The laser-induced breakdown spectroscope according to claim 5, wherein
the processor
causes the display to display a display screen for updating the at least one image associated with the component analysis result, and
receives a storage instruction for storing the image displayed on the display and the component analysis result associated with the image in the non-volatile memory, and
the display screen includes
the at least one image and
a second user interface that receives an operation input for updating the at least one image.

7. The laser-induced breakdown spectroscope according to claim 5, further comprising
a report output section which outputs a report in which at least one of the low-magnification image, the high-magnification image, and the component analysis result is displayed at each position on a template obtained by assigning positions where the low-magnification image, the high-magnification image, and the component analysis result are to be output,
wherein the processor causes the image associated by the first user interface to be outputted on the report when the report output section outputs the report.

8. The laser-induced breakdown spectroscope according to claim 1, further comprising
a second camera that receives reflection light reflected by the analyte placed on the placement stage and detects a light reception amount of the received reflection light; and
a magnification changer capable of changing an enlargement magnification of the analyte by at least one of the camera and the second camera,
wherein the processor
adjusts the magnification changer to change the enlargement magnification, and
generates a low-magnification image in which the enlargement magnification is relatively low and a high-magnification image in which the enlargement magnification is relatively high as the pre-irradiation image of the analyte as the at least one of the camera and the second camera detects the light reception amount of the reflection light at each of the enlargement magnifications.

9. The laser-induced breakdown spectroscope according to claim 6, further comprising
an electric drive which moves an imaging position indicating a relative position of the placement stage with respect to the camera along a horizontal direction,
wherein
the processor is configured to receive at least one of specification of a first analysis point on the high-magnification image and specification of a second analysis point on the low-magnification image, and
the imaging controller
controls the electric drive based on the second analysis point to move the imaging position such that the second analysis point falls within a visual field range of the high-magnification image when the processor receives the specification of the second analysis point, and
controls the electric drive based on the first analysis point to move the imaging position such that the first analysis point is brought close to a visual field center of the high-magnification image when the processor receives the specification of the first analysis point.

10. The laser-induced breakdown spectroscope according to claim 9, wherein
the processor is configured to receive specification of a plurality of the second analysis points on the low-magnification image, and
when the processor receives the specification of the plurality of second analysis points, for each of the plurality of received second analysis points,
the processor
causes the electric drive to move the imaging position such that one second analysis point among the plurality of received second analysis points falls within the visual field range of the high-magnification image,
causes the imaging controller to generate the high-magnification image in a state where the one second analysis point falls within the visual field range of the high-magnification image, and
causes the laser light emitter to emit the laser light to the analyte after the imaging controller generates the high-magnification image to cause the component analysis section to perform component analysis at the one second analysis point.

11. The laser-induced breakdown spectroscope according to claim 10, wherein
the processor is configured to receive specification of a plurality of the first analysis points on the high-magnification image, and
when the processor receives the specification of the plurality of first analysis points, for each of the plurality of received first analysis points,
the processor
causes the electric drive to move the imaging position such that one first analysis point among the plurality of received first analysis points is brought close to the visual field center of the high-magnification image,
causes the imaging controller to generate the high-magnification image in a state where the one first analysis point is brought close to the visual field center of the high-magnification image, and
causes the laser light emitter to emit the laser light to the analyte after the imaging controller generates the high-magnification image to cause the component analysis section to perform component analysis at the one first analysis point.

12. The laser-induced breakdown spectroscope according to claim 9, wherein
the imaging controller
executes regeneration of the high-magnification image in a state where the second analysis point falls within the visual field range of the high-magnification image by controlling the electric drive when the processor receives specification of the second analysis point, and
executes regeneration of the high-magnification image in a state where the first analysis point is brought close to the visual field center of the high-magnification image by controlling the electric drive when the processor receives the specification of the first analysis point.

13. The laser-induced breakdown spectroscope according to claim 12, wherein
the processor receives specification of the first analysis point on the regenerated high-magnification image, and
the imaging controller
controls the electric drive based on the first analysis point to move the imaging position such that the first analysis point is brought close to a visual field center of the regenerated high-magnification image when the processor receives the specification of the first analysis point, and
executes additional regeneration of the high-magnification image in a state where the first analysis point is brought close to the visual field center of the regenerated high-magnification image by controlling the electric drive.

14. The laser-induced breakdown spectroscope according to claim 9, further comprising:
a base; and
a stand which is connected to the base and extends in a first direction perpendicular to the base,
wherein
the placement stage is supported by the base or the stand,
the electric drive is configured to move the imaging position along the first direction, and
the imaging controller controls the electric drive to move the imaging position along the first direction after the imaging position is moved along the horizontal direction by controlling the electric drive.

15. The laser-induced breakdown spectroscope according to claim 14, wherein
the imaging controller
causes the electric drive to move the imaging position to a plurality of first positions along the first direction, generates a plurality of the high-magnification images respectively at the plurality of first positions, and
synthesizes the plurality of high-magnification images generated respectively at the plurality of first positions to generate an omnifocal image of the analyte.

16. The laser-induced breakdown spectroscope according to claim 14, wherein
the electric drive is configured to change a collection position indicating a relative position of the placement stage with respect to the collection head along the first direction,
the imaging controller causes the electric drive to move the collection position to a plurality of first positions along the first direction, and generates the image at each of the plurality of first positions, and
the component analysis section
identifies a height along the first direction at the first analysis point received by the processor based on the image generated at each of the plurality of first positions, and
controls the electric drive based on the identified height to move the collection position along the first direction such that the laser light emitted from the laser light emitter is focused on the first analysis point.

* * * * *

UNITED STATES PATENT AND TRADEMARK OFFICE
CERTIFICATE OF CORRECTION

PATENT NO. : 12,241,838 B2
APPLICATION NO. : 17/688962
DATED : March 4, 2025
INVENTOR(S) : Kondo et al.

Page 1 of 1

It is certified that error appears in the above-identified patent and that said Letters Patent is hereby corrected as shown below:

In the Claims

Claim 5, Column 67, Line 62, "claim 4" should read --claim 3--,

Claim 9, Column 68, Line 50, "claim 6" should read --claim 8--,

Claim 11, Column 69, Line 29, "claim 10" should read --claim 9--.

Signed and Sealed this
Eighth Day of April, 2025

Coke Morgan Stewart
*Acting Director of the United States Patent and Trademark Office*